(12) United States Patent
Devie et al.

(10) Patent No.: US 11,664,670 B1
(45) Date of Patent: May 30, 2023

(54) METHODS AND SYSTEMS FOR UPDATING STATE OF CHARGE ESTIMATES OF INDIVIDUAL CELLS IN BATTERY PACKS

(71) Applicant: Element Energy, Inc., Menlo Park, CA (US)

(72) Inventors: Arnaud Devie, San Carlos, CA (US); Rainer Johannes Fasching, Mill Valley, CA (US); Seth Marshall Kahn, Sonoma, CA (US); Anthony John Stratakos, Edgartown, MA (US)

(73) Assignee: Element Energy, Inc., Menlo Park, CA (US)

( * ) Notice: Subject to any disclaimer, the term of this patent is extended or adjusted under 35 U.S.C. 154(b) by 0 days.

(21) Appl. No.: 17/821,179

(22) Filed: Aug. 21, 2022

(51) Int. Cl.
 *H02J 7/00* (2006.01)
(52) U.S. Cl.
 CPC .......... *H02J 7/0048* (2020.01); *H02J 7/0016* (2013.01); *H02J 7/007186* (2020.01)
(58) Field of Classification Search
 CPC .................................................... H02J 7/0048
 USPC ......................................................... 320/132
 See application file for complete search history.

(56) References Cited

U.S. PATENT DOCUMENTS

| | | | |
|---|---|---|---|
| 6,160,441 A | 12/2000 | Stratakos et al. | |
| 6,262,558 B1 | 7/2001 | Weinberg | |
| 6,445,244 B1 | 9/2002 | Stratakos et al. | |
| 6,777,953 B2 | 8/2004 | Blades | |
| 6,835,491 B2 | 12/2004 | Gartstein et al. | |
| 6,876,203 B2 | 4/2005 | Blades | |
| 6,984,970 B2 | 1/2006 | Capel | |
| 7,068,017 B2 | 6/2006 | Willner et al. | |
| 7,391,218 B2 | 6/2008 | Kojori et al. | |
| 8,158,877 B2 | 4/2012 | Klein et al. | |
| 8,395,519 B2 | 3/2013 | Cassidy | |

(Continued)

FOREIGN PATENT DOCUMENTS

| | | |
|---|---|---|
| CA | 2667825 A1 | 5/2008 |
| CN | 109860740 | 6/2019 |

(Continued)

OTHER PUBLICATIONS

Walker, Geoffrey R., et al., "Cascaded DC-DC Converter Connection of Photovoltaic Modules", IEEE Transactions on Power Electronics, vol. 19, No. 4, (Jul. 2004), 1130-1139.

(Continued)

*Primary Examiner* — Jerry D Robbins
(74) *Attorney, Agent, or Firm* — PdZ Patent Law, PLLC

(57) ABSTRACT

Described herein are methods and systems for updating SOC estimates of individual cells in battery packs. Specifically, SOC estimates are updated in-situ, e.g., while the battery packs remain operational. For example, a cell is charged or discharged, independently from other cells, until the cell OCV is at a set value, corresponding to one of target zones. The target zones have more prominent correlations between the OCV and SOC than other parts of the OCV profile. A new SOC value, corresponding to the cell OCV, is used to update the SOC estimate. In some examples, a set of voltages is obtained while the cell is charged or discharged at a constant current/power, e.g., outside of the target zones. One or more differential capacities are determined from this voltage set, and a new SOC value is obtained based on these differential capacities.

21 Claims, 43 Drawing Sheets

(56) References Cited

U.S. PATENT DOCUMENTS

| | | | |
|---|---|---|---|
| 8,503,137 B2 | 8/2013 | Panetta | |
| 8,686,693 B2 | 4/2014 | Bhowmik et al. | |
| 8,810,199 B2 | 8/2014 | Roeper | |
| 8,817,431 B2 | 8/2014 | Tomimbang et al. | |
| 8,837,097 B2 | 9/2014 | Zuercher et al. | |
| 8,879,218 B2 | 11/2014 | Tomimbang | |
| 9,132,734 B2 | 9/2015 | Auguet et al. | |
| 9,172,120 B2 | 10/2015 | Pariseau et al. | |
| 9,214,822 B2* | 12/2015 | Hartley | H02J 7/0047 |
| 9,257,729 B2 | 2/2016 | Hermann et al. | |
| 9,331,497 B2 | 5/2016 | Beaston | |
| 9,425,631 B2 | 8/2016 | Furtner | |
| 9,515,496 B1 | 12/2016 | Ying | |
| 9,564,762 B2 | 2/2017 | Lee et al. | |
| 9,705,341 B2 | 7/2017 | Komatsu et al. | |
| 9,806,545 B2 | 10/2017 | Fink | |
| 9,865,901 B2 | 1/2018 | Hwang | |
| 9,893,385 B1 | 2/2018 | Nayar et al. | |
| 9,965,007 B2 | 5/2018 | Amelio et al. | |
| 10,018,682 B2 | 7/2018 | Kaupp et al. | |
| 10,153,651 B2 | 12/2018 | Taylor et al. | |
| 10,270,262 B2 | 4/2019 | Kim et al. | |
| 10,553,851 B2 | 2/2020 | Kim | |
| 10,714,974 B2 | 7/2020 | Clifton et al. | |
| 10,777,851 B2 | 9/2020 | Razzell | |
| 10,804,690 B2 | 10/2020 | Ronne et al. | |
| 10,928,461 B1 | 2/2021 | Stafl | |
| 10,992,149 B1 | 4/2021 | Kahn et al. | |
| 11,061,076 B1 | 7/2021 | Fasching et al. | |
| 2001/0000212 A1* | 4/2001 | Reipur | G01R 31/3832 320/106 |
| 2005/0121067 A1 | 6/2005 | Toyomura et al. | |
| 2005/0139258 A1 | 6/2005 | Liu et al. | |
| 2005/0151513 A1 | 7/2005 | Cook et al. | |
| 2005/0212481 A1* | 9/2005 | Nakada | H02J 7/0019 320/116 |
| 2007/0223165 A1 | 9/2007 | Itri et al. | |
| 2008/0236648 A1 | 10/2008 | Klein et al. | |
| 2008/0303503 A1 | 12/2008 | Wolfs | |
| 2009/0284078 A1 | 11/2009 | Zhang et al. | |
| 2009/0284232 A1 | 11/2009 | Zhang et al. | |
| 2009/0284240 A1 | 11/2009 | Zhang et al. | |
| 2009/0284998 A1 | 11/2009 | Zhang et al. | |
| 2010/0207455 A1 | 8/2010 | Erickson, Jr. et al. | |
| 2010/0253150 A1 | 10/2010 | Porter et al. | |
| 2010/0288327 A1 | 11/2010 | Lisi et al. | |
| 2010/0327659 A1 | 12/2010 | Lisi et al. | |
| 2011/0062784 A1 | 3/2011 | Wolfs | |
| 2011/0090607 A1 | 4/2011 | Luebke et al. | |
| 2011/0141644 A1 | 6/2011 | Hastings et al. | |
| 2011/0301772 A1 | 12/2011 | Zuercher et al. | |
| 2012/0013201 A1 | 1/2012 | Pariseau et al. | |
| 2012/0043818 A1 | 2/2012 | Stratakos et al. | |
| 2012/0043823 A1 | 2/2012 | Stratakos et al. | |
| 2012/0043923 A1 | 2/2012 | Ikriannikov et al. | |
| 2012/0044014 A1 | 2/2012 | Stratakos et al. | |
| 2012/0089266 A1 | 4/2012 | Tomimbang et al. | |
| 2012/0112760 A1 | 5/2012 | Yoscovich et al. | |
| 2012/0119746 A1* | 5/2012 | Macris | H02J 7/0048 324/431 |
| 2012/0133521 A1 | 5/2012 | Rothkppf et al. | |
| 2012/0290234 A1* | 11/2012 | Schaefer | H02J 7/04 320/135 |
| 2012/0313560 A1 | 12/2012 | Hambitzer et al. | |
| 2013/0092208 A1 | 4/2013 | Robbins | |
| 2013/0106194 A1 | 5/2013 | Jergovic et al. | |
| 2013/0127399 A1* | 5/2013 | Tang | B60L 58/15 320/103 |
| 2013/0170084 A1 | 7/2013 | Strobl et al. | |
| 2013/0176401 A1 | 7/2013 | Monari et al. | |
| 2013/0234669 A1 | 9/2013 | Huang et al. | |
| 2013/0257323 A1 | 10/2013 | Diamond et al. | |
| 2013/0271068 A1* | 10/2013 | Komoda | H02J 7/007184 320/134 |
| 2014/0253045 A1 | 9/2014 | Poznar | |
| 2014/0361743 A1* | 12/2014 | Lin | B60L 58/15 320/109 |
| 2014/0368205 A1 | 12/2014 | Svensson et al. | |
| 2014/0373894 A1 | 12/2014 | Stratakos et al. | |
| 2015/0115736 A1 | 4/2015 | Snyder | |
| 2015/0377976 A1 | 12/2015 | Maluf et al. | |
| 2016/0181837 A1* | 6/2016 | Shu | H02J 7/0018 320/119 |
| 2016/0261127 A1 | 9/2016 | Worry et al. | |
| 2016/0372940 A1 | 12/2016 | Canadi | |
| 2017/0123008 A1 | 5/2017 | Frias et al. | |
| 2018/0147947 A1 | 5/2018 | Gebhart | |
| 2018/0252195 A1 | 9/2018 | Ciaccio et al. | |
| 2019/0198938 A1 | 6/2019 | Fujita et al. | |
| 2019/0212383 A1 | 7/2019 | Elliott | |
| 2019/0361075 A1 | 11/2019 | Lee et al. | |
| 2020/0021107 A1 | 1/2020 | Collins et al. | |
| 2020/0127489 A1 | 4/2020 | Chen et al. | |
| 2020/0207219 A1 | 7/2020 | Slepchenkov et al. | |
| 2020/0212959 A1 | 7/2020 | Eriksen et al. | |
| 2020/0254882 A1 | 8/2020 | Kwon et al. | |
| 2020/0350779 A1 | 11/2020 | Tikhonski et al. | |
| 2021/0044119 A1 | 2/2021 | Poland et al. | |
| 2021/0096398 A1 | 4/2021 | Hekmat et al. | |
| 2021/0119455 A1 | 4/2021 | Jaipaul et al. | |
| 2021/0188121 A1* | 6/2021 | Kikuchi | H02J 7/0016 |
| 2021/0210965 A1* | 7/2021 | Roumi | H02J 13/00002 |
| 2021/0226462 A1* | 7/2021 | Seo | H02J 7/0047 |
| 2022/0069371 A1* | 3/2022 | Lee | G01R 31/382 |

FOREIGN PATENT DOCUMENTS

| | | |
|---|---|---|
| EP | 0762591 A2 | 3/1997 |
| EP | 3550581 A1 | 10/2019 |
| EP | 35999653 A1 | 1/2020 |
| WO | 2013053445 A1 | 4/2013 |
| WO | 2015200366 A1 | 12/2015 |

OTHER PUBLICATIONS

Wolfs, Peter, et al., "Distributed Maximum Power Tracking for High Performance Vehicle Solar Arrays", Australian Universities Power Engineering Conference (AUPEC 2004), (Sep. 2004), 6 pgs.
Machine translation of Description of WO 2012/053445, 11 pages.
Martinez et al., Arc Fault Management by Solid State Switches for Enhanced Automotive Safety, Jan. 2005, IEEE, pp. 1029-1034, 2005.
Machine translation of CN 109860740, 24 pages.

* cited by examiner

| No. | Coulomb Count [Ah] | CC Voltage [V] | dQ/dV | d2Q/dV2 |
|---|---|---|---|---|
| 1 | 38.2 | 3.324 | - | - |
| 2 | 39.9 | 3.326 | 824 | - |
| 3 | 43.7 | 3.328 | 1918 | 1094 |
| 4 | 50.3 | 3.30 | 3295 | 1377 |
| 5 | 56.6 | 3.332 | 3137 | -158 |
| 6 | 61.9 | 3.334 | 2666 | -471 |

*FIG. 9*

| Voltage [V] | dQ/dV | d2Q/dV2 | SOC |
|---|---|---|---|
| 3.324 | - | - | X1 |
| 3.326 | 824 | - | X2 |
| 3.328 | 1918 | 1094 | X3 |
| 3.30 | 3295 | 1377 | X4 |
| 3.332 | 3137 | -158 | X5 |
| 3.334 | 2666 | -471 | X6 |

*FIG. 10*

METHODS AND SYSTEMS FOR UPDATING STATE OF CHARGE ESTIMATES OF INDIVIDUAL CELLS IN BATTERY PACKS

BACKGROUND

Determining battery cells' state of charge (SOC) can be challenging. For example, the SOC may not always clearly correlate to the cell voltage, e.g., an open-circuit voltage (OCV) or a constant-current voltage (CCV). Specifically, battery cells may exhibit multiple voltage plateaus over a SOC range. These voltage plateaus can be attributed to specific electrode active materials used to fabricate these cells, among other factors. At the same time, precisely determining the SOC of battery cells can be important, especially in multi-cell battery packs. For example, inaccurate SOC estimates may result in various issues, negatively impacting performance and safety.

What is needed are new methods and systems for determining the SOC of individual cells in battery packs.

SUMMARY

Described herein are methods and systems for determining the SOC values of individual cells in battery packs. Specifically, the SOC determination is performed in-situ, e.g., while the battery packs remain operational. For example, a cell is charged or discharged until the cell's voltage (e.g., estimated open circuit voltage) is at a set value, corresponding to one of the target zones with more prominent correlations between the OCV and SOC than other parts of the cell's OCV profile. A new SOC value is determined while the cell's voltage is within the target zone. In some examples, a voltage reading includes multiple voltage values, which are obtained while the cell is charged or discharged at a constant current/power. One or more differential capacities are determined from this voltage set, and a new SOC value is obtained based on these differential capacities. These differential capacities allow precise SOC estimates even when cells are not within target zones.

In a first aspect, an in-situ method for determining a state of charge value of a battery pack including a plurality of battery cells includes (a) changing a magnitude of an external cell current flowing through one or more first battery cells of the plurality of battery cells according to a first test profile, using a first node controller electrically coupled to the one or more first battery cells, while one or more second battery cells of the plurality of battery cells charge or discharge via a second node controller, (b) obtaining a first voltage reading from the one or more first battery cells, in response to changing the magnitude of the external cell current flowing through the one or more first battery cells according to the first test profile, and (c) determining a state of charge value of the one or more first battery cells at least partially using the first voltage reading.

In an embodiment of the first aspect, the method further includes controlling the second node controller such that the one or more second battery cells operate according to a compensation profile, while changing the magnitude of external cell current flowing through the one or more first battery cells according to the first test profile, the compensation profile being different from the first test profile.

In another embodiment of the first aspect, the method further includes balancing charge among at least the one or more first battery cells and the one or more second battery cells, after determining the state of charge value of the one or more first battery cells.

In another embodiment of the first aspect, the method further includes, after balancing charge among at least the one or more first battery cells and the one or more second battery cells, (a) controlling the first node controller such that the one or more first battery cells operate according to a first operating profile that is different from the first test profile, and (b) controlling the second node controller such that the one or more second battery cells operate according to a second operating profile.

In another embodiment of the first aspect, the method further includes, after determining the state of charge value of the one or more first battery cells, controlling the first node controller such that the one or more first battery cells operate according to a first operating profile that is different from the first test profile.

In another embodiment of the first aspect, a voltage of the battery pack is at least substantially unchanged while changing the magnitude of the external cell current flowing through the one or more first battery cells according to the first test profile.

In another embodiment of the first aspect, the magnitude of the external cell current flowing through the one or more first battery cells is different from a magnitude of an external cell current flowing through the one or more second battery cells, while changing the magnitude of the external cell current flowing through the one or more first battery cells according to the first test profile.

In another embodiment of the first aspect, the first and second node controllers are electrically coupled in series.

In another embodiment of the first aspect, the method further includes, before changing the magnitude of the external cell current flowing through the one or more first battery cells according to the first test profile, selecting the one or more first battery cells for state of charge determination.

In another embodiment of the first aspect, selecting the one or more first battery cells for state of charge determination is at least partially based one or more of the following: (a) a time lapse, (b) a cycle count, (c) a confidence level in a state of charge value of a Coulomb counter, (d) a charge depth of the one or more first battery cells in one or more of previous cycles, (e) a discharge depth of the one or more first battery cells in one or more of previous cycles, (f) a charge rate of the one or more first battery cells in one or more of previous cycles, (g) a discharge rate of the one or more first battery cells in one or more of previous cycles, (h) a temperature of the one or more first battery cells in the one or more of previous cycles, and (i) a user input.

In another embodiment of the first aspect, changing the magnitude of the external cell current flowing through the one or more first battery cells according to the first test profile causes the one or more first battery cells to be in a first test target zone.

In another embodiment of the first aspect, the first test target zone corresponds to one or more of (a) a predetermined state of charge range of the one or more first battery cells and (b) a predetermined voltage range of the one or more first battery cells.

In another embodiment of the first aspect, the first test target zone corresponds to a state of charge range of the one or more first battery cells where state of charge of the one or more first battery cells can be estimated with an error that is less than a predetermined maximum value.

In another embodiment of the first aspect, the method further includes determining that the one or more first battery cells is operating in the first test target zone at least partially based on one or more of (a) information of a voltage-current look-up table, (b) information of an overvoltage model, (c) a state of charge estimate from a Coulomb counter, (d) an impedance of the one or more first battery cells, and (e) a temperature change of the one or more first battery cells.

In another embodiment of the first aspect, the method further includes determining a state of charge range or a voltage range of the first test target zone at least partially based on one or more of (a) a current state of the battery pack, (b) an operating history the battery pack, and (c) a required precision of the determined state of charge value of the one or more first battery cells.

In another embodiment of the first aspect, the first test target zone corresponds to one of (a) state of charge of the one or more first battery cells being less than ten percent and (b) state of charge of the one or more first battery cells being greater than ninety percent.

In another embodiment of the first aspect, the method further includes (a) changing the magnitude of the external cell current flowing through the one or more first battery cells to cause the one or more first battery cells to be in a second test target zone that is different from the first test target zone, (b) obtaining a second voltage reading from the one or more first battery cells while the one or more first battery cells are in the second test target zone, and (c) determining an additional state of charge value of the one or more first battery cells at least partially based on the second voltage reading.

In another embodiment of the first aspect, a magnitude of a difference between a state of charge of the one or more first battery cells in the second test target zone and a state of charge of the one or more first battery cells in the first test target zone is at least ten percent of an operating capacity of the one or more first battery cells.

In another embodiment of the first aspect, the method further includes determining an operating capacity of the one or more first battery cells at least partially based on the state of charge value of the one or more first battery cells and the additional state of charge value of the one or more first battery cells.

In another embodiment of the first aspect, the method further includes updating a Coulomb counter associated with the one or more first battery cells at least partially based on the determined operating capacity of the one or more first battery cells.

In another embodiment of the first aspect, the method further includes updating a Coulomb counter associated with the one or more first battery cells at least partially based on the determined state of charge value of the one or more first battery cells.

In another embodiment of the first aspect, changing the magnitude of the external cell current flowing through the one or more first battery cells according to the first test profile includes causing the magnitude of the external cell current flowing through the one or more first battery cells to be zero.

In another embodiment of the first aspect, the one or more first battery cells are in a first test target zone while causing the magnitude of the external cell current flowing through the one or more first battery cells to be zero.

In another embodiment of the first aspect, changing the magnitude of the external cell current flowing through the one or more first battery cells according to the first test target profile includes charging or discharging the one or more first battery cells at a constant current or at a constant power.

In another embodiment of the first aspect, the method further includes after obtaining the first voltage reading from the one or more first battery cells, obtaining one or more additional voltage readings from the one or more first battery cells, in response to changing the magnitude of the external cell current flowing through the one or more first battery cells according to the first test target profile.

In another embodiment of the first aspect, determining the state of charge value of the one or more first battery cells at least partially using the first voltage reading includes determining the state of charge value of the one or more first battery cells further using the one or more additional voltage readings.

In another embodiment of the first aspect, the method further includes determining a set of first-order differential capacity values at least partially using the first voltage reading and the one or more additional voltage readings.

In another embodiment of the first aspect, determining the state of charge value of the one or more first battery cells at least partially using the first voltage reading includes determining the state of charge value at least partially using the set of first-order differential capacity values.

In another embodiment of the first aspect, the method further includes determining a set of second-order differential capacity values at least partially using the set of first-order differential capacity values, where determining the state of charge value of the one or more first battery cells at least partially using the first voltage reading includes determining the state of charge value at least partially using the set of second-order differential capacity values.

In another embodiment of the first aspect, the one or more first battery cells consist of a single first battery cell, and the one or more second battery cells consist of a single second battery cell.

In another embodiment of the first aspect, the one or more first battery cells include a plurality of first battery cells electrically coupled in series and/or in parallel, and the one or more second battery cells include a plurality of second battery cells electrically coupled in series and/or in parallel.

In a second aspect, an in-situ method for determining a state of charge value of a battery pack including a plurality of battery cells includes (a) operating one or more first battery cells of the plurality of battery cells according to a first operating profile, (b) changing operation of the one or more first battery cells such that the battery operates according to a first test profile instead of according to the first operating profile, (c) obtaining a plurality of voltage readings from the one or more first battery cells while the one or more first battery cells operate according to the first test profile, (d) determining one or more differential capacity values at least partially using the plurality of voltage readings, and (e) determining a state of charge value of the one or more first battery cells at least partially using the one or more differential capacity values.

In an embodiment of the second aspect, the one or more differential capacity values include a plurality of first-order differential capacity values.

In another embodiment of the second aspect, the one or more differential capacity values further include at least one second-order differential capacity value.

In another embodiment of the second aspect, the method further includes operating at least one additional battery cell of the plurality of battery cells according to a compensation profile, while the one or more first battery cells operate according to the first test profile.

In another embodiment of the second aspect, obtaining the plurality of voltage readings from the one or more first battery cells includes obtaining at least one of the plurality of voltage readings while the one or more first battery cells are in a first test target zone.

In another embodiment of the second aspect, state of charge of the one or more first battery cells changes while the one or more first battery cells operate according to the test profile, and obtaining the plurality of voltage readings from the one or more first battery cells includes obtaining at least two of the voltage readings at different respective states of charge of the one or more first battery cells.

In a third aspect, an in-situ method for determining a state of charge value of a battery pack including a plurality of battery cells includes (a) using a first node controller, changing operation of one or more first battery cells of the plurality of battery cells to cause the one or more first battery cells to be in a first test target zone, while one or more second battery cells of the plurality of battery cells charge or discharge via a second node controller, (b) obtaining one or more first voltage readings from the one or more first battery cells, while the one or more first battery cells are in the first test target zone, and (c) determining a state of charge value of the one or more first battery cells at least partially using the one or more first voltage readings.

In an embodiment of the third aspect, the method further includes controlling the second node controller such that the one or more second battery cells operate according to a compensation profile while the one or more first battery cells are in the first test target zone.

In an embodiment of the third aspect, the method further includes (a) using the first node controller, changing operation of the one or more first battery cells to cause the one or more first battery cells to be in a second test target zone that is different from the first target test zone, while the one or more second battery cells charge or discharge via the second node controller, (b) obtaining one or more second voltage readings from the one or more first battery cells, while the one or more first battery cells are in the second test target zone, where determining the state of charge value of the one or more first battery cells at least partially using the one or more first voltage readings includes determining the state of charge value further using the one or more second voltage readings.

In an embodiment of the third aspect, the first test target zone corresponds to one or more of (a) a predetermined state of charge range of the one or more first battery cells and (b) a predetermined voltage range of the one or more first battery cells.

In an embodiment of the third aspect, the first test target zone corresponds to a state of charge range of the one or more first battery cells where state of charge of the one or more first battery cells can be estimated with an error that is less than a predetermined maximum value.

In an embodiment of the third aspect, the first test target zone corresponds to one of (a) state of charge of the one or more first battery cells being less than ten percent and (b) state of charge of the one or more first battery cells being greater than ninety percent.

BRIEF DESCRIPTION OF THE DRAWINGS

FIG. 9 is one example of a table comprising Coulomb count values, constant-current voltage values, first-order differential capacity values, and second-order differential capacity values, used in the method of FIG. 3.

FIG. 10 is one example of a look-up table comprising constant-current voltage values, first-order differential capacity values, second-order differential capacity values, and corresponding SOC values, used in the method of FIG. 3.

DETAILED DESCRIPTION

In the following description, numerous specific details are outlined to provide a thorough understanding of the presented concepts. In some examples, the presented concepts are practiced without some or all of these specific details. In other instances, well-known process operations have not been described in detail to not unnecessarily obscure the described concepts. While some concepts will be described in conjunction with the specific examples, it will be understood that these examples are not intended to be limiting.

Introduction

Many battery cell types have flat voltage profiles or at least large flat portions in their voltage profiles. These flat portions are often referred to as voltage plateaus or simply plateaus. Unfortunately, these flat portions present various challenges while determining cells' SOC. Specifically, voltage measurements are typically used as an indication of the SOC, e.g., a higher voltage representing a higher SOC and vice versa. However, in a flat portion of the voltage profile, the same voltage can represent a large SOC range resulting in inaccurate SOC determinations.

Some examples of cells with voltage plateaus include, but are not limited to, lithium iron phosphate (LFP)—graphite cells, lithium manganese oxide (LMO)-lithium titanate (LTO) cells, lithium cobalt phosphate cells, and lithium manganese phosphate cells. In these cells, neither positive active materials nor negative active materials have pronounced voltage signatures while ions are being incorporated and/or removed from these materials. Without being restricted to any particular theory, it is believed that the voltage profiles are primarily impacted by the electrode compositions. For example, a voltage profile in an LFP-graphite cell is dominated by the graphite signature. For purposes of this disclosure, unless specifically stated, a voltage profile refers to an OCV profile, CCV profile, or constant-power voltage (CPV) profile. Furthermore, because of small voltage variations, any constant-current charging/discharging examples (described below) also apply to constant-power charging/discharging.

Figure 1A:
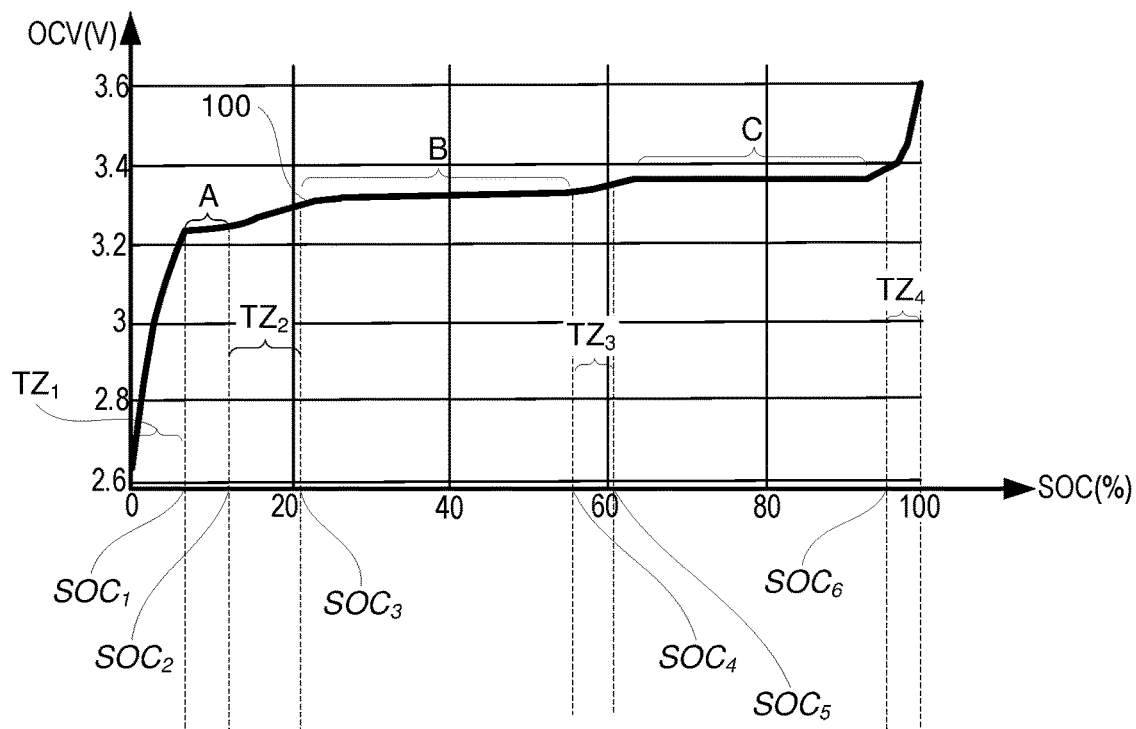
FIG. 1A is an example of an OCV profile for a cell with a graphite-based negative electrode and a lithium iron phosphate-based positive electrode.
Figure 1B:
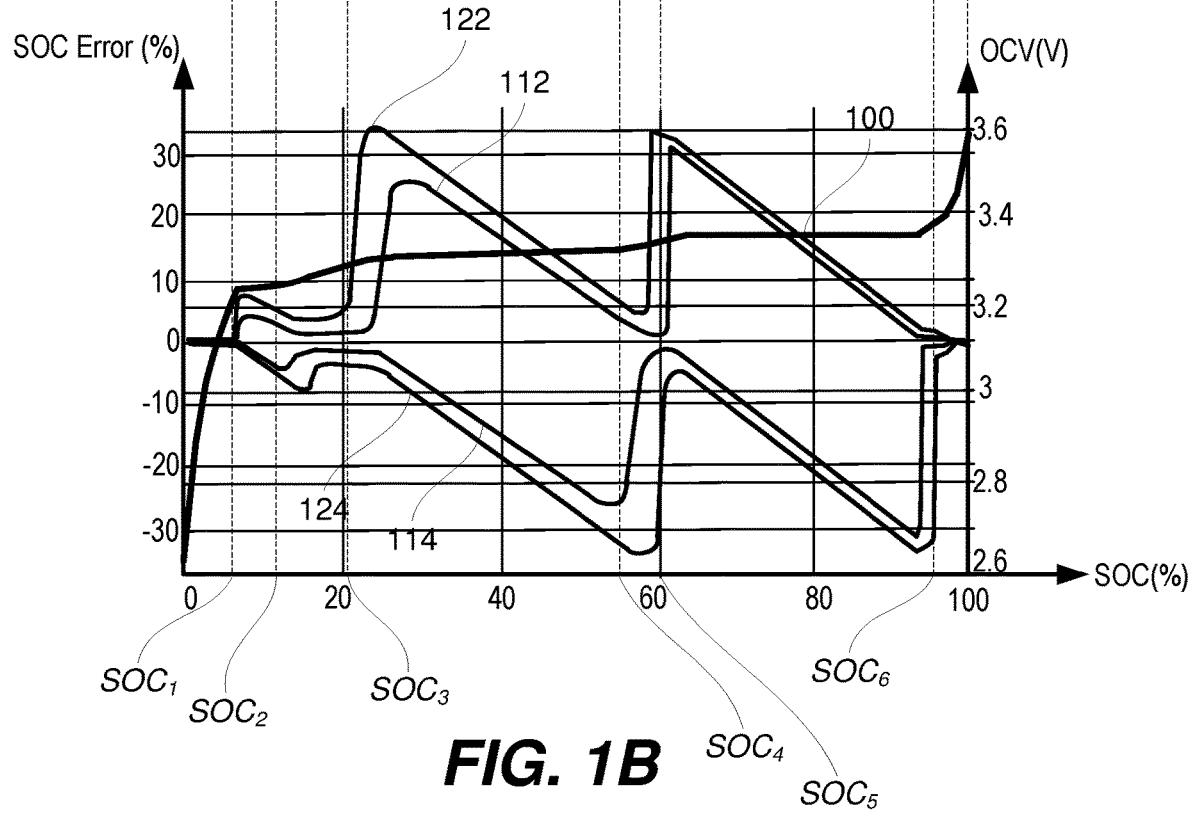
FIG. 1B is a plot illustrating SOC estimate errors, corresponding to the OCV profile in FIG. 1A, while using voltmeters with different accuracies.

FIG. 1A illustrates an example of OCV profile 100 for an LFP-graphite cell at 20° C. This profile example identifies various SOC values, separating voltage plateaus with more pronounced voltage signatures, which may be referred to as target zones. For example, below $SOC_1$ (about 7%), the OCV profile has a large slope. As the SOC increases above $SOC_1$, the OCV profile flattens ("A" plateau), at least until reaching $SOC_2$ (about 14%). As noted above, determining a SOC value in this portion of the OCV profile is challenging. A SOC estimate error depends on the slope of this profile as well as the accuracy of the measuring equipment (e.g., a voltmeter) as will now be described with reference to FIG. 1B. FIG. 1B illustrates SOC error plots as a function of the SOC value. These SOC error plots correspond to the OCV profile in FIG. 1A. Line 112 is a SOC error profile for voltmeter's accuracy error of +8 mV, line 114—voltmeter's error of −8 mV, line 122—voltmeter's error of +24 mV, and line 124—voltmeter's error of −24 mV. The voltmeter errors of +/−8 mV or +/−24 mV represent typical accuracies of voltage measurements in battery packs. In general, a smaller voltmeter's error corresponds to a smaller SOC error, e.g., lines 112 and 114 have smaller deviations from the 0-error line (X-axis) than lines 122 and 124. For example, all of these SOC error lines are near zero for SOC values below $SOC_1$, where the slope is significant. Furthermore, a larger slope of the OCV profile (in FIG. 1A) corresponds to a smaller SOC error. As a result, zones of the OCV profile with large slopes are more desirable for determining a SOC value. These zones may be referred to as target zones. More specifically, the region between the SOC of 0 and $SOC_1$ may be referred to as a first target zone ($TZ_1$). $TZ_1$ may be identified using a corresponding OCV range, e.g., less than 3.2V. Referring to the region between $SOC_1$ and $SOC_2$ where OCV profile 100 has the "A" plateau, SOC errors are higher than in the first target zone. As such, the region between $SOC_1$ and $SOC_2$ may be excluded from target zones.

Referring to FIG. 1A, the slope of the OCV profile increases above $SOC_2$ and then flattens again at $SOC_3$ (about 21%). This region (between $SOC_2$ and $SOC_3$) may be referred to as a second target zone ($TZ_2$). Referring to FIG. 1B, SOC error within the second target zone are smaller than, e.g., the region between $SOC_1$ and $SOC_2$. The second target zone is followed by another plateau ("B" plateau), between $SOC_3$ and $SOC_4$ (about 55%), which is followed by a third target zone ($TZ_3$), between $SOC_4$ and $SOC_5$ (about 65%). The remaining OCV profile comprises yet another plateau ("C" plateau), between $SOC_5$ and $SOC_6$ (about 95%), which is followed by a fourth target zone ($TZ_4$), between $SOC_6$ and 100% SOC.

Overall, FIG. 1B illustrates that SOC errors are the highest in the plateaus, e.g., up to 35%, referring line 122 at the SOC of about 22% or line 124 at the SOC of about 58%. On the contrary, sharp transitions in the OCV profile (e.g., below 5% SOC, around 20% SOC, around 60% SOC, and above 95% SOC) correspond to small SOC estimation errors. Without being restricted to any particular theory, it is believed that these sharp OCV transitions correspond to the solid solutions in graphite during charge-discharge of the cell (i.e., as lithium enters and leaves the graphite structures). Excessive SOC estimate errors (e.g., greater than +/−20%) are generally not desirable or even acceptable for many applications. At the same time, these plateaus (where SOC estimate errors are high) cover a large portion of the overall (0-100%) SOC range. These plateaus presented major SOC estimation challenges in the past.

Figure 1C:
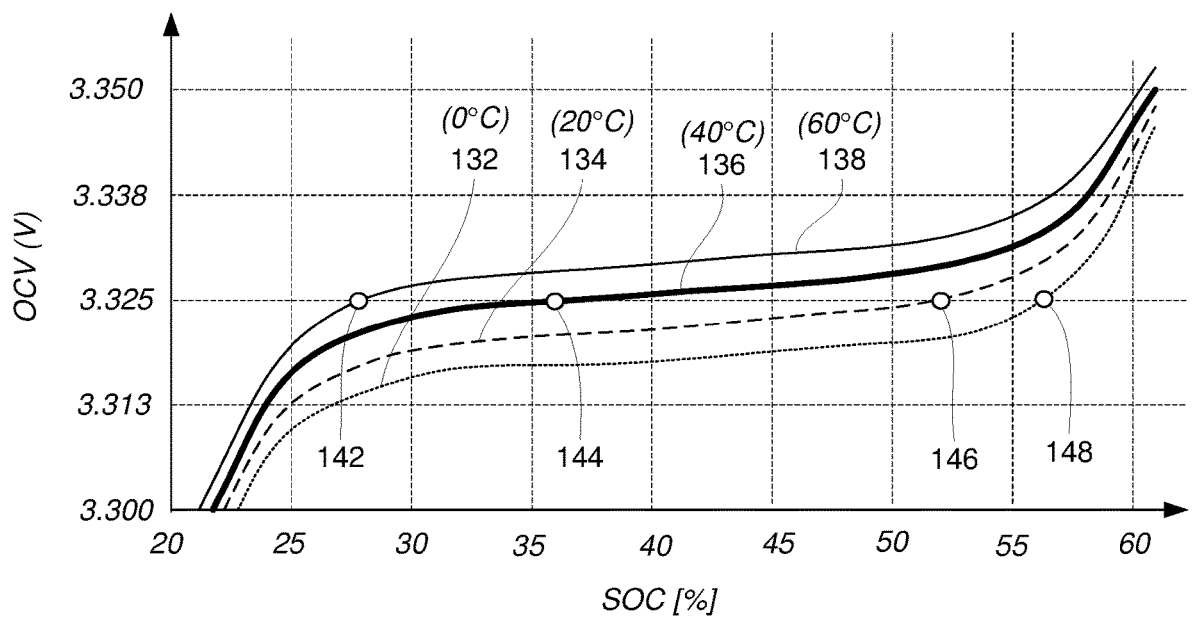
FIG. 1C are examples of three OCV profiles for the same cell type at different temperatures.

Furthermore, voltage profiles typically vary with temperature. FIG. 1C illustrates OCV profiles for the same LFP-graphite cell at four different temperatures. Line 132 corresponds to the cell at 0° C., line 134—at 20° C., line 136—at 40° C., and line 138—at 60° C. As a result of this temperature dependence, the same OCV value can correspond to different SOCs at different temperatures. For example, FIG. 1C identifies four SOC points corresponding to the same OCV of 3.325V. Point 142 represents a SOC of about 28% at 80° C., point 144—a SOC of about 36% at 40° C., point 146—a SOC of about 52% at 20° C., and point 148—a SOC of about 57% at 0° C. As such, temperature variations present additional challenges in SOC estimates. At the same time, temperature fluctuations are common in battery applications and can be caused by environmental conditions, battery operating conditions (e.g., charge/discharge currents), and the like.

Figure 1D:
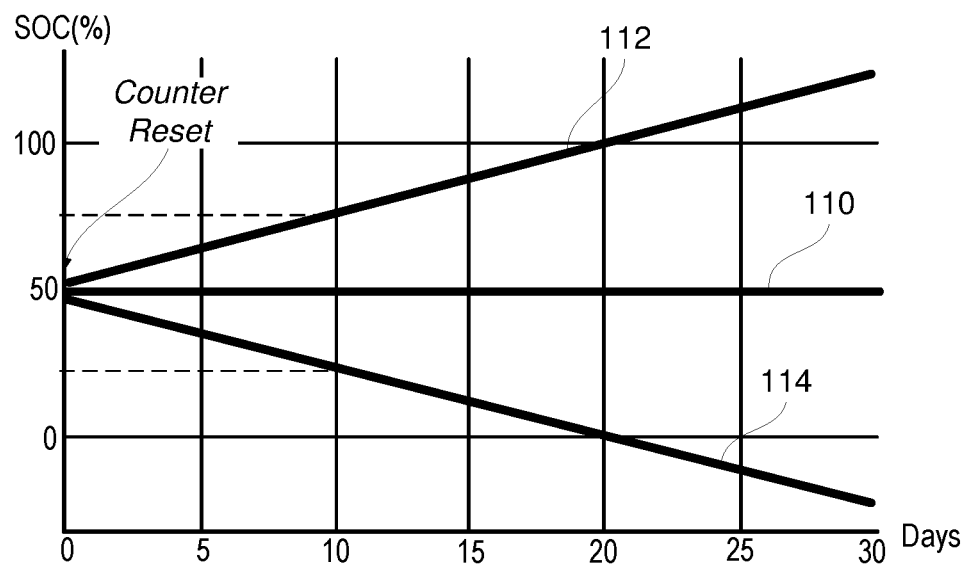
FIG. 1D is an example of a SOC estimate drift for a Coulomb counter over some time.

Coulomb counters have been used to track SOC estimates of battery cells. For example, a Coulomb counter is initialized using a SOC value, which is identified independently from the Coulomb counter. Furthermore, the cell operating capacity (identified as a difference between 0% SOC to 100% SOC) is provided to the counter. The Coulomb counter then determines a SOC value based on monitoring or, more specifically, integrating the electrical current through the cell over time, which is referred to as a Coulomb count. However, SOC values produced by Coulomb counters are prone to drifting due to various factors, e.g., measurement offset errors, gain errors, and other such issues. FIG. 1D illustrates an example of the SOC estimate drift over time for a typical Coulomb counter. Specifically, line 110 represents a cell's actual SOC, line 112 represents a positive drift, while line 114 represents a negative drift. In this example, the drift is as much as 20% after 10 days of typical cell operation. Of course, one having ordinary skill in the art would appreciate that the amount of drift depends on the cell operation (e.g., charge-discharge currents and duration), Coulomb counter accuracy, and other factors. With the −20% drift, the cell may be operated between +20% and +120% of the operating capacity, potentially overcharging the cell, which is highly undesirable and unsafe. Similarly, with the +20% drift, the cell may be operated between −20% and +80% of the operating capacity, potentially discharging the cell below an acceptable level, which is also highly undesirable and can be destructive to the cell. As such, SOC estimates of Coulomb counters need to be periodically updated using external data. This update may involve replacing the SOC estimate of a Coulomb counter with a new SOC value, e.g., obtained independently. Alternatively, the update may involve combining the SOC estimate of a Coulomb counter with a new SOC value (e.g., taking an average). These examples are further described below.

Methods and systems described herein utilize the unique architecture examples of battery packs, which enable these Coulomb counter updates in-situ, e.g., while the pack remains operational. For example, a method may involve changing the external cell current through a tested battery cell in accordance with a test profile. Additional battery cells, in the same battery pack, continue to charge or discharge in accordance with a power compensation profile, that is different from the test profile and selected to ensure that the voltage of the battery pack is substantially unchanged while changing the external cell current through the tested cell. For purposes of this disclosure, the term "substantially unchanged" is defined as a change of less than 10% or even less than 5% or even less than 2%. It should be noted that the substantially unchanged is in reference to the operating voltage of the battery pack, which can be constant or can be changed in accordance with the power demand from the battery pack. Additionally, the term "external cell current" in the context of a battery cell refers to an electrical current flowing through the battery cell via an electrical circuit including one or more elements external to the battery cell.

Methods and systems described herein enable Coulomb counter updates to be performed at effectively any SOC of the pack, regardless of the presence of plateaus in voltage profiles. For example, different cells of the same battery pack may be purposely brought to different SOCs (disbalanced) at least during some operations of these methods. More specifically, one or more tested cells are brought to their respective target zones (and away from plateaus) identified in their voltage profiles. In some examples, cells may be controllably charged or discharged at a constant current or a constant power while obtaining a set of voltage values and determining one or more differential capacities (e.g., a first-order differential capacity, a second-order differential capacity, and so on) from these voltages. These differential capacities provide additional references for estimating the current cell SOC, thereby increasing the accuracy of this estimate and enabling these estimates to be performed even when the cell's SOC is away from target zones. Additionally, the differential capacities are insensitive to absolute voltage measurement errors. The battery pack's architecture will now be described with reference to FIGS. 2A-2J and further below with reference to FIGS. 16-35.

Examples of Battery Pack Architecture

Figure 2A:
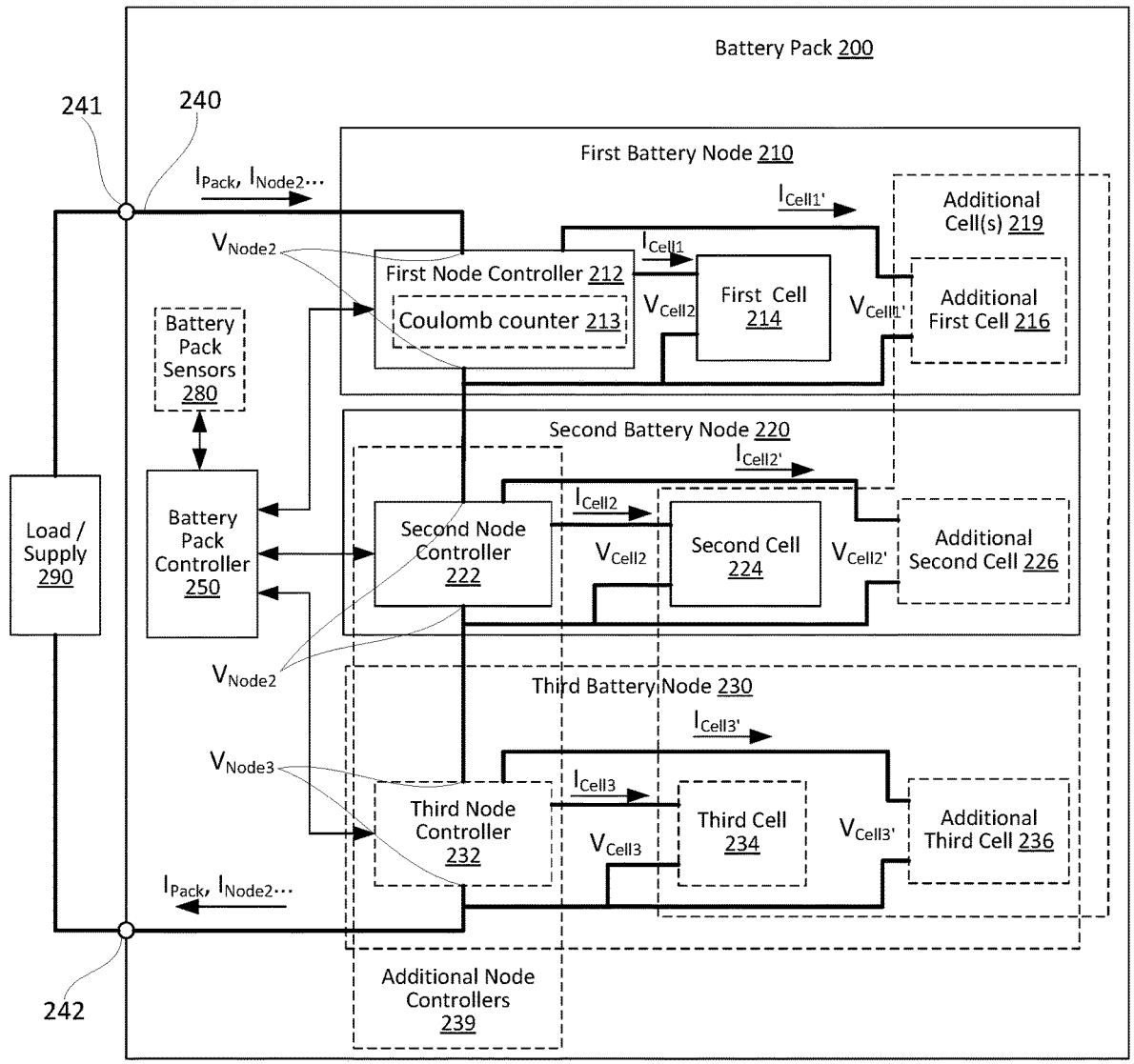
FIG. 2A is a schematic block diagram of a battery pack, illustrating different components of the battery pack, in accordance with some examples.

FIG. 2A is a schematic block diagram of battery pack 200, configured to determine SOC values of individual battery cells or groups of battery cells while battery pack 200 is operational, i.e., in situ. Battery pack 200 comprises at least two battery nodes, e.g., first battery node 210 and second battery node 220. In some examples, battery pack 200 comprises one or more additional battery nodes, such as third battery node 230. Each battery node comprises a node controller and at least one battery cell, e.g., first battery node 210 comprises first node controller 212 and first battery cell 214, second battery node 220 comprises second node controller 222 and second battery cell 224, and third battery node 230, when present, comprises third node controller 232 and third battery cell 234. Multiple node controllers are connected in series (shown) and/or parallel by bus 240. The ends of bus 240 are coupled to form battery pack terminals, such as first battery pack terminal 241 and second battery pack terminal 242. During operation of battery pack 200, load/supply 290 is connected to the battery pack terminals to supply power (e.g., using a direct current (DC) to DC converter) to battery pack 200 and/or to receive power from battery pack 200.

Referring to FIG. 2A, in some examples, at least one battery node comprises one or more additional battery cells, which are optional. For example, first battery node 210 is shown with additional first battery cell 216, independently connected to and controlled by first node controller 212. Similarly, second battery node 220 is shown with additional second battery cell 226, and third battery node 230 is shown with additional third battery cell 236. In general, each battery node comprises any number of battery cells, e.g., one, two, three, four, or more.

Various examples of methods for determining SOC values are described below from the perspective of first battery cell 214. As such, other cells in battery pack 200 may be referred to as additional battery cells 219. These additional battery cells 219 are used to compensate for any power output variations associated with first battery cell 214 during its testing. The operation of additional battery cells 219 is performed using one or more additional node controllers 239 (e.g., second node controller 222 and third node controller 232) in FIG. 2A. These additional node controllers 239 are connected in series with each other and with first node controller 212, at least in the example shown in FIG. 2A.

Referring to FIG. 2A, battery pack 200 also comprises battery pack controller 250, which is communicatively coupled to each node controller and controls the operation of each node controller. For example, battery pack controller 250 instructs first node controller 212 to charge or discharge first battery cell 214 at a constant current and/or until the estimated OCV of first battery cell 214 is at a test OCV value as further described below. Battery pack controller 250 is also configured to maintain the power output of battery pack 200 such that this power output and/or the pack voltage is not impacted by various operations used for updating SOC estimates as further described below with reference to FIG. 3.

Referring to FIG. 2A, in some examples, battery pack 200 also comprises battery pack sensors 280, communicatively coupled to battery pack controller 250. Some examples of battery pack sensors 280 include but are not limited to one or more thermocouples (e.g., thermally coupled to individual battery cells), Hall effect sensors, voltage probes (e.g., electrically coupled to terminals of each battery cell), current shunts, ultrasound sensors, pressure sensors, magnetic sensors, piezo sensors, gas sensors, and others. In some examples, the output of the sensors may be used to trigger the process of updating the SOC value on a Coulomb counter. Furthermore, the output of the sensors may be used during various operations of this process as further described below with reference to FIG. 3.

In some examples, each node controller comprises a Coulomb counter for each battery cell or a group of battery cells connected to this node controller. For example, FIG. 2A illustrates Coulomb counter 213 of first battery cell 214, provided as a part of first node controller 212. Coulomb counter 213 maintains the SOC value of first battery cell 214 by aggregating the charge and discharge currents flowing to first battery cell 214. In some examples, Coulomb counter 213 collectively or independently maintains the SOC values of first battery cell 214 and additional first battery cell 216. Additional features of Coulomb counter 213 will now be described with reference to FIG. 2B.

Figure 2B:
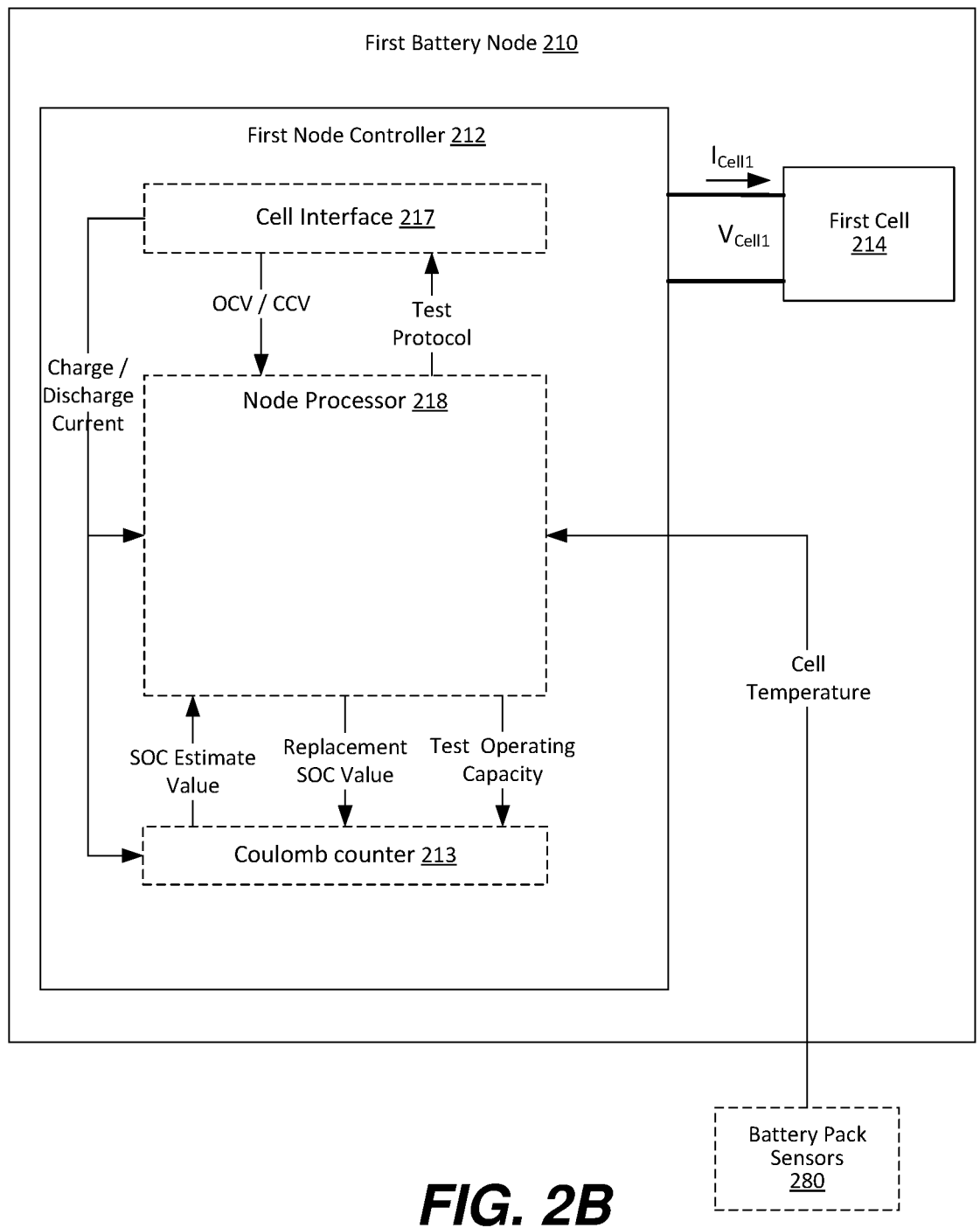
FIG. 2B is a schematic block diagram of one battery node in the battery pack of FIG. 2A, illustrating different components of the nodes, in accordance with some examples.

Specifically, FIG. 2B is a schematic block diagram of first battery node 210, showing first battery cell 214 connected and controlled by first node controller 212. First node controller 212 comprises cell interface 217, configured to control the charge-discharge current of first battery cell 214, to measure the voltage of first battery cell 214 (e.g., OCV, CCV), and to communicate the charge-discharge current and the voltage to other components of first node controller 212. For example, cell interface 217 may charge or discharge first battery cell 214 until the estimated OCV of first battery cell 214 is at some test OCV value, stop the external current through first battery cell 214 to measure OCV, and/or charge and/or discharge first battery cell 214 at a constant current while measuring the CCV of first battery cell 214. First node controller 212 also comprises node processor 218, which controls the operation of cell interface 217, e.g., setting the charge-discharge current of first battery cell 214. Furthermore, node processor 218 also receives voltage measurements (e.g., OCV, CCV) from cell interface 217 and uses these voltage measurements to update the SOC estimate. In some examples, node processor 218 also receives various inputs from battery pack sensors 208, such as the temperature of first battery cell 214.

Finally, first node controller 212 also comprises Coulomb counter 213, which maintains (e.g., continuously calculates) the SOC estimate based on the charge-discharge current (e.g., received from cell interface 217). Coulomb counter 213 also receives new SOC estimates from node processor 218, e.g., to replace the current SOC estimate available from Coulomb counter 213. In some examples, Coulomb counter 213 supplies the current SOC estimate to node processor 218 to determine a new SOC estimate. It should be noted that these components of first node controller 212 may be implemented in hardware and/or software.

Figure 2C:
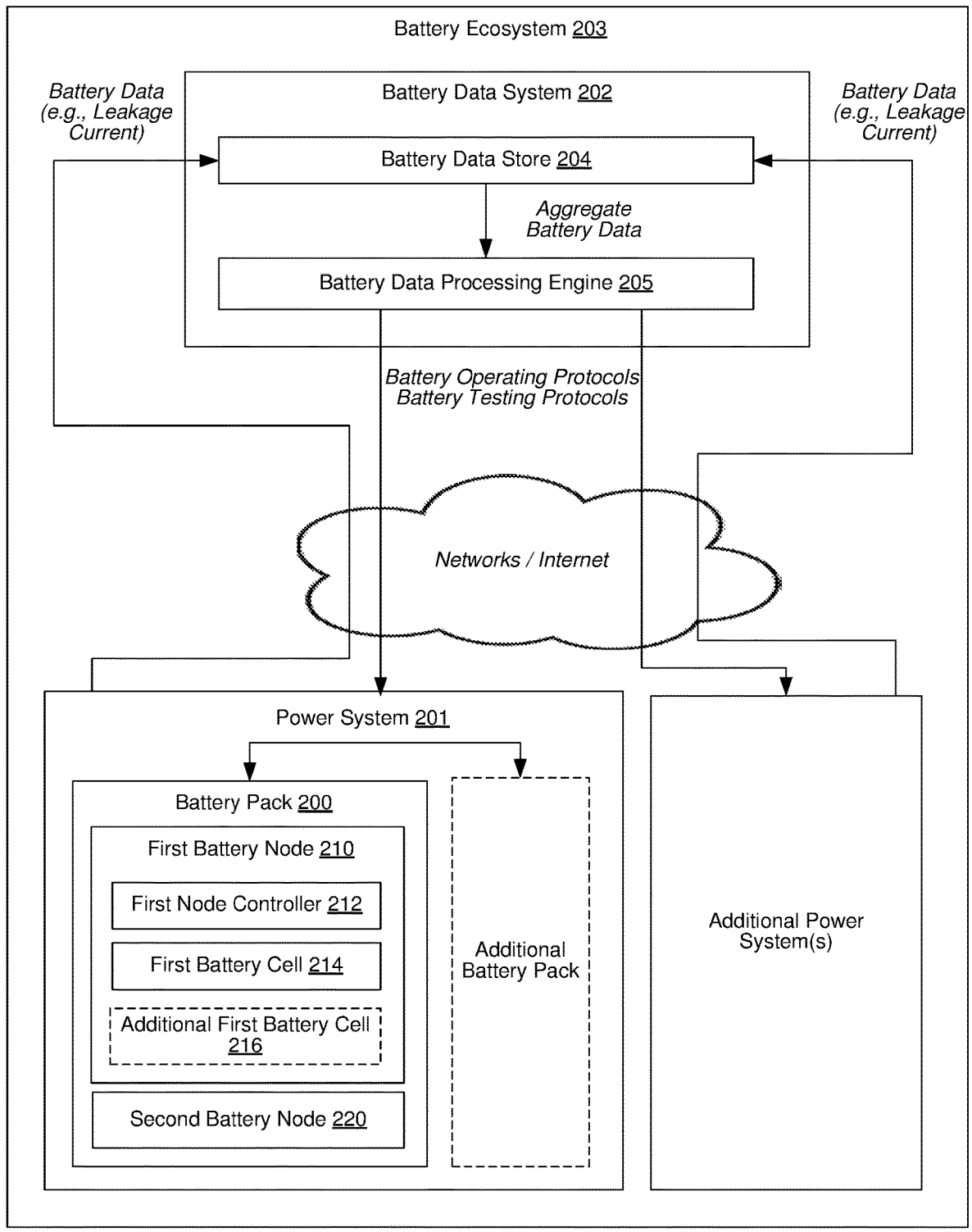
FIG. 2C is a schematic block diagram of a battery ecosystem, comprising the battery pack of FIG. 2A, in accordance with some examples.

FIG. 2C is a schematic block diagram of an example of battery ecosystem 203, which comprises battery pack 200 of FIG. 2A. Battery packs are often used as parts of various higher-level power systems, such as electric vehicles, stationary energy storage systems, grid energy storage, and others. In some examples, one power system comprises multiple battery packs. Battery pack 200 is a part of power system 201, which may comprise one or more optional additional battery packs. Any number of packs in a power system and any number of power systems within a battery ecosystem are within the scope of this disclosure. Battery pack 200 comprises multiple battery nodes, such as first battery node 210 and second battery node 220, as further described above with reference to FIG. 2A.

Battery ecosystem 203 also comprises battery data system 202, which is communicatively coupled (e.g., via various networks and/or the internet) to each of the power systems. Battery data system 202 comprises battery data store 204 and battery data processing engine 205. Battery data store 204 is configured to receive battery data (e.g., SOC estimates) from various power systems and store this battery data. This battery data, in battery data store 204, may be referred to as aggregate battery data. Battery data store 204 also provides this aggregate battery data to battery data processing engine 205 for various types of analysis, such as deterministic analysis, outlier detection, classification, linear regression, forecasting histogram generation, and others. In some examples, battery data processing engine 205 comprises a self-learning module.

Figure 2D:
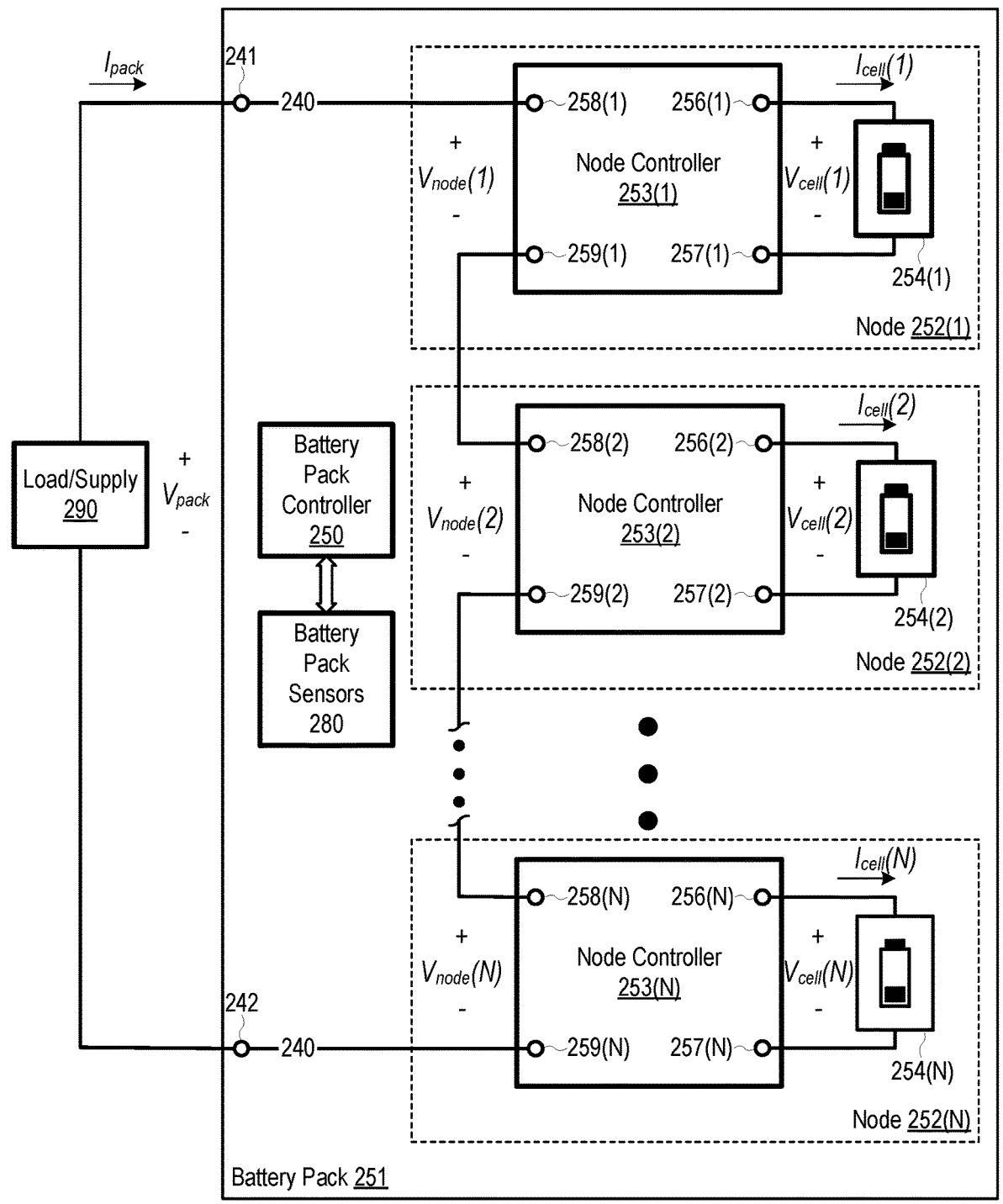
FIG. 2D is a schematic block diagram of one example embodiment of the FIG. 2A battery pack including a plurality of battery nodes electrically coupled in series.

FIG. 2D is a schematic block diagram of a battery pack 251, which is one example embodiment of battery pack 200 of FIG. 2A. Battery pack 251 includes N battery nodes 252, an instance of battery pack controller 250, and an instance of battery pack sensors 280, where N is an integer greater than one. In this document, specific instances of an item may be referred to by use of a numeral in parentheses (e.g., battery node 252(1)) while numerals without parentheses refer to any such item (e.g., battery nodes 252). Connections between battery pack controller 250 and battery nodes 252 are not shown in FIG. 2D for illustrative clarity.

Each battery node 252 includes a node controller 253 and a battery cell assembly 254. Each battery cell assembly 254 includes one or more battery cells. Specifically, a battery cell assembly 254 may consist of a single battery cell, or a battery cell assembly 254 may include a plurality of battery cells electrically coupled in series and/or in parallel. Configurations of battery cell assemblies 254 may vary among battery nodes 252. For example, battery cell assembly 254(1) may include two battery cells electrically coupled in series while battery cell assembly 254(2) may include four battery cells electrically couple in series.

Each battery cell assembly 254 is electrically coupled to power input ports 256 and 257 of a respective node controller 253. Power output ports 258 and 259 of node controllers 253 are electrically coupled in series between first battery pack terminal 241 and second battery pack terminal 242. Specifically, power output port 259(1) of node controller 253(1) is electrically coupled to power output port 258(2) of node controller 253(2), power output port 259(2) of node controller 253(2) is electrically coupled to power output port 258(3) of node controller 253(3) (not explicitly shown in FIG. 2D), and so on. Power output port 258(1) of node controller 253(1) is electrically coupled to first battery terminal 241, and power output port 259(N) of node controller 253(N) is electrically coupled to second battery terminal 242. The set of battery nodes 252 electrically coupled in series via power output ports 258 and 259 may be referred to as a "stack" of battery nodes 202. Battery pack 251 may be modified to include one or more additional stacks (not shown), such that all stacks are electrically coupled in parallel with each other, without departing from the scope hereof.

Figure 2E:
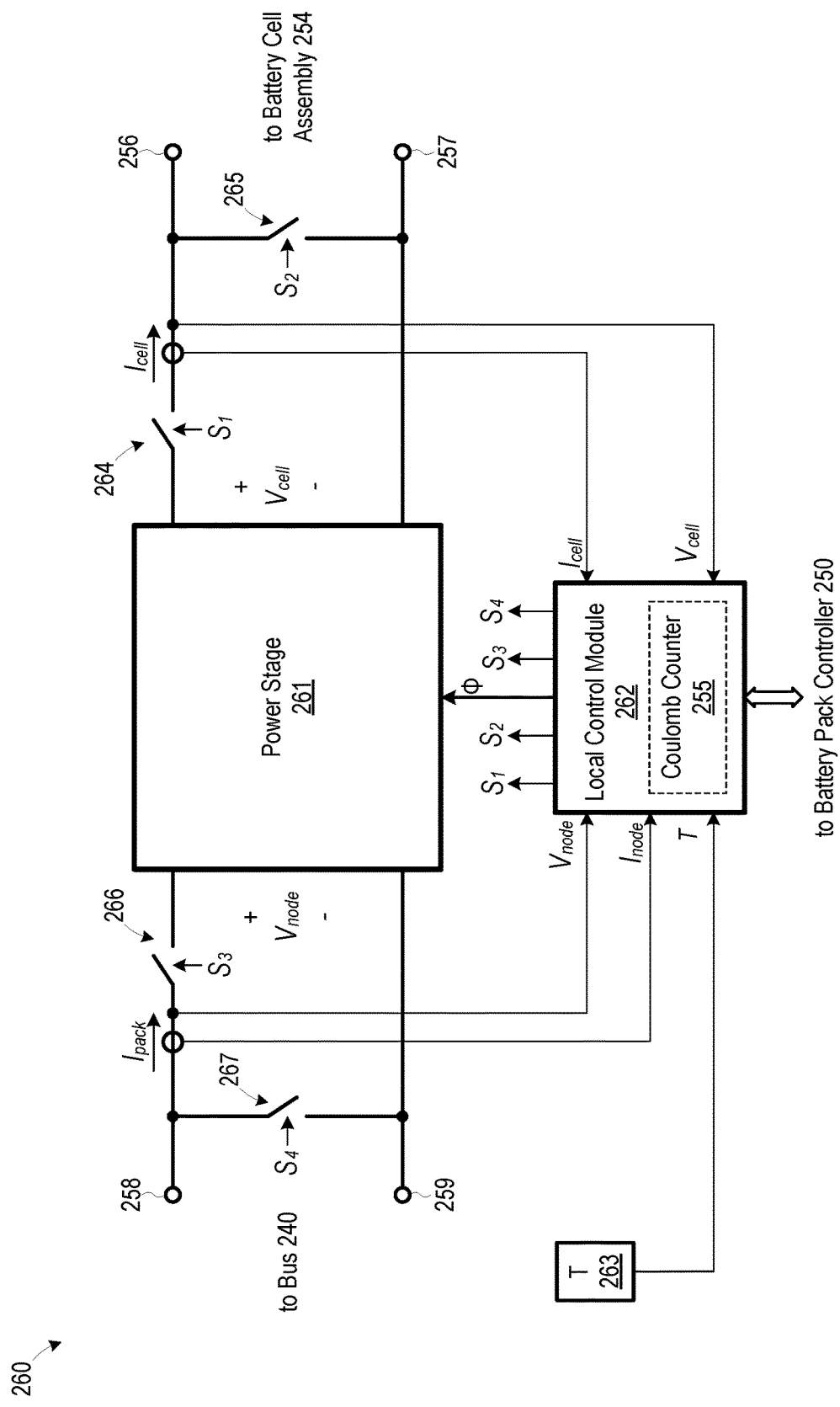
FIG. 2E is a schematic block diagram of one example embodiment of a node controller of the FIG. 2D battery pack.

Each node controller 253 buffers its respective battery cell assembly 254 from bus 240. FIG. 2E is a schematic block diagram of a node controller 260, which is one possible embodiment of a node controller 253. Node controller 260 includes a power stage 261, a local control module 262, a temperature sensor 263, a first switching device 264, a second switching device 265, a third switching device 266, and a fourth switching device 267. In some alternate embodiments, temperature sensor 263 is separate from node controller 260, or temperature sensor 263 is omitted. Additionally, one or more of first switching device 264, second switching device 265, third switching device 266, and fourth switching device 267 may be omitted, such as in embodiments where the functionality realized by the switching devices is not required, or in embodiments where the functionality realized by the switching devices can be achieved by switching devices (not shown) within power stage 261. In this document, the term "switching device" includes, but is not limited to, one or more transistors, e.g., field effect transistors (FETs), bipolar junction transistors (BJTs), and/or insulated gate bipolar junction transistors (IGBTs), as well as one or more relays, contactors, or similar devices that are capable of opening and closing a circuit in response to a signal. Additionally, one or more of switching devices 264, 265, 266, and 267 can be replaced with, or supplemented by, one or more diodes, without departing from the scope hereof.

Power stage 261 is electrically coupled between (a) power input ports 256 and 257 and (b) power output ports 258 and 259. Power stage 261 is configured to perform one or more of the following power conversion functions, in response to switching signals φ generated by local control module 262: (a) transform voltage $V_{cell}$ across power input ports 256 and 257 to voltage $V_{node}$ across power output ports 258 and 259, (b) transform voltage $V_{node}$ across power output ports 258 and 259 to voltage $V_{cell}$ across power input ports 256 and 257, (c) transform current $I_{cell}$ flowing through battery cell assembly 254 and power input ports 256 and 257 to current $I_{pack}$ flowing through power output ports 258 and 259 and bus 240, and (d) transform current $I_{pack}$ flowing through power output ports 258 and 259 and bus 240 to current $I_{cell}$ flowing through battery cell assembly 254 and power input ports 256 and 257. In some embodiments, power stage 261 includes one or more of a non-isolated DC-to-DC switching converter, an isolated DC-to-DC switching converter, and a linear regulator.

Figure 2F:
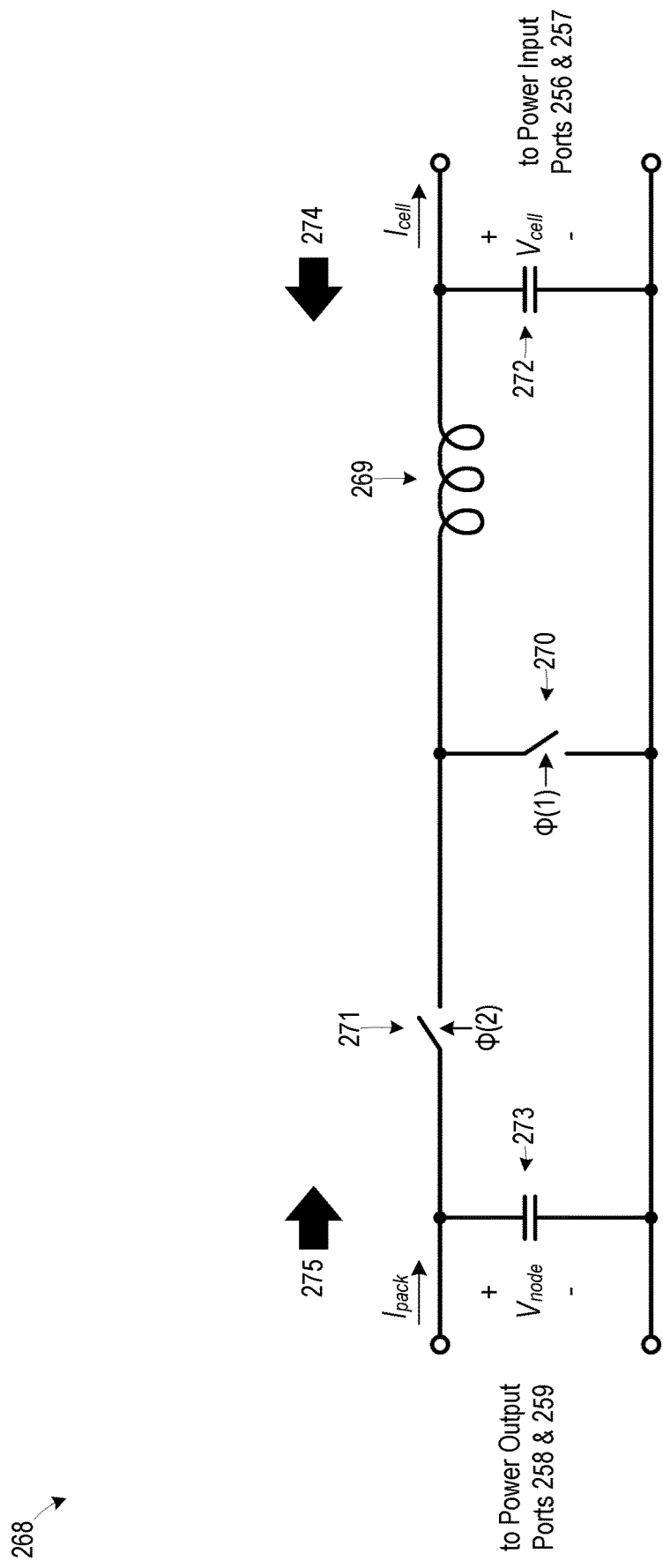
FIG. 2F is a schematic diagram of one example embodiment of a power stage of the FIG. 2E node controller.

For example, FIG. 2F is a schematic diagram of a power stage 268, which is one possible embodiment of power stage 261 of FIG. 2E. Power stage 268 includes an inductor 269, a first switching device 270, a second switching device 271, a first capacitor 272, and a second capacitor 273. Although inductor 269 is depicted as being a discrete element, inductor 269 could be distributed inductance of a circuit including power stage 268. First switching device 270 and second switching device 271 are respectively controlled by switching signals φ(1) and φ(2) generated by local control module 262 of FIG. 2E. Magnitude of voltage $V_{node}$ is greater than or equal to magnitude of voltage $V_{cell}$ in power stage 268. Power stage 268 increases voltage magnitude from $V_{cell}$ to $V_{node}$ and supports bidirectional current flow. Electric power can flow in a direction 274, e.g., when a battery cell assembly 254 electrically coupled to power stage 268 is discharging into load/supply 290. Electric power can also flow in direction 275, e.g., when load/supply 290 is charging a battery cell assembly 254 electrically coupled to power stage 268.

Referring again to FIG. 2E, local control module 262 is configured to generate switching signals φ in response to control signals received from battery pack controller 250. Additionally, local control module 262 is optionally configured to monitor one or more of the following parameters and generate feedback signals to convey these monitored parameters to battery pack controller 250: (a) temperature (T) of a battery cell assembly 254 electrically coupled to node controller 260, (b) voltage $V_{cell}$, (c) current $I_{cell}$, (d) voltage $V_{node}$, and (e) current $I_{pack}$. Local control module 262 is optionally further configured to include additional information in feedback signals transmitted to battery pack controller 250, such as information on a respective battery cell assembly 254 (e.g., battery cell assembly 254 type, manufacturing information for battery cell assembly 254, operating history for battery cell assembly 254, and/or maintenance history for battery cell assembly 254). Furthermore, local control module 262 is configured to generate signals S1, S2, S3, and S4, for respectively controlling switching devices 264, 265, 266, and 267, in response to control signals from battery pack controller 250. Moreover, local control module 262 includes a Coulomb counter 255, which is an embodiment of Coulomb counter 213 of FIG. 2A.

Local control module 262 causes switching device 264 to open, for example, to isolate power stage 261 from its respective battery cell assembly 254. Local control module 262 may cause switching device 265 to close to discharge a battery cell assembly 254 electrically coupled to power stage 261, such as in an emergency, in response to determining that the battery cell assembly 254 is unsafe, or in preparation for electric power system maintenance. In some embodiments, a resistor (not shown) is electrically coupled in series with switching device 265 to facilitate a controlled discharge of the battery cell assembly 254, or switching device 265 is replaced with a current source configured to perform a controlled discharge of the battery cell assembly 254. Local control module 262 causes switching device 266 to open, for example, to isolate power stage 261 from bus 240. Additionally, local control module 262 may cause switching device 267 to close to enable current $I_{pack}$ to bypass power stage 261 in a bypass operating mode of node controller 260.

Referring again to FIG. 2D, inclusion of a respective node controller 253 between each battery assembly 254 and bus 240 buffers battery cell assemblies 254 from bus 240, as discussed above. Consequently, battery pack controller 250 can individually control charging and discharging of each battery cell assembly 254, thereby enabling battery pack controller 250 to help maximize battery cell assembly 254 throughput, battery cell assembly 254 lifetime, and battery cell assembly 254 safety. Additionally, certain embodiments of battery pack controller 250 are configured to control operation of node controllers 253 in a matter which controls a respective node contribution voltage or power of each battery cell assembly 254, e.g., $V_{node}$ of each node controller 253, where node contribution voltages $V_{node}$ sum to bus voltage $V_{pack}$ across battery pack 251. As a result, a weaker battery cell assembly 254 will not limit performance of a stronger battery cell assembly 254 in battery pack 251. In a conventional battery pack where battery cell assemblies are directly connected in series, in contrast, battery pack performance is limited by a weakest battery cell assembly in the pack. Furthermore, some embodiments of battery pack controller 250 are configured to control operation of node controllers 253 to control current $I_{pack}$ flowing through node controller power output ports 258 and 259.

Additionally, battery pack controller 250 can individually control charging and discharging of each battery cell assembly 254 to achieve a test profile of one or more battery cell assemblies, such as for updating a Coulomb counter, while operating one or more other battery cell assemblies 254 according to a power compensation profile, so that battery pack 251 continues to operate according to an operating profile. For example, battery pack controller 250 can control a power stage 261 of a given node controller 260 to cause a battery cell assembly 254 under test to operate according to a test profile in a constant current mode, a constant power mode, or in an open circuit mode, for measuring CCV, CPV, or OCV, of the battery cell assembly 254, respectively. Additionally, battery pack controller 250 can control the respective power stage 261 of one or more other node controllers 253 to operate according to a power compensation profile to compensate for the battery cell assembly 254 under test operating according to the test profile, so that overall battery pack 251 operation is unchanged and the battery pack continues to operate according to an operating profile. Furthermore, battery pack controller 250 can control respective power stages 261 of node controllers 250 to all return battery cell assemblies 254 to a nominal state of charge after execution of the test profile on the battery cell assembly under test.

Figure 2G:
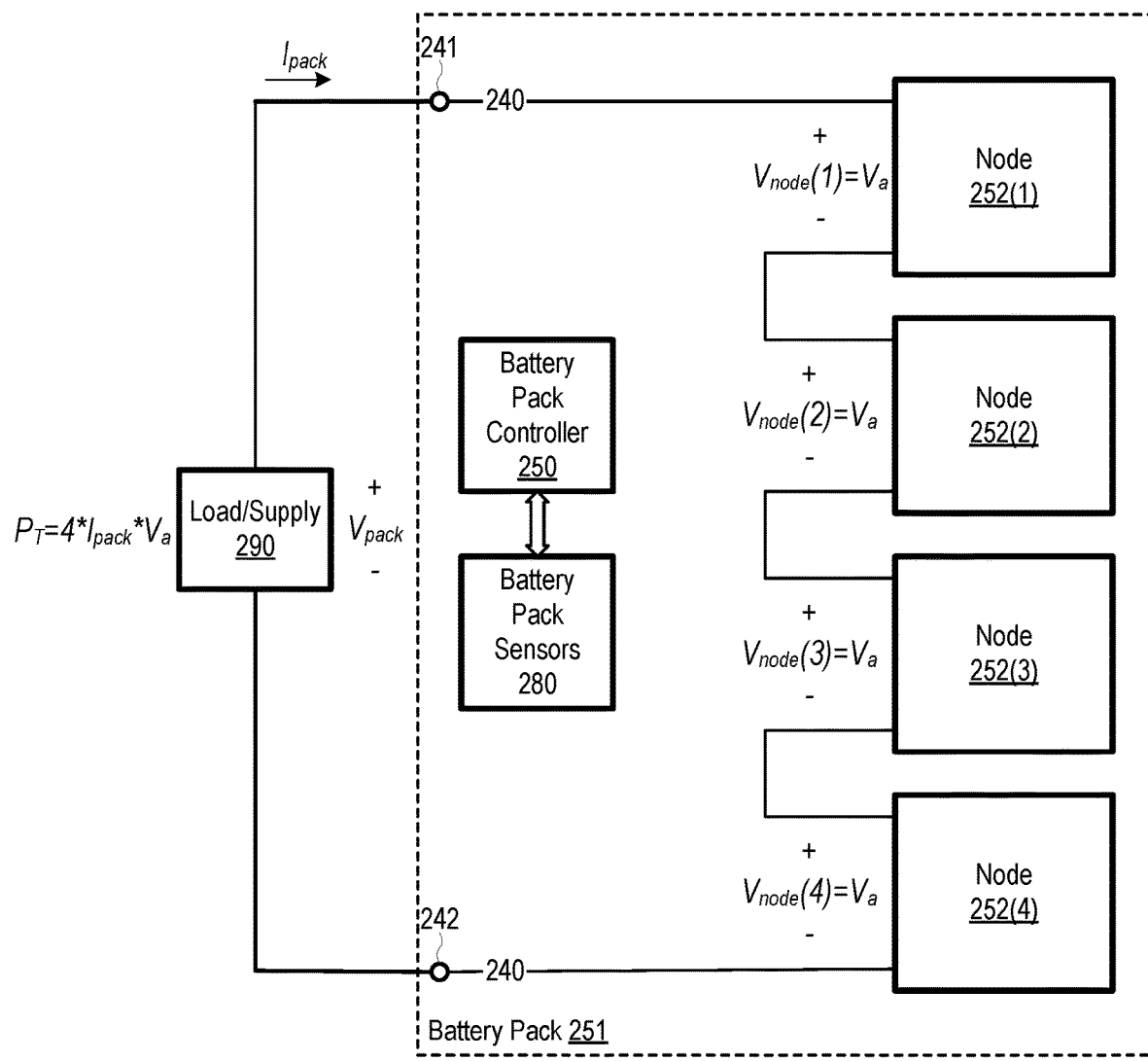
FIG. 2G is a schematic block diagram of the FIG. 2D battery pack illustrating an example operating scenario.

For instance, consider an example operating scenario illustrated in FIG. 2G where N is equal to four and a voltage $V_{node}$ across each battery node 252 is equal to $V_a$. Details of battery nodes 252 are not shown in FIG. 2G for illustrative clarity. A current $I_{pack}$ flows through each battery node 252, and each battery node 252 therefore has a respective node power contribution P node defined by $P_{node}=I_{pack}*V_a$. The node power contributions will be positive in a charging operating mode of battery pack 251, and the node power contributions will be negative in a discharging operating mode of battery pack 251. Additionally, a total power contribution Prof battery pack 251 is defined as $P_T=4*I_{pack}*V_a$, where $P_T$ is positive in a charging operating mode of battery pack 251, and $P_T$ is negative in a discharging operating mode of battery pack 251. It should be noted that battery nodes 252 equally share in total power contribution $P_T$ in this example scenario.

Figure 2H:
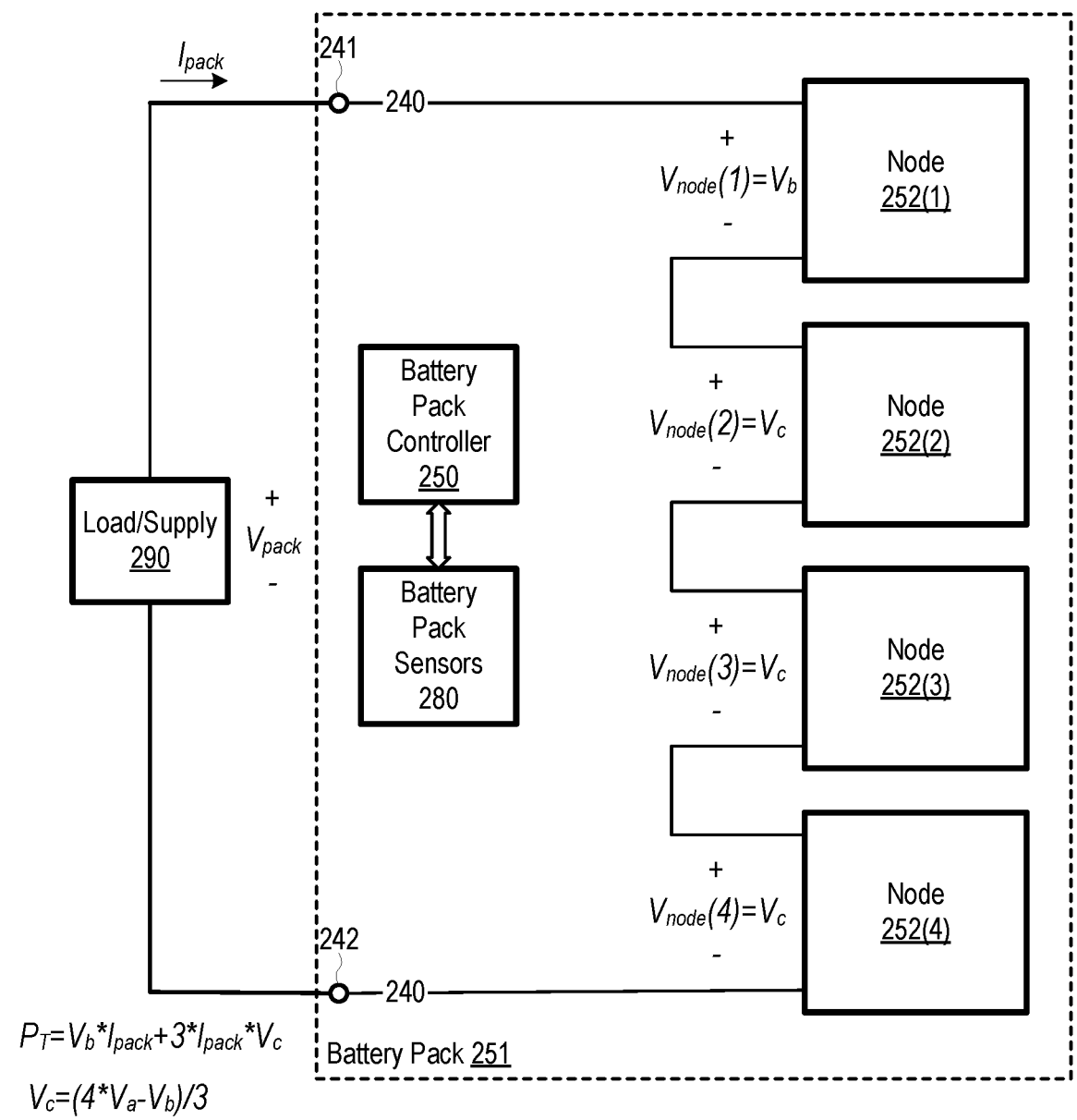
FIG. 2H is a schematic block diagram of the FIG. 2D battery pack illustrating an example operating scenario where a test profile is applied to a battery node.

Now consider an example operating scenario illustrated in FIG. 2H where a test profile is applied to battery node 252(1) such that a power contribution of the battery node changes, as reflected by voltage $V_{node}(1)$ changing from $V_a$ to $V_b$. One example of the test profile includes changing rate of charge/discharge of battery cell assembly 254(1) of battery node 252(1) so that SOC of the battery cell assembly reaches a target zone, e.g., $TZ_1$, $TZ_2$, $TZ_3$, or $TZ_4$ of FIG. 1A. Another example of the test profile includes temporarily terminating charging/discharging of battery cell assembly 254(1) of battery node 252(1) to enable measuring VOC of battery cell assembly 254(1). Yet another example of a test profile includes causing battery cell assembly 254(1) to operate at a constant current or at a constant power. Voltage $V_b$ may be either greater or smaller than voltage $V_a$, depending on whether the power contribution of battery node 252(1) increases or decreases as a result of the test profile. In particular, $V_b$ will be greater than $V_a$ if the power contribution of battery node 252(1) increases as a result of application of the test profile, and $V_b$ will be less than $V_a$ if the power contribution of battery node 252(1) decreases as a result of application of the test profile. Additionally, $V_b$ will be equal to zero if the test profile includes terminating charging/discharging of battery cell assembly 254(1) of battery node 252(1). Furthermore, in the FIG. 2H example, battery pack controller 250 maintains an operating profile of battery pack 251 of operating at a constant total power contribution $P_T$ by controlling battery nodes 252(2)-252(4) to change their respective node voltages from $V_a$, to $V_c$, to compensate for voltage of battery node 252(1) changing from $V_a$ to $V_b$. $V_c$ is equal to $(4*V_a-V_b)/3$ so that total power contribution $P_T$ is unchanged, or in other words, so that $P_T=V_b*I_{pack}+3*I_{pack}*V_c=4*I_{pack}*V_a$. It should be noted that battery nodes 252 will become unbalanced from applying the test profile to battery node 252(1) by causing state of charge of battery cell assembly 254(1) to differ from state of charge of battery cell assemblies 254(2)-254(4).

Figure 2I:
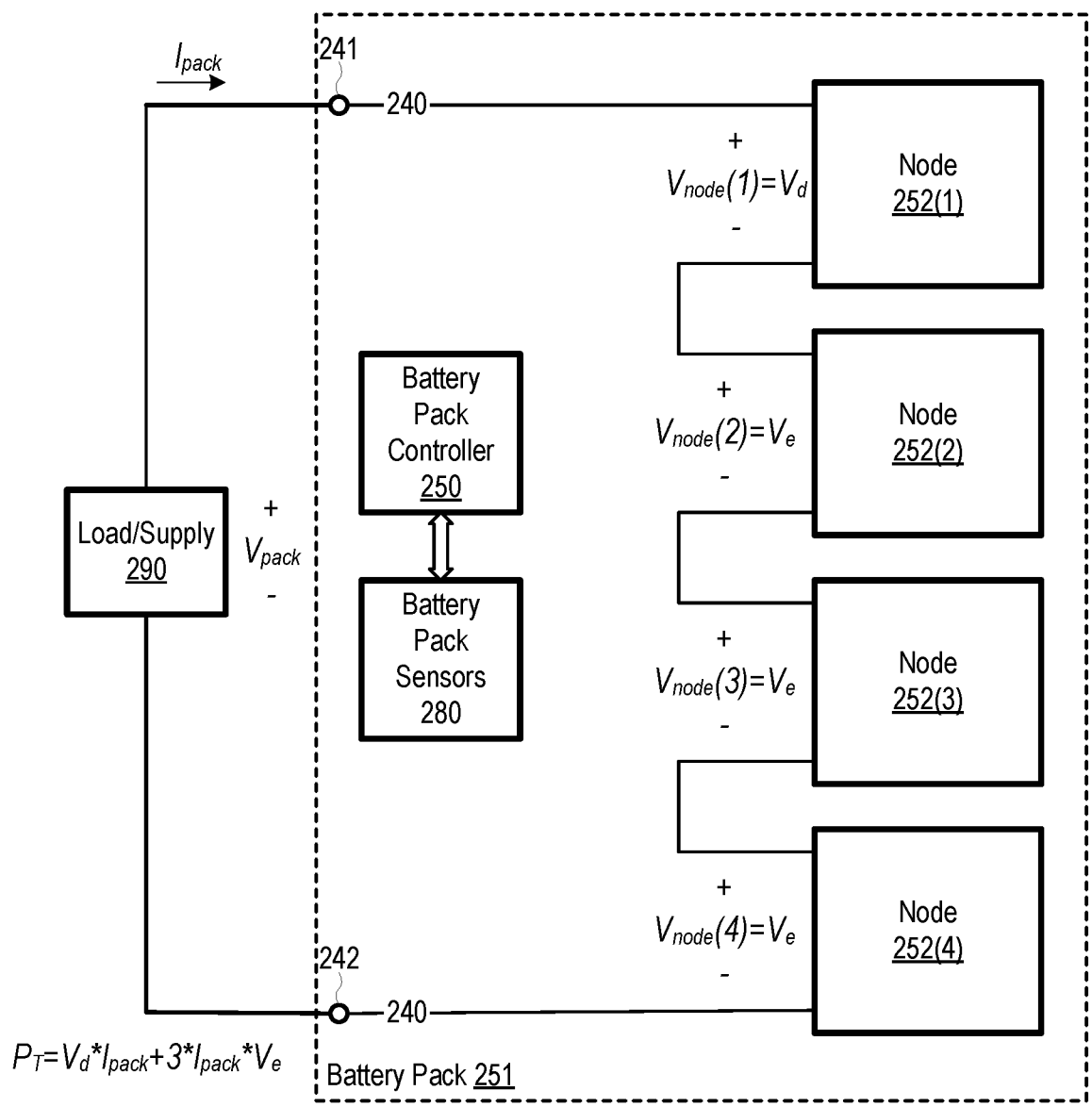
FIG. 2I is a schematic block diagram of the FIG. 2D battery pack illustrating an example operating scenario where the battery pack is being returned to normal operation.
Figure 2J:
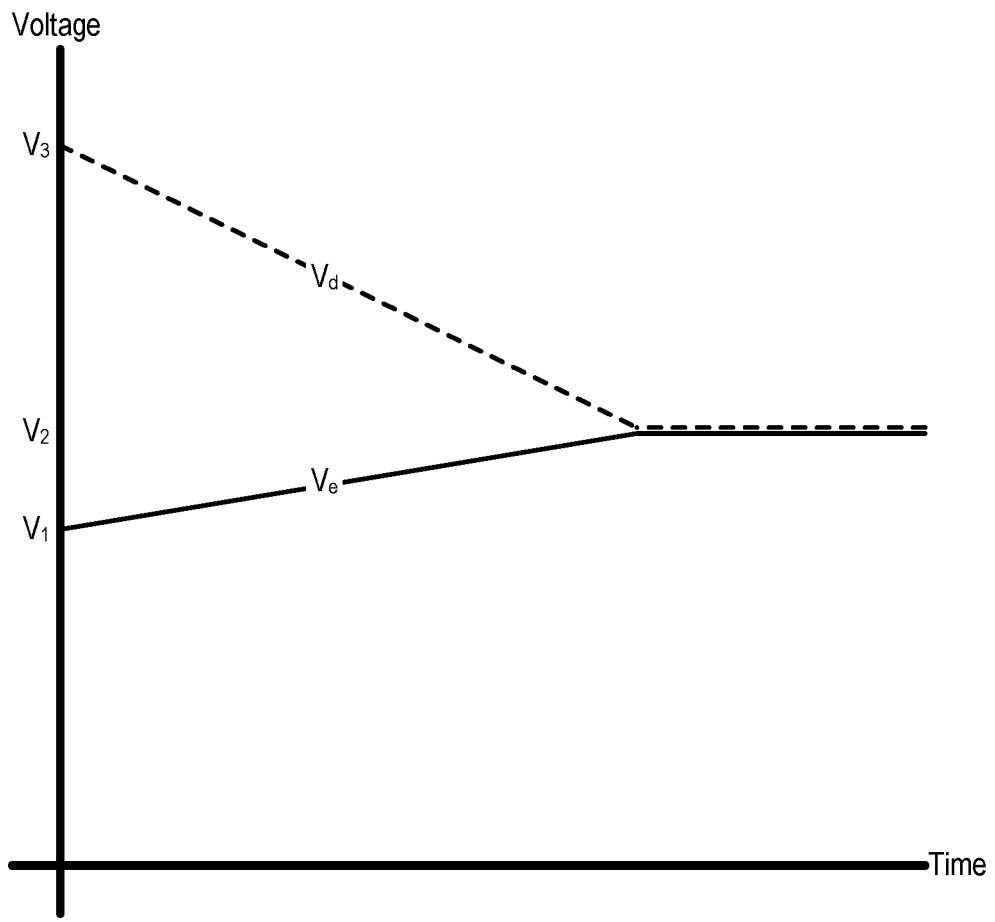
FIG. 2J is a graph of voltage versus time illustrating one example of how a battery pack controller of the FIG. 2D battery pack could control battery nodes such that node voltages converge to a common value.

FIG. 2I illustrates an additional example operating scenario where battery pack 251 is being returned to normal operation after applying the test profile of FIG. 2H. In the FIG. 2I example scenario, battery pack controller 250 controls battery nodes 252 in a manner which rebalances the battery nodes, i.e., causes respective battery cell assemblies 254 to converge to a common state of charge, over time. FIG. 2I illustrates battery node 252(1) having a node voltage equal to $V_d$ and battery nodes 252(2)-252(4) each having a node voltage $V_e$. Voltage $V_d$ will initially differ from voltage $V_e$ due to state of charge of battery cell assembly 254(1) being different from respective states of charge of battery cell assemblies 254(2)-252(4), but the both $V_d$ and $V_e$ will converge to a common value as all battery cell assemblies 254 reach a common state of charge. For example, FIG. 2J is a graph of voltage versus time illustrating one example of how battery pack controller 250 may control battery nodes 252 such that node voltages $V_d$ and $V_e$ converge to a common value over time. In the FIG. 2J example, voltage $V_d$ is initially equal to $V_3$ and voltage $V_e$ is initially equal to $V_1$, but battery pack controller 250 controls battery nodes 252 so that voltages $V_d$ and $V_e$ converge to $V_2$ over time, where the common value of voltages $V_d$ and $V_e$ reflects all battery cell assemblies 254 being at a common state of charge. Battery pack controller 250 additionally controls battery nodes during the rebalancing process illustrated in FIGS. 2I and 2J so that so that total power contribution $P_T$ is unchanged, or in other words, so that $P_T = I_{pack}*V_d + 3*I_{pack}*V_e = 4*I_{pack}*V_a$.

The example operating scenarios of FIGS. 2G-2J assume that battery cell assemblies 254 should be balanced, i.e., they should have a substantially common state of charge at any given time, except when state of charge must deviate due to application of a test profile to a battery node 252. However, battery pack 251 is not limited to operating with battery cell assemblies 254 being balanced, and certain embodiments of battery pack controller 250 are configured to purposefully control nodes 252 such that two or more battery cell assemblies 254 are unbalanced under certain conditions, such as in response to one or more battery assemblies 252 being in a degraded condition or in an unsafe condition. For example, battery pack controller 250 may be configured to control battery node 252(4) such that a maximum state of charge of battery cell assembly 254(4) is limited to a value that is smaller than that of other battery cell assemblies 252(1)-252(3), in response to a signal indicating that battery cell assembly 254(4) is degraded and therefore cannot safely operate a high state of charge.

Examples of Resetting Coulomb Counters Using Target Zone Testing

Figure 3:
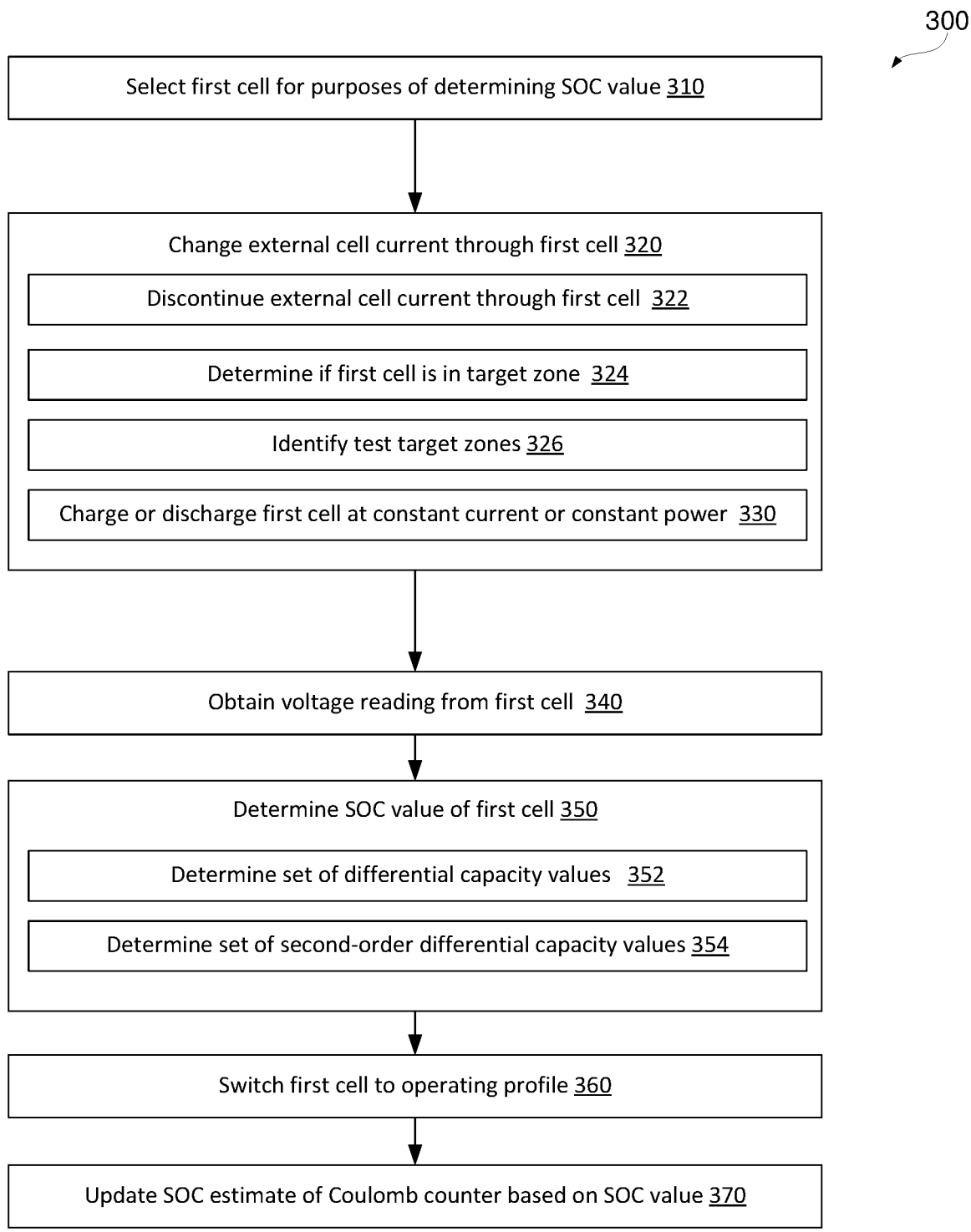
FIG. 3 is a process flowchart corresponding to a method for determining a SOC value of a cell in a battery pack, in accordance with some examples.

FIG. 3 is a process flowchart corresponding to method 300 for determining the SOC value of first battery cell 214 in battery pack 200, in accordance with some examples. Various examples of battery pack 200 are described above and below. For example, battery pack 200 further comprises one or more additional battery cells 219. While method 300 focuses on determining the SOC value of first battery cell 214, one having ordinary skill in the art would understand that this method can be applied to any cell or groups of cells in battery pack 200. The SOC value of first battery cell 214 can be used for updating the SOC estimate of Coulomb counter 213, monitoring first battery cell 214, as further described below.

In some examples, method 300 commences with (block 310) selecting first battery cell 214 for purposes of determining the SOC value. As described above, first battery cell 214 is a part of first battery node 210 further comprising first node controller 212. First node controller 212 is connected in series with one or more additional node controllers 239 of battery pack 200. One or more additional node controllers 239 control operation of one or more additional battery cells 219 in battery pack 200. In some examples, first battery cell 214 is selected based on at least one of a time lapse, a cycle count, a confidence level in SOC value of Coulomb counter 213, a charge depth of first battery cell 214 in one or more of previous cycles, a discharge depth of first battery cell 214 in one or more of previous cycles, a charge rate of first battery cell 214 in one or more of previous cycles, a discharge rate of first battery cell 214 in one or more of previous cycles, a temperature of first battery cell 214 in one or more of previous cycles, or user input. For example, a certain duration and/or a number of charge-discharge cycles and/or an energy throughput may be set between updates to the counter's estimate. This duration/cycle count/energy throughput may depend, for example, on the expected drift of Coulomb counter 213 over time as described above with reference to FIG. 1D. If a higher confidence level in the SOC estimate is needed (e.g., for critical applications, such as aerospace, grid services, and the like), then method 300 may be performed more frequently.

Furthermore, method 300 may be performed at certain temperatures. As noted above with reference to FIG. 1C, OCV profile 100 profile is highly dependent on the battery cell temperature. At the same time, OCV profiles or, more specifically, SOC-to-OCV correlations may not be available for all possible operating temperatures. In this case, method 300 may be triggered when a battery cell reaches one of the temperatures for which an OCV profile is available. Moreover, a user may trigger method 300, e.g., when battery pack 200 is serviced or using specific trigger points in battery pack controller 150 (e.g., controller software) to provide more precise pack capacity, For example, grid service and/or EV applications may require precise pack capacity estimates. In a specific grid service example, a battery pack operator may use a precise SOC estimate to bid on a particular grid service.

Method 300 proceeds with (block 320) changing the external cell current through first battery cell 214 using first node controller 212. The current is changed in accordance with a test profile. The test profile is selected based on various criteria, described below. One or more additional battery cells 219 continue to charge or discharge using one or more additional node controllers 239 in accordance with a power compensation profile. The power compensation profile is different from the test profile and is selected to ensure that the voltage of battery pack 200 is substantially unchanged while changing the external cell current through first battery cell 214 in accordance with the test profile.

In some examples, the external cell current through first battery cell 214 is different from the external cell current through at least one of one or more additional battery cells 219, while changing the external cell current through first battery cell 214 using first node controller 212 in accordance with the test profile. In other words, first battery cell 214 is charged or discharged at a different rate (e.g., zero rate) than one or more additional battery cells 219. The external cell current through first battery cell 214 is specifically selected for determining the SOC value of first battery cell 214, while the external cell current through at least one of one or more additional battery cells 219 is selected to support the operation of battery pack 200.

Method 300 proceeds with (block 340) obtaining a voltage reading from first battery cell 214 using first node controller 212. This voltage reading represents a response to changing the external cell current through first battery cell

214. For example, if the external cell current through first battery cell 214 is zero, the voltage reading is one or more OCV values.

Method 300 proceeds with (block 350) determining the SOC value of first battery cell 214 at least in part based on the voltage reading. The voltage reading may include one or more OCV values, one or more CCV values, and/or one or more CPV values as further described below.

In some examples, changing the external cell current through first battery cell 214 in accordance with the test profile comprises (block 322) discontinuing the external cell current through first battery cell 214. In these examples, the voltage reading, obtained from first battery cell 214 for purposes of determining the SOC value, is an OCV of first battery cell 214. As such, these operations may be referred to as an OCV-based test or protocol. In more specific examples, discontinuing the external cell current through first battery cell 214 is performed while first battery cell 214 is in the first one of test target zones, corresponding to the OCV profile 100 of first battery cell 214. First battery cell 214 may reach the first test target zone during the routine operation (e.g., while battery pack 200 is being used for its intended purposes). Alternatively, first battery cell 214 can be specifically charged or discharged to reach the first test target zone.

Figure 4:
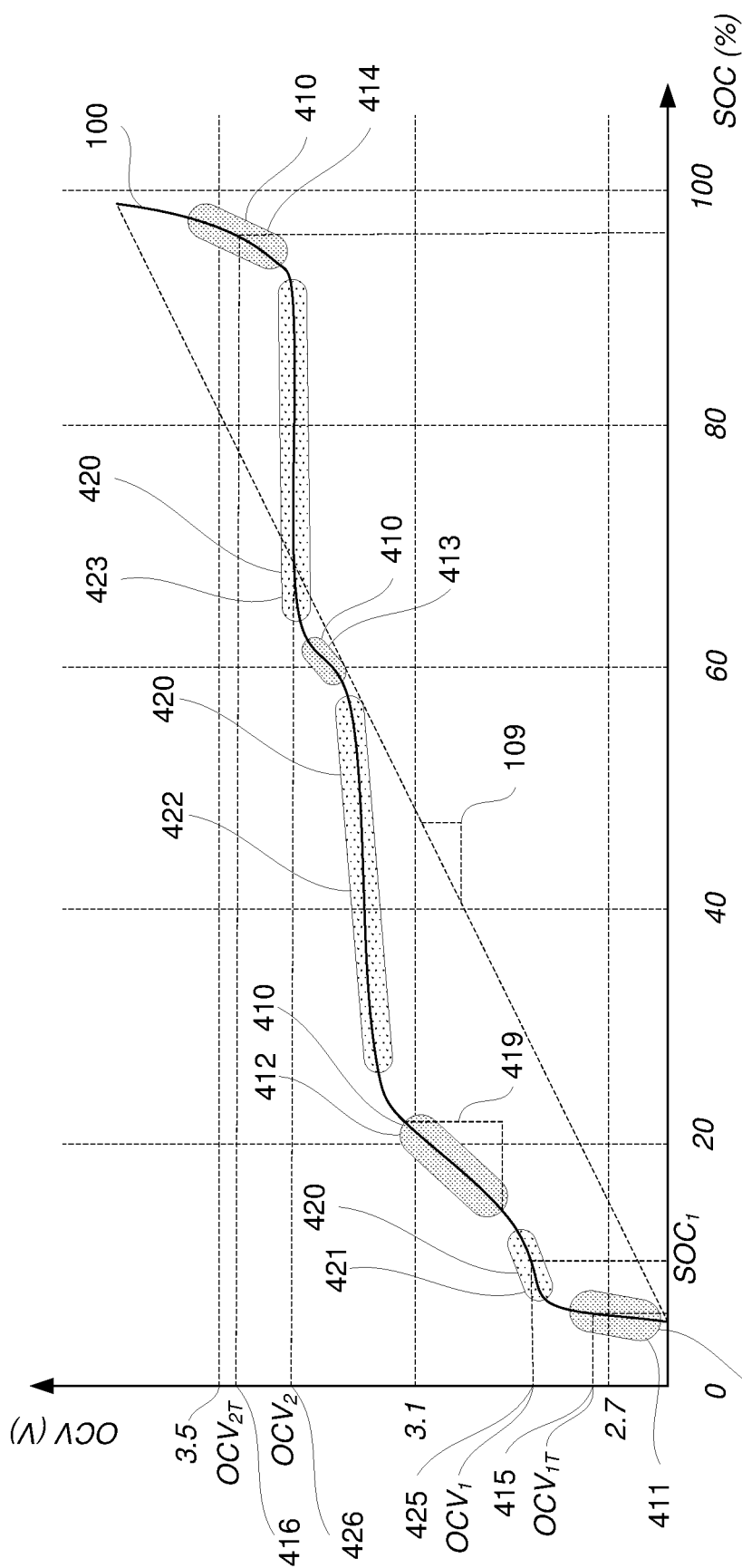
FIG. 4 is an example of an OCV profile illustrating different target zones and non-target zones.

Some of these test target zones may correspond to the SOC-estimate error being less than a set threshold for first node controller 212. SOC-estimate errors are smaller where the OCV profile has a higher slope as was described earlier with reference to FIG. 1B. FIG. 4 illustrates multiple target zones 410 in OCV profile 100 of first battery cell 214. OCV profile 100 shown in FIG. 4 is the same as previously presented and discussed with reference to FIG. 1A. Specifically, in some examples, a portion of OCV profile 100 in each of target zones 410 has slope 419 greater than the average slope 109 for OCV profile 100. In more specific examples, the portion of OCV profile 100 in each of target zones 410 has slope 419 greater than 1V per 100% of the operating capacity or even greater than 2V per 100% or 5V per 100%. Therefore, the SOC can be more accurately detected in target zones 410, in comparison to non-target zones 420. OCV profile 100 shown in FIG. 4 has four target zones 410 (i.e., first target zone 411, second target zone 412, third target zone 413, and fourth target zone 414) and three non-target zones 420 (i.e., first non-target zone 421, second non-target zone 422, and third non-target zone 423). One having ordinary skill in the art would appreciate that the number of zones depends on the profile shape, which in turn depends on the electrode materials as described above.

In some examples, target zone 410 or, more specifically, the test OCV value in this target zone 410, is selected based on at least one of following parameters: the current SOC of battery pack 200, the SOC limit of battery pack 200, and/or the charge-discharge regime of battery pack 200. For example, if the OCV of first battery cell 214 is currently at $OCV_1$ value (identified with 425 and within first non-target zone 421) and if battery pack 200 is discharging, then the closest target zone to this OCV is first target zone 411. As such, first target zone 411 may be selected for testing. Specifically, the $OCV_{1T}$ value (identified with reference numeral 415) is selected within first target zone 411 as the test OCV value. In this example, first battery cell 214 is discharged, e.g., together with the rest of the pack or separate from the pack, until the OCV is equal to $OCV_{1T}$. For example, an OCV may be periodically checked while charging or discharging first battery cell 214. It should be noted that the obtained OCV values can be correlated based on other conditions (e.g., the cell temperature, SOC, and the like as further described below.

In another example, if the OCV of first battery cell 214 is currently at the $OCV_2$ value (identified with 426 and within third non-target zone 423) and if battery pack 200 is charging, then first battery cell 214 may be brought to fourth target zone 414. Specifically, the $OCV_{2T}$ value (identified with reference numeral 416) is selected within fourth target zone 414 as the test OCV value. As such, charging or discharging first battery cell 214 (until the OCV of first battery cell 214 is at the test OCV value) may be a part of the overall battery pack charging or discharging. Alternatively, charging or discharging first battery cell 214 may be performed independently of other battery cells (e.g., when other cells are idle or charged-discharged at a different rate).

In some examples, one target zone may be selected over another zone (e.g., fourth target zone 414 may be selected over third target zone 413) because the selected target zone has a steeper slope. As described above, a steeper slope results in a more precise SOC estimate. Referring to an example where fourth target zone 414 is selected over third target zone 413, battery pack 200 may continue to operate until reaching fourth target zone 414 is feasible, e.g., first battery cell 214 is at the $OCV_{2T}$ value and battery pack 200 is charging.

In some examples, the test OCV value is selected such that test SOC value is expected to be less than 20%, or even less than 10% of the total operating SOC. In other examples, the test OCV value is selected such that test SOC value is expected to be greater than 80% or even greater than 90% of the total operating SOC. For example, OCV profiles may have distinctive target zones (e.g., target zones with the highest slope at one or both ends of the total operating SOC range). Furthermore, conducting the SOC estimate at different ends of the SOC range helps with estimating the overall operating capacity of first battery cell 214 as further described below.

Figure 5:
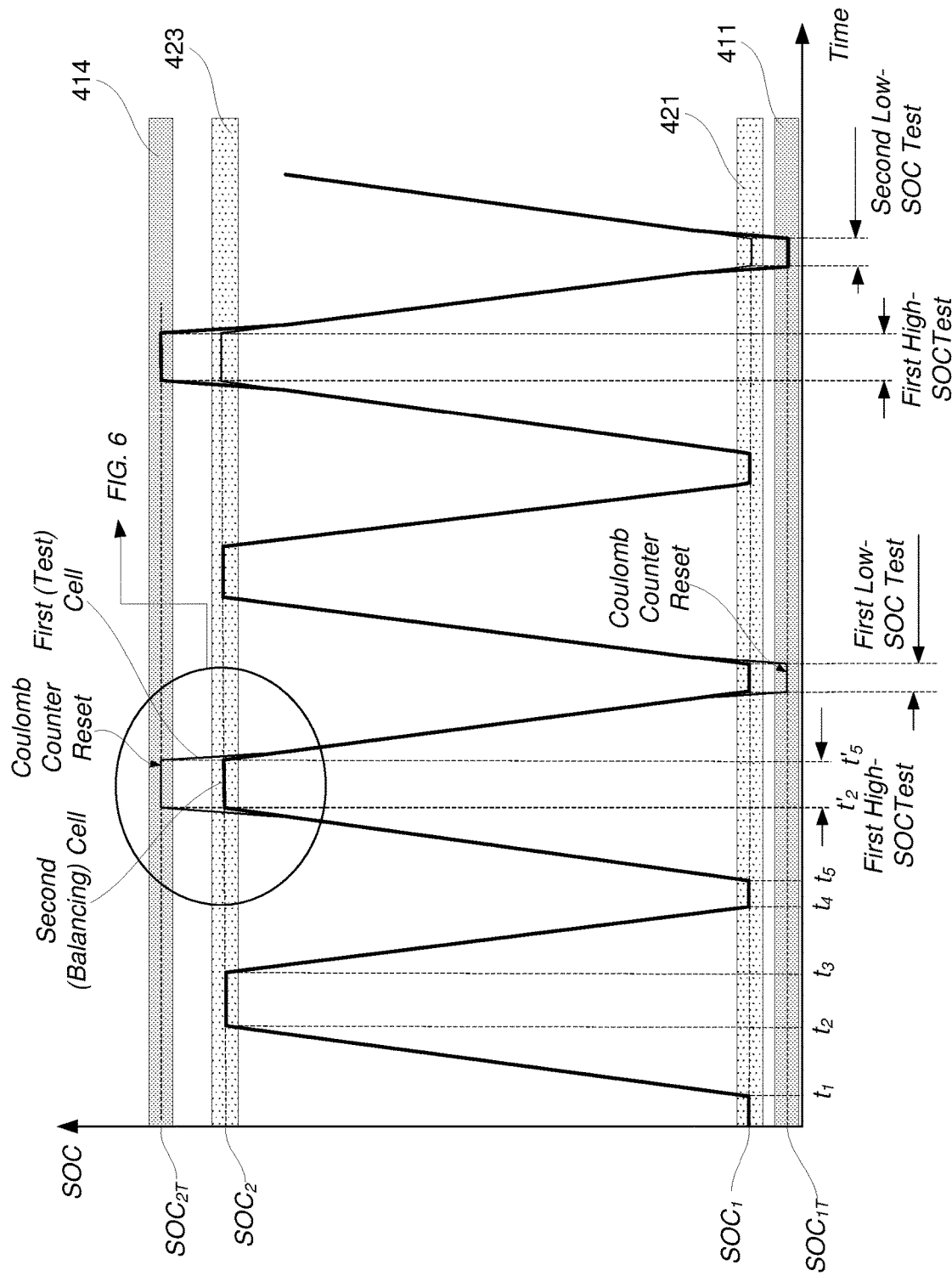
FIG. 5 is an example of SOC profiles for individual cells and the pack while performing the method of FIG. 3.

In some examples, a target zone is selected based on the operating history of battery pack 200, e.g., previous operations and/or expected future operations. For example, battery pack 200 may be used for an application with a predictive operation, such as grid balancing or energy storage to time-shift renewable energy production (e.g., coupled to solar panels). In the renewable energy shifting application, battery pack 200 is repeatedly charged during the day and discharged in the evening/night. FIG. 5 illustrates a SOC profile for this type of application, e.g., battery pack 200 is charged from $t_1$ to $t_2$, idle from $t_2$ to $t_3$, discharged from $t_3$ to $t_4$, idle from $t_4$ to $t_5$, and then charged again at $t_5$ repeating the previous cycle. In this example, the idle times ($t_2$ to $t_3$ and, separately, $t_4$ to $t_5$) may be used for testing. For example, FIG. 5 illustrates a "first test" when battery pack 200 is charged and idle, and a "second test", when battery pack 200 is discharged and idle. Performing tests at different SOCs may be used for estimating the operating capacity of battery cells as further described below.

Figure 6:
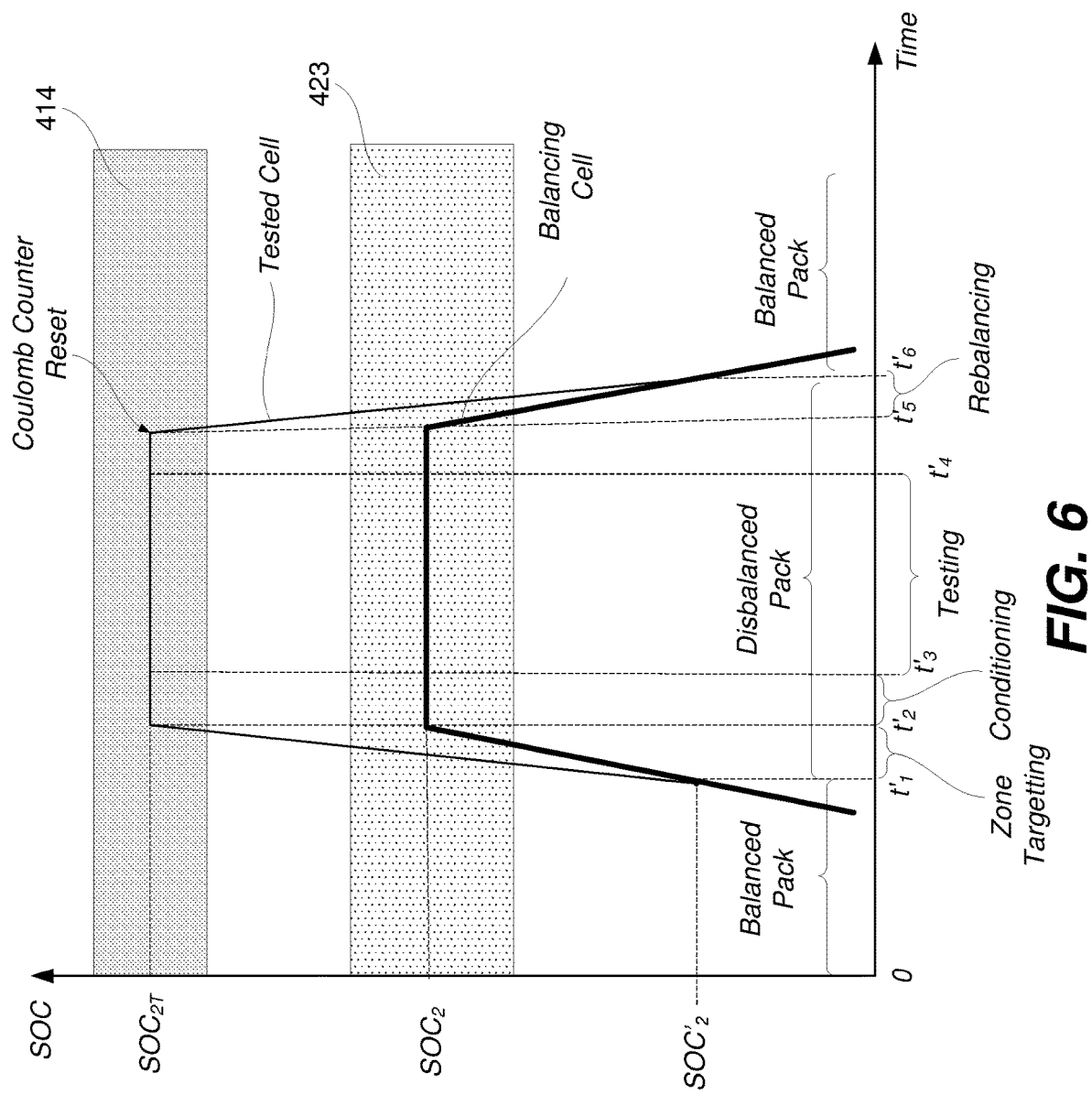
FIG. 6 is an expanded view of a portion of the SOC profiles in FIG. 5.

Various aspects of the first test (when battery pack 200 is charged and idle) will now be described with reference to FIG. 6, which illustrates an expanded version of the SOC profile in FIG. 5, focusing on the first test portion. Furthermore, to simplify the description and this example, the test description will refer to two battery cells (i.e., a tested cell and a balancing cell). One having ordinary skill in the art would understand that this example can apply to any number of tested cells and balancing cells. For example, a group of battery cells can be tested simultaneously. In some examples, all remaining cells in a battery pack (that are not involved in testing) can be used for pack balancing and any power compensations. As noted above, this pack balancing ensures that the voltage of battery pack 200 is substantially unchanged while changing the external cell current through the tested cell (e.g., first battery cell 214), Referring to FIG. 6, initially (up to $t'_1$ on the time scale), both cells are being charged with the SOCs of both cells being the same. The SOC of the tested cell is shown with a thinner solid line, while the SOC of the balancing cell is shown with a thicker solid line. Up to $t'_1$, the two SOC lines coincide. At $t'_1$, the SOC of each cell is at the $SOC'_2$ level. The tested cell conditioning is triggered at this point. For example, the $SOC'_2$ level or, more specifically, the OCV of the tested cell corresponding to the $SOC'_2$ level is not within a target zone. As such, the tested cell continues to charge until reaching the $SOC_{2T}$ level, which may be greater than the cutoff charging level of $SOC_2$ for the balancing cell. The cells can be charged at different rates to reach their respective SOC levels at $t'_2$. It should be noted that battery pack 200 is not balanced at this stage.

At $t'_2$, the tested cell is at the $SOC_{2T}$ level corresponding to one of the target zones, and the test can be initiated. In some examples, the test is preceded by cell conditioning, e.g., keeping the tested cell disconnected and idling, e.g., to allow the OCV of the test cell to stabilize, to reach a test temperature, and other reasons. Referring to FIG. 6, the voltage reading (e.g., one or more OCV values) is obtained starting at $t'_3$ and proceeds until $t'_4$. The tested cell may remain at $SOC_{2T}$, while the balancing cell remains at $SOC_2$, e.g., until battery pack 200 starts discharging at $t'_5$. During the initial discharge, the discharge rate of the tested cell is greater than that of the balancing cell to bring the SOCs of these cells back to the same level, which is achieved at $t'_6$.

Figure 7:
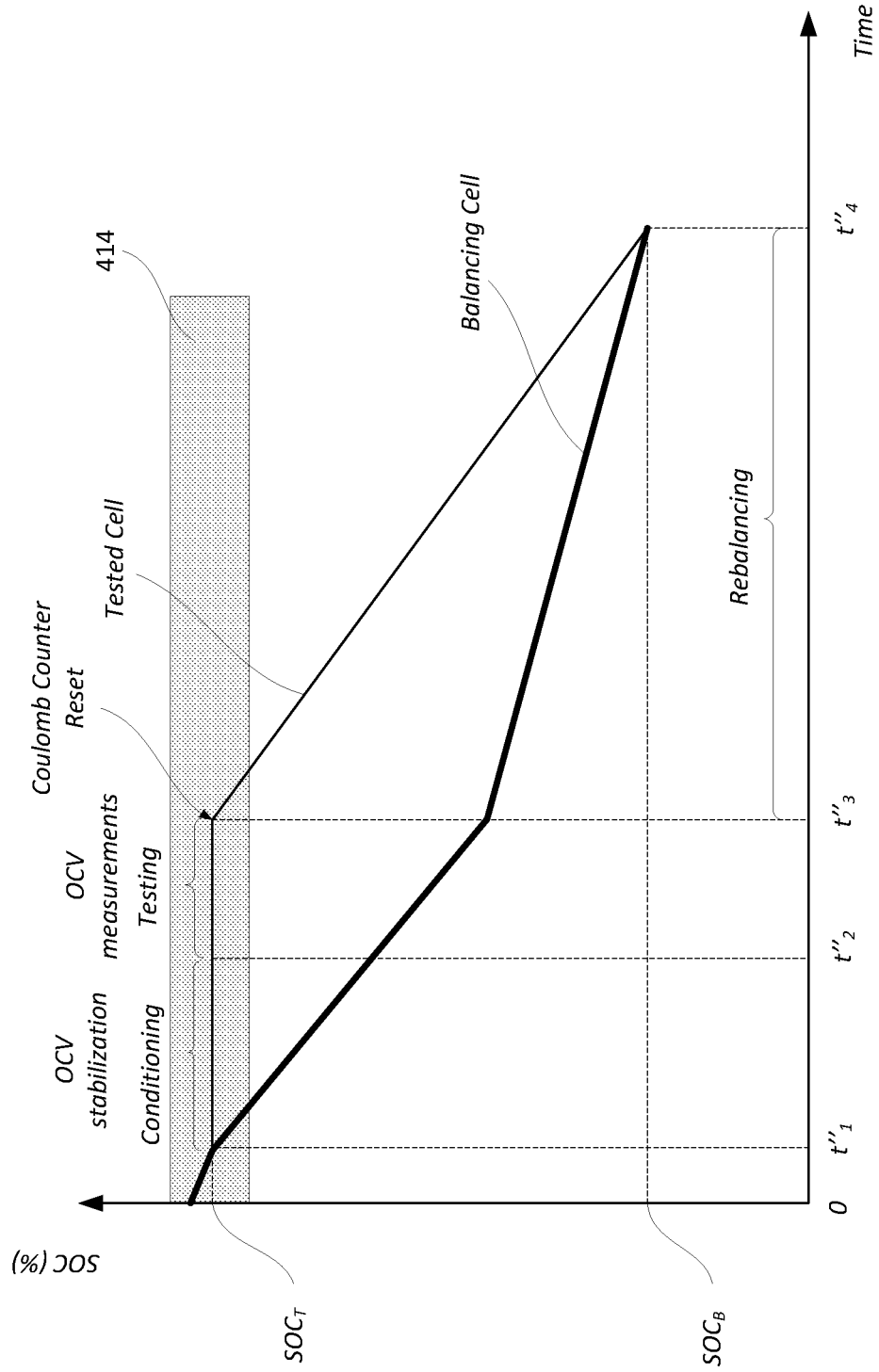
FIG. 7 is another example of SOC profiles for individual cells and the pack while performing the method of FIG. 3.

FIG. 7 illustrates another example of the SOC profiles of tested and balancing cells while determining the SOC value of the tested cell. Up until $t''_1$, both cells are discharging at the same rate and have the same SOC. At $t''_1$, the tested cell reaches a target zone, and the external current through the tested cell is disconnected. The balancing cell continues to discharge at a higher rate to ensure that the overall power output is the same or, more generally, to ensure that the voltage of the battery pack is substantially unchanged while changing the external cell through the tested cell. The tested cell may be conditioned up until $t''_2$, at which point the voltage reading (e.g., one or more OCV values) are obtained between $t''_2$ and $t''_3$. At $t''_3$, the tested cell starts discharging. It should be noted that the SOC of the tested cell is higher at this point than that of the balancing cell. As such, the discharge rate of the tested cell may be higher than that of the balancing cell. This process continues until $t''_4$, at which point the SOC levels of both cells are the same. The period between $t''_3$ and $t''_4$ may be referred to as a rebalancing period.

In some examples, method 300 or, more specifically, the external cell changing operation further comprises (block 324) determining if first battery cell 214 is in the first one of the test target zones. This operation may be performed based on one or more of a voltage-current look-up table, an overvoltage model, the SOC estimate at Coulomb counter 213 of first battery cell 214, the impedance of first battery cell 214, and the temperature change of first battery cell 214.

In some examples, method 300 further comprises (block 326) identifying the test target zones in OCV profile 100 based on at least one of the current state of battery pack 200, the operating history of battery pack 200, and the required SOC precision.

In some examples, various operations described above with reference to the first test target zone are repeated for one or more additional target zomes. For example, method 300 may further comprise discontinuing the external cell current through first battery cell 214 while first battery cell 214 is in the second test target zone, different from the first one. Method 300 proceeds with obtaining an additional voltage reading from first battery cell 214 using first node controller 212 in response to this discontinuing operation, i.e., discontinuing the external cell current through first battery cell 214 while first battery cell 214 is in the second test target zone. Finally, method 300 comprises determining an additional SOC value of first battery cell 214 at least in part based on the additional voltage reading. In some examples, the second test target zone is selected such that the SOC difference between the first and second test target zones is greater than 10% of the operating capacity of first battery cell 214 or, more specifically, greater than 30%, greater than 50% and even greater than 80%. In some examples, this difference may be determined by the operation of the battery pack, e.g., if the battery pack is being operated over a broad SOC range. In some examples, the total capacity of first battery cell 214 may also change, e.g., due to cell degradation. The selection of different target zones allows determining different SOC and determining the total operating capacity of first battery cell 214.

In some examples, method 300 further comprises determining a current operating capacity of first battery cell 214 based on the SOC value and the additional test SOC value. It should be noted that the operating capacity of battery cells can reduce over time, which can be referred to as capacity fading. Furthermore, method 300 can further comprise updating Coulomb counter 213 of first battery cell 214 based on the current operating capacity of first battery cell 214.

In some examples, changing the external cell current through first battery cell 214 in accordance with the test profile comprises (block 330) charging or discharging first battery cell 214 at a constant current (CC) and/or a constant power (CP). For purposes of this disclosure, the term constant current/power is defined as a current/power varying less than 10% or even less than 5% from the average during the entire operation. The voltage range corresponds to the accuracy of the SOC estimate with the larger generally corresponding to a more accurate SOC estimate. Furthermore, the number of CCV values also determines the level of analysis that can be performed when determining SOC estimates. For example, a minimum of two CCV values is needed for determining a differential capacity or, more specifically, a first-order differential capacity. Three or more CCV values may be used to determine a second-order differential capacity and so on. Determining higher-order differential capacities provides higher granularity while determining SOC estimates but requires more CCV values. Each order of the differential capacity provides an additional analysis level but also requires additional data and more precision in the original. For example, a second-order differential capacity indicates high gain regions and low gain regions. In some examples, determining the set of differential capacity values is performed continuously and overlaps with obtaining the voltage reading from first battery cell 214. Furthermore, in some examples, the constant current is selected based on at least one of the existing load of battery pack 100 or the future load expectation of battery pack 100.

Figure 8A:
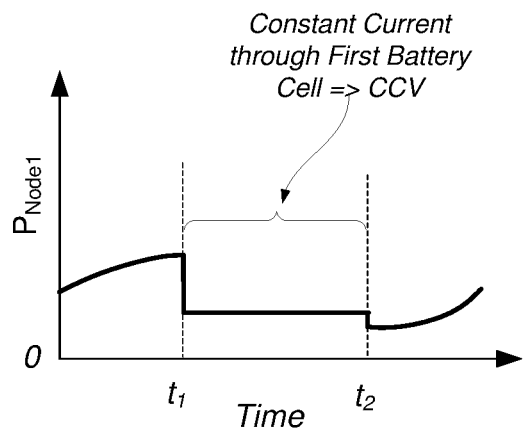
FIGS. 8A, 8B, and 8C are plots illustrating the power output of individual cells in the pack and of the entire pack during the method of FIG. 3.
Figure 8B:
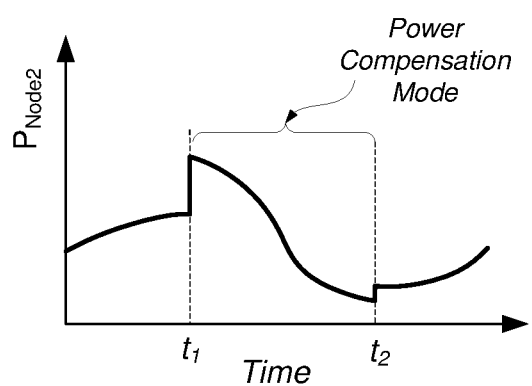
Figure 8C:
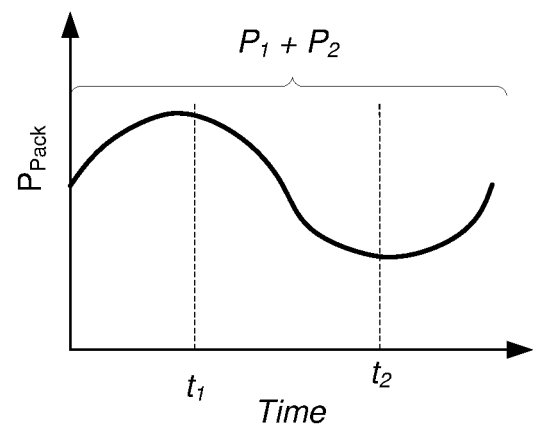

It should be noted that any changes in the battery current or power are compensated for by one or more balancing cells, which may be also referred to as power compensation cells. For example, FIG. 8A illustrates a power output profile of a tested cell, FIG. 8B—a power output profile of a balancing cell, and FIG. 8C—a combined output profile of the two cells. FIG. 8C may also represent the total power output of battery pack 200. This total power output is driven by the operating requirements (e.g., a load connected to battery pack 200) and can vary over time as shown in FIG. 8C. Referring to FIGS. 8A and 8B, before $t_1$, both cells are operated in the same manner and provide the same power output. At $t_1$, the tested cell is switched to the CC/CP operation, which continued until $t_2$. During this period, i.e., between $t_1$ and $t_2$, the power output of the tested cell is constant as shown in FIG. 8A. Any variations of the total pack power output are accommodated by the balancing cell as shown in FIG. 8B. At $t_2$, the CC/CP test is completed, and the tested cell is switched back to the normal operation with the power output being the same as for the balancing cell. It should be noted that upon completion of the CC/CP test, the SOC cell may be first brought to the same level as the SOC level of the remaining cells in the pack before switching back to the normal operation. It should be noted that the CC/CP conditions (as well as balancing conditions) are achieved by specific operations of the node controllers coupled to these cells as described above with reference to FIG. 2A.

Figure 12:
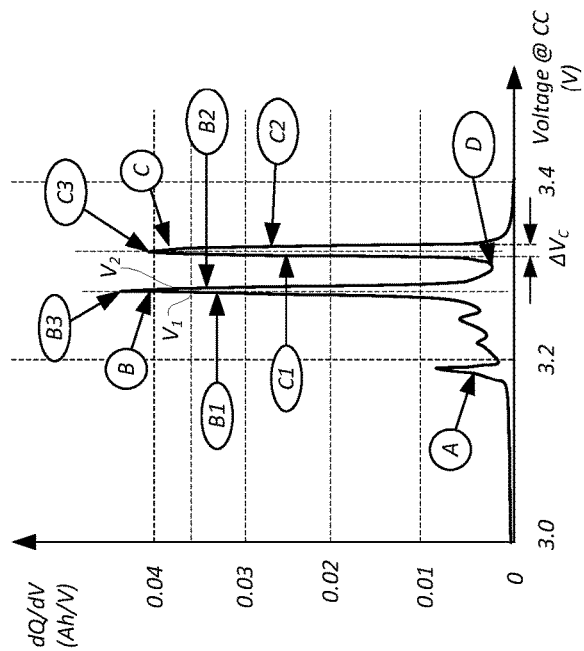
FIGS. 12 and 13 are plots of first derivative values and second derivative values as a function of the CCV.
Figure 13:
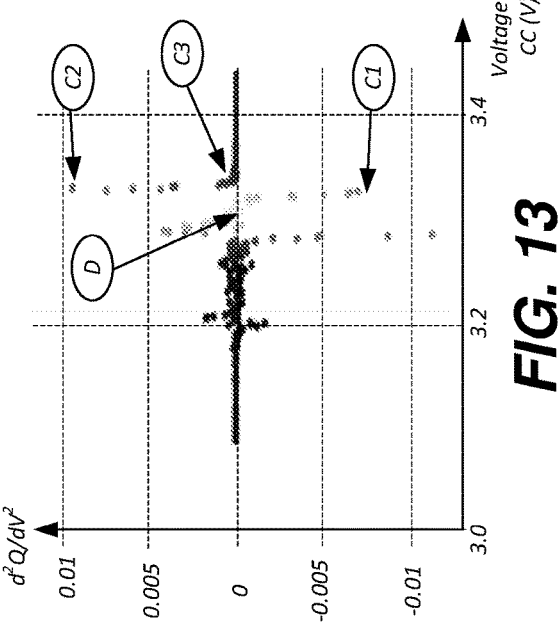
Figure 11:
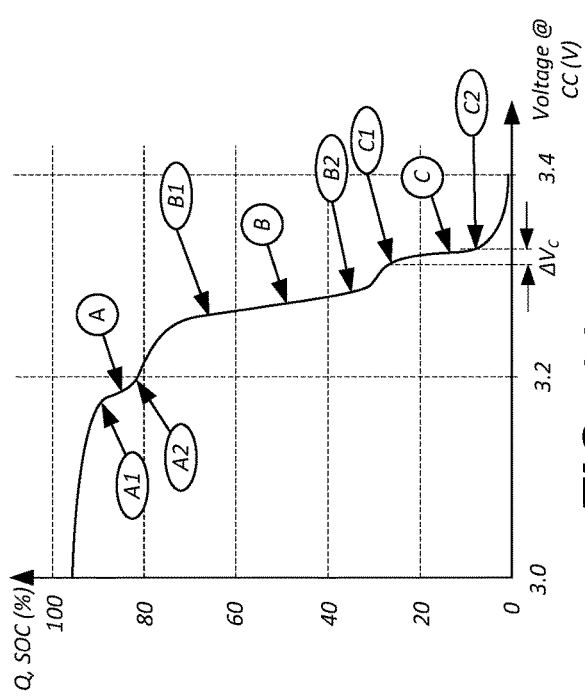
FIG. 11 is a SOC plot as a function of the cell's CCV, in accordance with some examples.

In these examples, the voltage reading used to determine the SOC value of first battery cell 214, is a set of voltage values obtained from first battery cell 214 using first node controller 212 while first battery cell 214 is charged or discharged at the constant current or the constant power. Furthermore, in these examples, determining the SOC value comprises (block 352) determining a set of differential capacity values using the set of voltage values. For example, a differential capacity, which may be referred to as a first-order differential capacity (dQ/dV) may be calculated based on the total charge (i.e., a product of the constant current and time added to or removed from first battery cell 214 divided by the measured CCV difference). One example of differential capacity values determined from CCV values is shown in FIG. 9. Multiple values of the differential capacity may be used, e.g., to produce a second-order differential capacity ($d^2Q/dV^2$), e.g., as shown in FIG. 9. It should be noted that the second-order differential capacity ($d^2Q/dV^2$) is a rate of change of the first-order differential capacity (dQ/dV). FIGS. 11, 12, and 13 provide graphical illustrations of the total charge of the tested cell, a first-order differential capacity determined based on this total charge, and a second-order differential capacity determined based on the first-order differential capacity. FIGS. 11, 12, and 13 also identify various points to illustrate correlations among these plots.

The second-order differential capacity provides an additional reference when determining a new SOC value, e.g., from the look-up table (one example of which is shown in FIG. 10). One having ordinary skill in the art would appreciate that higher-order differential capacities can be determined if obtained CCV values provide sufficient differentiation in these higher-order differential capacities. While higher derivative functions provide additional granularity in the analysis of the capacity-voltage data obtained from the cell, it should be noted that this data may also contain various noise. The effect of the noise increases for each new derivative and at some point further derivatives may not be useful. Without being restricted to any particular theory, it is believed that lab-grade equipment is capable of obtaining capacity-voltage data with the noise level low enough to produce a second-order derivative capacity. This function remains useful for most operating conditions at which this data is obtained.

In some examples, the second-order differential capacity values are used as positive-negative indicators (rather than considering actual numerical values to differentiate among different first-order differential capacity signatures). These positive-negative indicators are not dependent on many factors associated with the test, such as the charge rate, temperature, or SOH. In other words, the inflection point on the capacity-voltage graph remains in the same position.

The SOC value is then determined using this set of differential capacity values, e.g., using a lookup table one example of which is shown in FIG. 10.

In some examples, charging or discharging first battery cell 214 at the constant current is initiated based on the SOC estimates in Coulomb counter 213 and/or the rate of cell voltage change.

In some examples, obtaining the voltage reading from first battery cell 214 is performed until a range in the set of voltage values exceeds a preset range. This preset range is determined based on the differential capacity requirements.

In some examples, method 300 further comprises (block 360) switching first battery cell 214 and one or more additional battery cells 219 to an operating profile. The operating profile is different from the test profile and also from the power compensation profile. This operation is performed after obtaining the voltage reading from first battery cell 214. This switching operation is performed such that the voltage of battery pack 200 is substantially unchanged.

In some examples, method 300 involves rebalancing battery pack 200. The pack rebalancing ensures that the SOC of first battery cell 214 is the same as the SOC of one or more additional battery cells 219. For example, this pack rebalancing may be performed based on the SOC estimates (e.g., available at corresponding Coulomb counters), voltage readings (e.g., OCV, CCV, CPV), and the like. The rebalancing of battery pack 200 may involve charging or discharging first battery cell 214 at a rate different than that of one or more additional battery cells 219. The rates used for rebalancing can be maintained below a set threshold. In some examples, the rebalancing may involve idling one or more cells until other cells are charged or discharged to the SOC level of the idling cells. This charged or discharged operation may be performed during a typical operation of battery pack 200.

In more specific examples, before switching first battery cell 214 and one or more additional battery cells 219 to the operating profile, the SOC value of first cell 214 is substantially similar to the SOC value of each of one or more additional battery cells 219.

In some examples, method 300 further comprises (block 370) updating the SOC estimate of Coulomb counter 213 of first battery cell 214 based on the SOC value, determined based on voltage reading. For example, updating the SOC estimate of Coulomb counter 213 with test SOC value 413 comprises replacing the SOC estimate of Coulomb counter 213 with test SOC value 413. This operation may be performed, for example, while the OCV of first battery cell 214 is at the test OCV value. For example, a look-up table is used to determine the test SOC value corresponding to the test OCV value. The look-up table may account for various other parameters, such as the temperature of first battery cell 214, cell current, and cell resistance.

Figure 14:
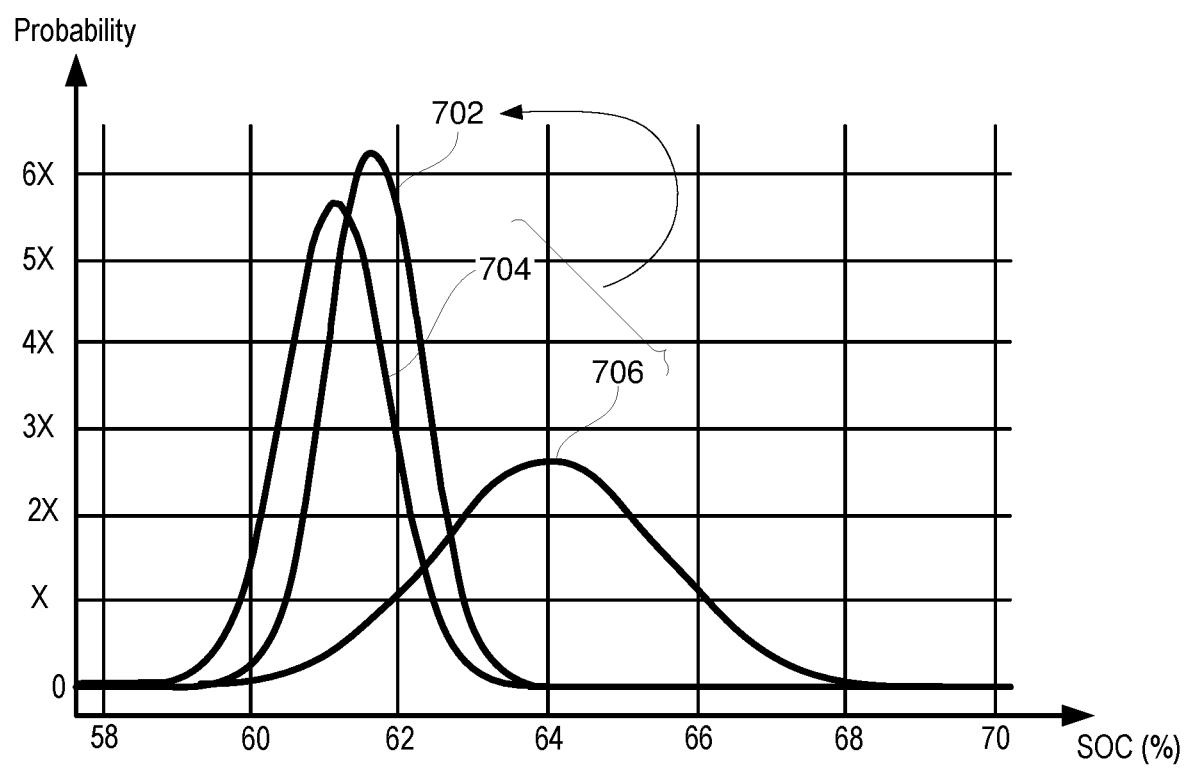
FIG. 14 illustrates graphs for SOC probabilities for a Coulomb counter estimate, a new test-generated value, and a combined value.

In some examples, the new SOC estimate of Coulomb counter 213 is determined using the current SOC estimate of Coulomb counter 213, and the new tested SOC value. More specifically, the new "combined" SOC estimate value may be determined as a product of two Gaussian distributions. FIG. 14 illustrates an example of probability profiles for the new combined SOC estimate (line 702), the current SOC estimate (line 704), and the new tested SOC value (line 706). Each of the current SOC estimate and the new tested SOC value has a lower probability than the combined SOC value.

Examples of Test Selection for Updating SOC Estimates

Various examples of OCV-based and CCV-based test methods are described above. An OCV-based test method can be used when the SOC of a tested cell is within or close to one of target zones in the OCV profile. The OCV-based test method may also require taking the tested cell offline. A CCV-based test method has fewer requirements and can be performed more frequently than the OCV-based test. These two types of methods can be combined into the same general method as, e.g., is schematically shown in FIGS. 15A and 15B.

Figure 15A:
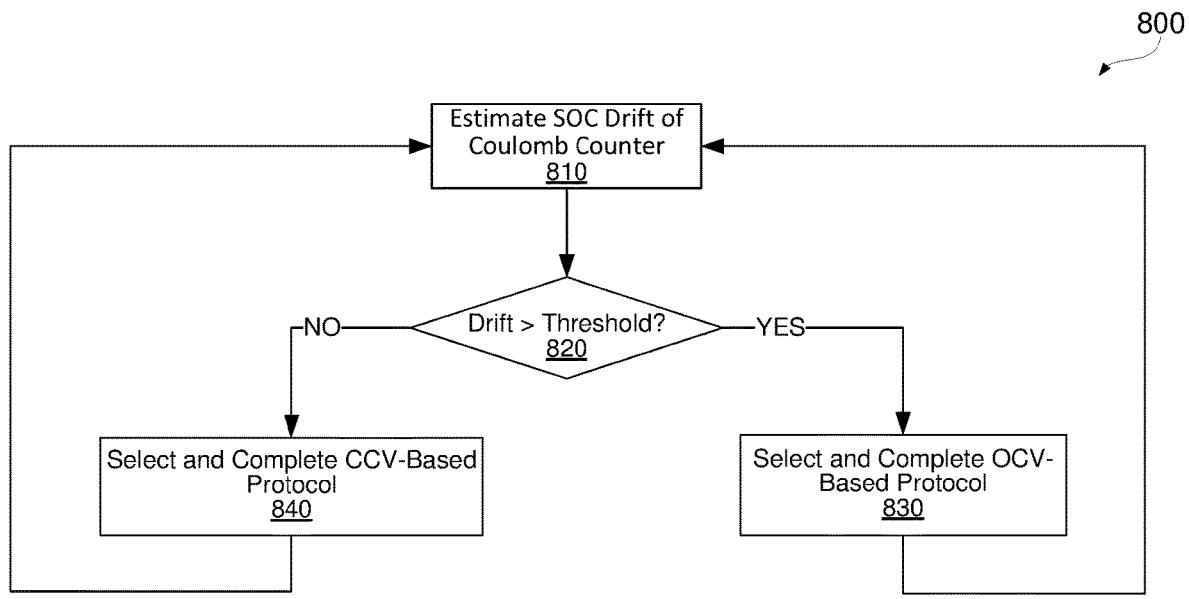
FIG. 15A is a process flowchart corresponding to a method for updating a SOC estimate, in accordance with some examples.
Figure 15B:
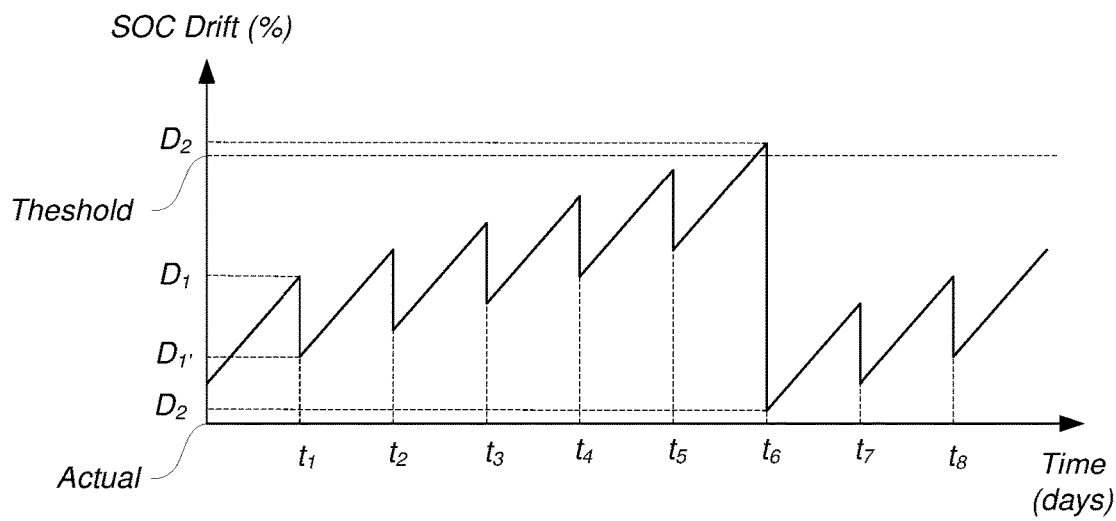
FIG. 15B is an example of a Coulomb drift and corresponding updates of the SOC estimate while periodically performing the method of FIG. 15A.

Referring to FIG. 15A, method 800 of determining a SOC value may comprise (block 810) estimating a SOC drift of Coulomb counter 213 of first battery cell 214. For example, the SOC drift may be estimated based on the overall time lapse since the last SOC estimate, the type of the last SOC estimate (e.g., an OCV-based test protocol or a CCV-based test protocol), the operating conditions of first battery cell 214 since the last SOC estimate, and the like.

Method 800 may proceed with (block 830) selecting and completing an OCV-based test protocol when (decision block 820) the SOC drift is greater than a drift threshold. Alternatively, method 800 may proceed with (block 840) selecting and completing a CCV-based test protocol when (decision block 820) the SOC drift is less or equal to drift threshold. As described above, the OCV-based test involves charging or discharging first battery cell 214 until the OCV of first battery cell 214 is at the test OCV value. The CCV-based test protocol involves obtaining a set of voltage values from first battery cell 214 while charging or discharging first battery cell 214 at a constant current, determining a differential capacity using set of voltage values and constant current, determining a new SOC value using differential capacity and updating SOC estimate of Coulomb counter 213 with new SOC value.

Additional Examples of Battery Pack Configurations

The aforementioned methods are applicable to power systems with battery nodes that do not regulate node voltage or stack voltage, as well as to power systems with battery nodes that do regulate node or stack voltage. For example, the methods may be applied to power systems with battery nodes that do not include power converters. As another example, the methods may be applied to power systems with battery nodes including DC-DC converters configured to handle differential power, i.e., a difference in power between battery nodes or a difference in power between respective batteries of battery nodes, instead of full battery node power or full power of a respective battery. For instance, the DC-DC converters could be configured to transfer differential power between adjacent battery nodes, the DC-DC converters could be configured to transfer differential power between a battery node and a bus, or the DC-DC converters could be configured to transfer differential power between a battery node and a load or a power source.

Taking a battery node offline, such as by causing the battery node to operate in a bypass mode, may change stack voltage in embodiments where battery nodes do not regulate node voltage or stack voltage. However, such change in stack voltage may be acceptable if it is a relatively small percentage of stack voltage prior to taking the battery node offline. For example, a change in stack voltage from taking a battery node offline that is less than ten percent, or is less than five percent, of stack voltage prior to taking the battery node offline may be acceptable. Additionally, change in stack voltage caused by taking a battery node offline may be acceptable in power systems including one or more alternative means for regulating voltage, such as a stack-level power converter (e.g., internal or external to an inverter or other load electrically coupled to the stack) that enables connection of parallel stacks or interfaces the stack to a load with a regulated voltage.

Discussed below with respect to FIGS. 16-35 are several examples of how the aforementioned methods could be applied to power systems with battery nodes that do not regulate node or stack voltage. It is understood, however, that the aforementioned methods are not limited to these example applications.

Figure 16:
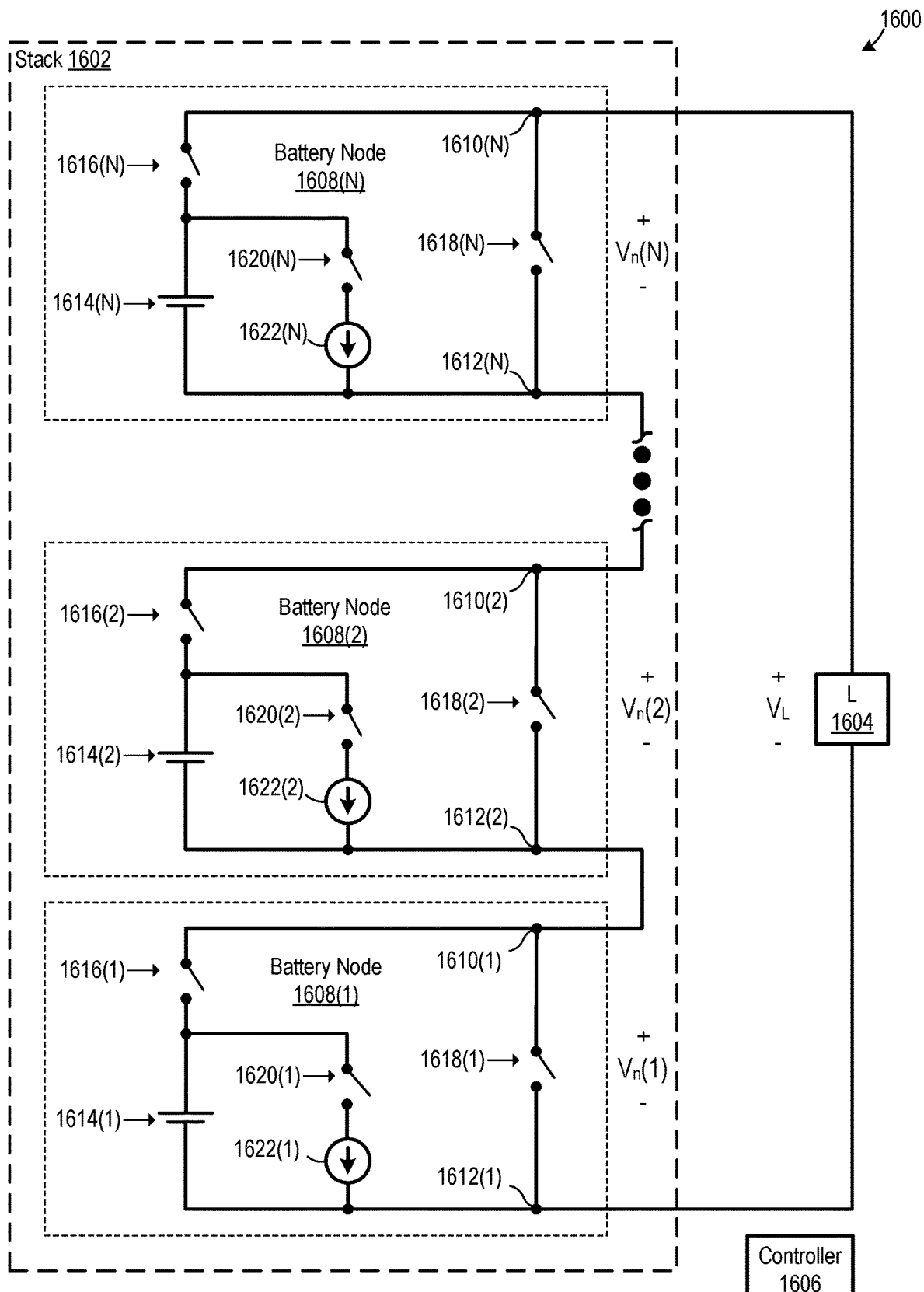
FIG. 16 is an illustrative block diagram of an example power system that includes multiple battery nodes without DC-DC converters.

FIG. 16 is an illustrative block diagram of a power system 1600 including a stack 1602, an electrical load 1604, and a controller 1606. Power system 1600 could include additional stacks 1602 without departing from the scope hereof, and each stack 1602 need not have the same configuration. Electrical load 1604 is electrically coupled to stack 1602. Accordingly, electrical load 1604 can both receive power from power system 1600 as well as provide power to power system 1600 for charging batteries. Controller 1606 is configured to control power system 1600, and connections between controller 1606 and other elements of power system 1600 are not shown for illustrative clarity. Although controller 1606 is depicted as being a single element, some embodiments of controller 1606 are embodied by two or more sub-elements that need not be disposed at a common location. For example, some embodiments of controller 1606 are at least partially embodied by a distributed computing system. Although controller 1606 is depicted as being separate from stack 1602, controller 1606 could be at least partially integrated with stack 1602. In some embodiments, controller 1606 is at least partially embodied by a respective node controller (not shown) of each battery node 1608, where the node controllers of all battery nodes 1608 collectively perform at least some of the functions of controller 1606.

Stack 1602 includes N battery nodes 1608, where N is an integer greater than one. Each battery node 1608 includes a positive output electrical node 1610 and a negative output electrical node 1612, and battery nodes 1608 are electrically coupled in series in stack 1602 such that a positive output electrical node 1610 of one battery node 1608 is electrically coupled to a negative output electrical node 1612 of an adjacent battery node 1608. For example, positive output electrical node 1610(1) of battery node 1608(1) is electrically coupled to negative output electrical node 1612(2) of adjacent battery node 1608(2). Each battery node 1608 has a respective node voltage Vn across its output electrical nodes 1610 and 1612.

Each battery node 1608 further includes a battery 1614, an isolation switch 1616, and a bypass switch 1618. Each battery 1616 may consist of a single battery cell, or each battery 1616 may include a plurality of battery cells electrically coupled in series and/or in parallel. Within each battery node 1608, battery 1614 and isolation switch 1616 are electrically coupled in series between positive output electrical node 1610 and negative output electrical node 1612, and bypass switch 1618 is electrically coupled between positive output electrical node 1610 and negative output electrical node 1612. Each battery node 1608 optionally further includes a discharge switch 1620 and a current source 1622 electrically coupled in parallel with battery 1614 of the node. Controller 1606 is configured to control each switch 1616, 1618, and 1620, such as to cause the switches to open or close, although connections between controller 1606 and the switches are not shown for illustrative clarity.

Battery nodes 1608 do not include DC-DC converters, and battery nodes 1608 are therefore incapable of regulating their respective node voltages Vn. In some embodiments, each battery node 1608 may operate in a plurality of possible operating modes, under the control of controller 1606. For example, in certain embodiments, each battery node 1608 is capable of operating in a normal charge/discharge mode, a bypass mode, a floating mode, and a discharge mode. The normal charge/discharge mode of a given battery node 1608 is characterized by (a) isolation switch 1616 being closed, (b) bypass switch 1618 being open, and (c) discharge switch 1620 being open. The bypass mode of a given battery node 1608 is characterized by (a) isolation switch 1616 being open and (b) bypass switch 1618 being closed. The floating mode of a given battery node 1608 is characterized by each of isolation switch 1616, bypass switch 1618, and discharge switch 1620 being open. This discharge mode of a given battery node 1608 is characterized by isolation switch 1616 being open and discharge switch 1620 being closed.

Controller 1606 may cause a battery node 1608 to operate in its bypass mode, for example, to enable OCV to be determined for the battery 1614 of the battery node. For example, assume that OCV needs to be determined for battery 1614(2) of battery node 1608(2). Controller 1606 may cause battery node 1608(2) to operate in its bypass mode, which prevents current from flowing through battery 1614(2), thereby enabling controller 1606, or another device (not shown), to determine OCV of battery 1614(2). Operating battery node 1608 in its bypass mode also allows current flowing through other battery nodes 1608 of stack 1602 to bypass battery node 1608(2), such that stack 1602 can continue to operate, albeit at a reduced capacity, while determining OCV of battery 1614(2).

Controller 1606 may also cause a battery node 1608 to operate in its bypass mode to maintain a battery 1614 of the battery node at a particular state of charge. For example, assume that stack 1602 is operating in a charging mode and that it is desired to recalibrate a Coulomb counter (not shown) associated with battery 1614(1). Additionally, assume that battery 1614(1) reaches a target zone while charging, where the target zone is conducive to determining state of charge of the battery. Controller 1606 may cause battery node 1608(1) to operate in its bypass mode so that state of charge of battery 1614(1) remains constant and within the target zone, while recalibrating the Coulomb counter. Controller 1606 may cause battery node 1608(1) to subsequently transition from its bypass mode to its normal charge/discharge mode after recalibrating the Coulomb counter, to enable battery node 1608(1) to resume normal operation.

Controller 1606 may additionally cause one or more battery nodes 1608 to operate in their bypass nodes to affect state of charge of other battery nodes 1608 of stack 1602. For example, assume that (a) stack 1602 is operating in a discharging mode, (b) it is desired to recalibrate a Coulomb counter (not shown) associated with battery 1614(1), and (c) battery 1614(1) is not currently operating in a target zone, but the battery would be operating in a target zone if its state of charge were moderately lower. Controller 1606 may cause all other battery nodes 1608(2)-1608(N) of stack 1602 to operate in their bypass modes, such that battery node 1608(1) is the only battery node providing power to electrical load 1604. Discharge rate of battery 1614(1) will consequently increase, such that battery 1614(1) will rapidly enter the target zone, thereby enabling recalibration of the Coulomb counter. Controller 1606 may cause battery nodes 1608(2)-1608(N) to return to their respective charge/discharge modes at this time, to prevent further rapid discharge of battery 1614(1), as well as to restore fully capacity of stack 1602.

Controller 1606 may further cause one or more battery nodes 1608 to operate in their bypass modes to equalize state of charge of battery nodes 1608, such as after determining OCV of one or more batteries 1614. For example, consider a scenario where (a) stack 1602 is operating in a discharging mode and (b) battery node 1608(1) was previously operating in its bypass mode to enable determination of OCV of battery 1614(1). Battery 1614(1) will be at a higher state of charge than other batteries 1614 due to battery node 1608(1) previously operating in its bypass mode. In response, controller 1606 may temporarily cause battery node 1608(1) to operate in its charge/discharge mode while other battery nodes 1608(2)-1608(N) operate in their bypass modes, to enable battery 1614(1) to discharge until its state of charge is equal to that of other batteries 1614 of stack 1602, thereby balancing state of charge of batteries 1614 in stack 1602.

Controller 1606 may also cause a battery node 1608 to operate in its discharge mode to decrease state of charge of a battery 1614, such as to cause the battery to operate in a target zone that is conducive to determining its state of charge. For example, assume that battery 1614(2) is not currently operating in a target zone, but that the battery would be operating in a target zone if its state of charge were moderately lower. Controller 1606 may cause battery node 1608(2) to operate in its discharge mode until battery 1614(2) is sufficiently discharged such that it is operating in the target zone.

Discussed below with respect to FIGS. 17-35 are example power systems where battery nodes include respective DC-DC converters for transferring differential power, such as directly between battery nodes, between a battery node and a bus, or between a battery node and a load or a power source. However, it is understood that other topologies capable of differential power transfer are within the scope of this disclosure.

The example power systems of FIGS. 17-35 include switching devices and current sources analogous to the switching devices and current sources of battery nodes 1608. Accordingly, certain embodiments of the battery nodes of the power systems of FIGS. 17-35 are capable of operating in a normal charge/discharge mode, a bypass mode, a floating mode, and a discharge mode, in a manner like that discussed above with respect to FIG. 16.

Figure 17:
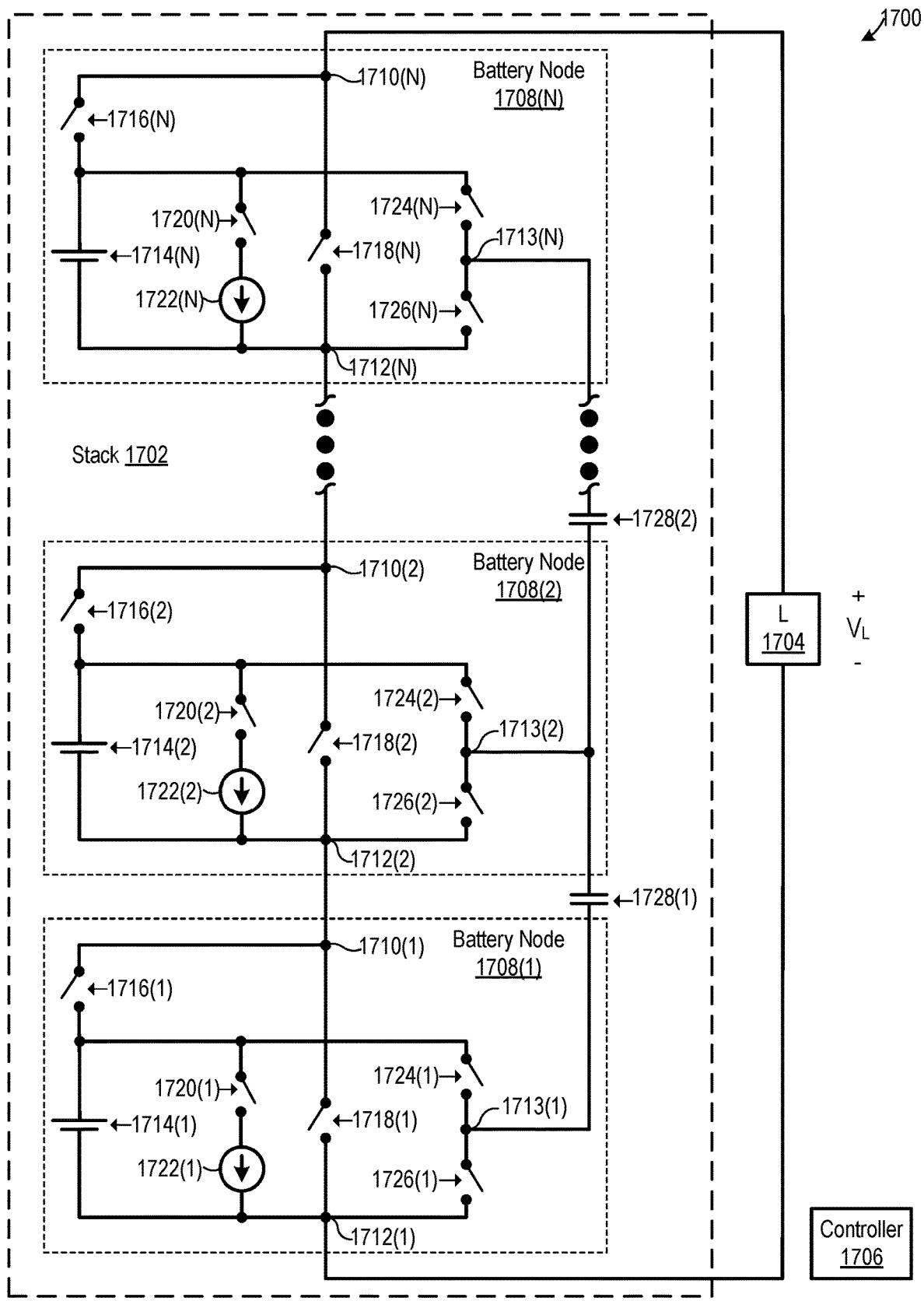
FIG. 17 is an illustrative block diagram of an example power system that includes multiple battery nodes capable of transferring charge between batteries of adjacent battery nodes via capacitors between adjacent battery nodes.

FIG. 17 is an illustrative block diagram of an example power system 1700 including a stack 1702, an electrical load 1704, and a controller 1706. Power system 1700 could include additional stacks 1702 without departing from the scope hereof, and each stack 1702 need not have the same configuration. Electrical load 1704 is electrically coupled to stack 1702. Accordingly, electrical load 1704 can both receive power from power system 1700 as well as provide power to power system 1700 for charging batteries. Controller 1706 is configured to control power system 1700, and connections between controller 1706 and other elements of power system 1700 are not shown for illustrative clarity. Although controller 1706 is depicted as being a single element, some embodiments of controller 1706 are embodied by two or more sub-elements that need not be disposed at a common location. For example, some embodiments of controller 1706 are at least partially embodied by a distributed computing system. Although controller 1706 is depicted as being separate from stack 1702, controller 1706 could be at least partially integrated with stack 1702. In some embodiments, controller 1706 is at least partially embodied by a respective node controller (not shown) of each battery node 1708, where the node controllers of all battery nodes 1708 collectively perform at least some of the functions of controller 1706.

Stack 1702 includes N battery nodes 1708, where N is an integer greater than one. Each battery node 1708 includes a positive output electrical node 1710, a negative output electrical node 1712, and a transfer electrical node 1713. Battery nodes 1708 are electrically coupled in series in stack 1702 such that a positive output electrical node 1710 of one battery node 1708 is electrically coupled to a negative output electrical node 1712 of an adjacent battery node 1708. For example, positive output electrical node 1710(1) of battery node 1708(1) is electrically coupled to negative output electrical node 1712(2) of adjacent battery node 1708(2).

Each battery node 1708 further includes a battery 1714, an isolation switch 1716, a bypass switch 1718, an upper transfer switch 1724, and a lower transfer switch 1726. Within each battery node 1708, battery 1714 and isolation switch 1716 are electrically coupled in series between positive output electrical node 1710 and negative output electrical node 1712, and bypass switch 1718 is electrically coupled between positive output electrical node 1710 and negative output electrical node 1712. Additionally, within each battery node 1708, upper transfer switch 1724 is electrically coupled between positive output electrical node 1710 and transfer electrical node 1713, and lower transfer switch 1726 is electrically coupled between transfer electrical node 1713 and negative output electrical node 1712. Each battery node 1708 optionally further includes a discharge switch 1720 and a current source 1722 electrically coupled in parallel with battery 1714 of the node.

Power system 1700 further includes N−1 transfer capacitors 1728, where a respective transfer capacitor 1728 is electrically coupled between transfer electrical nodes 1713 of adjacent battery nodes 1708. For example, transfer capacitor 1728(1) is electrically coupled between transfer electrical node 1713(1) of battery node 1708(1) and transfer electrical node 1713(2) of adjacent battery node 1708(2). Transfer capacitors 1728 are used, for example, to transfer charge between batteries 1714 of adjacent battery nodes 1708, as discussed below.

Controller 1706 is configured to control each switch 1716, 1718, 1720, 1724, and 1726, such as to cause the switches to open or close, although connections between controller 1706 and the switches are not shown for illustrative clarity. Isolation switches 1716 and bypass switches 1718 are analogous to isolation switches 1616 and bypass switches 1618 of FIG. 16. Accordingly, controller 1706 is configured to control isolation switches 1716 and bypass switches 1718 to cause stack 1702 and/or battery nodes 1708 to transition between operating modes, such as a normal charge/discharge mode, a bypass mode, a floating mode, and a discharge mode, in the same manner discussed above with respect to power system 1600. Additionally, discharge switches 1720 and current sources 1722 are analogous to discharge switches 1620 and current sources 1622 of FIG. 16. Accordingly, controller 1706 is configured to control discharge switches 1720 to safely discharge batteries 1714 in the same manner discussed above with respect to FIG. 16.

Furthermore, some embodiments of power system 1700, such as embodiments omitting discharge switches 1720 and current sources 1722, are configured to safely discharge a battery 1714 via electrical load 1704.

Moreover, controller 1706 is further configured to control upper and lower transfer switches 1724 and 1726 of battery nodes 1708 to transfer charge between batteries 1714 of adjacent battery nodes 1708 via transfer capacitors 1728, such as to cause one or more batteries 1714 to operate in a target zone, or to equalize charge among batteries 1714 after testing one or more of the batteries. For example, FIGS. 18 and 19 collectively illustrate a two-step process where charge is transferred from battery 1714(2) to battery 1714(1) via transfer capacitor 1728(1). Dashed-lines delineating battery nodes 1708(1) and 1708(2) are omitted in FIGS. 18 and 19 for illustrative clarity. Power system 1700 operates in a normal charge/discharge mode during the charge transfer process of FIGS. 18 and 19. Consequently, isolation switches 1716 are closed, bypass switches 1718 are open, and discharge switches 1720 are open, in FIGS. 18 and 19.

Figure 18:
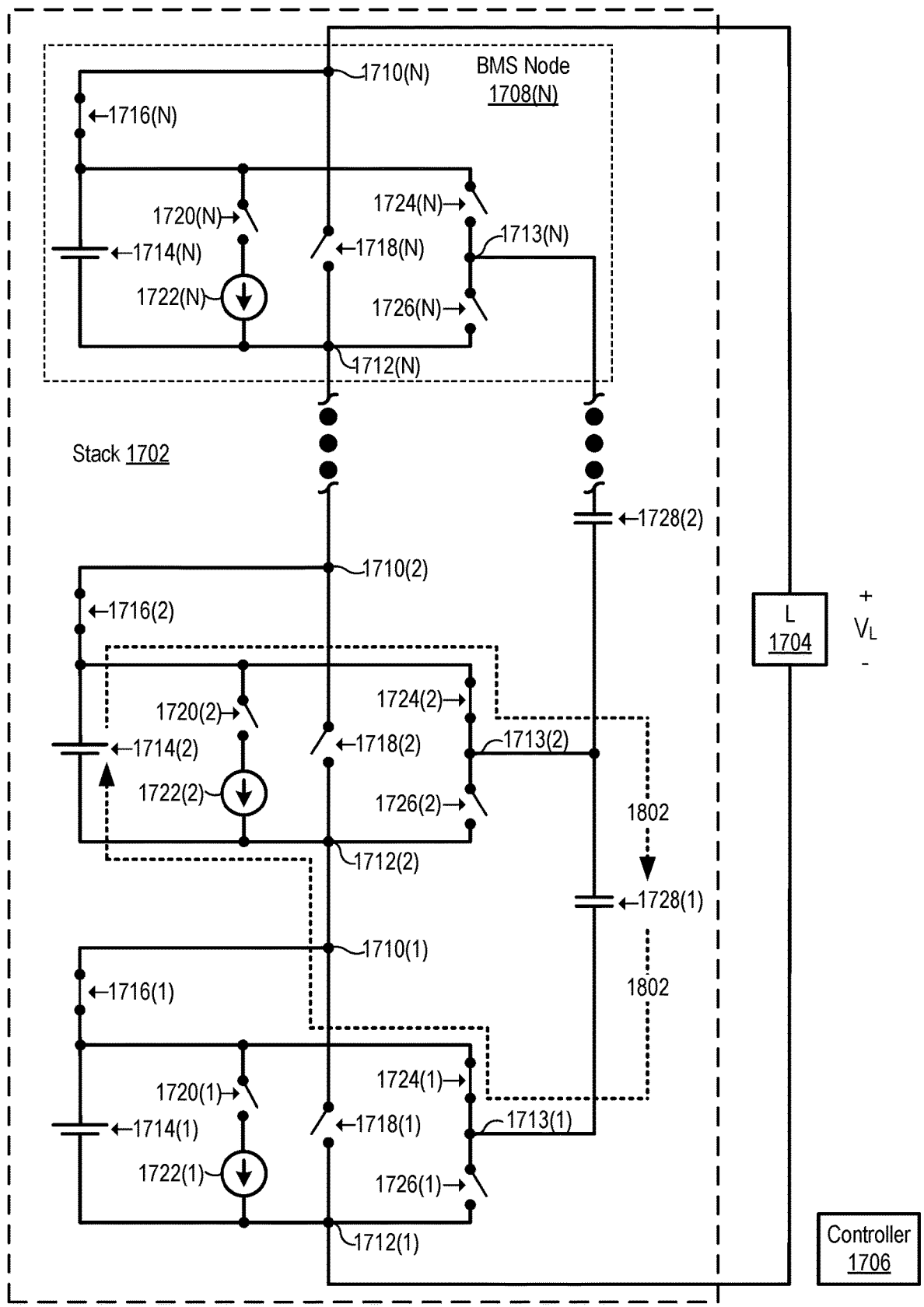
FIG. 18 illustrates a first step of a method for transferring charge between two batteries of the FIG. 17 power system.
Figure 19:
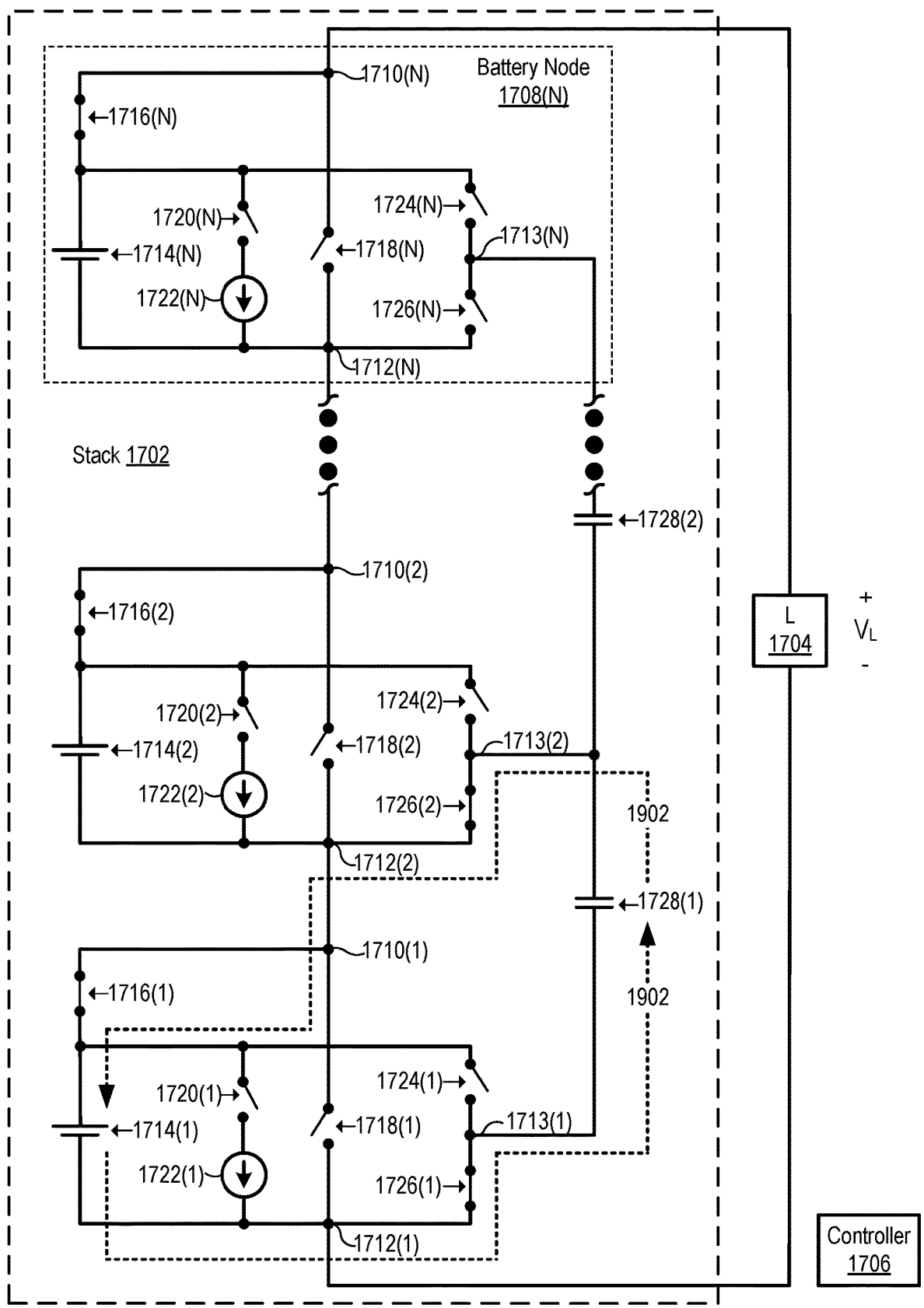
FIG. 19 illustrates a second step of the method for transferring charge between two batteries of the FIG. 17 power system.

FIG. 18 illustrates power system 1700 during the first step where upper transfer switches 1724(1) and 1724(2) are closed, and lower transfer switches 1726(1) and 1726(2) are open. Consequently, transfer capacitor 1728(1) is charged from battery 1714(2), as illustrated by dotted lines 1802 illustrating current flow between battery 1714(2) and transfer capacitor 1728(1). FIG. 19 illustrates power system 1700 during the second step where upper transfer switches 1724(1) and 1724(2) are open, and lower transfer switches 1726(1) and 1726(2) are closed. Consequently, transfer capacitor 1728(1) is discharged to battery 1714(1), as illustrated by dotted lines 1902 illustrating current flow between transfer capacitor 1728(1) and battery 1714(1). Thus, the two steps illustrated in FIGS. 18 and 19 collectively transfer charge from battery 1714(2) to battery 1714(1) via transfer capacitor 1728(1). Similar steps could be performed to transfer charge between batteries 1714 of other adjacent battery nodes 1708 of stack 1702.

Figure 20:
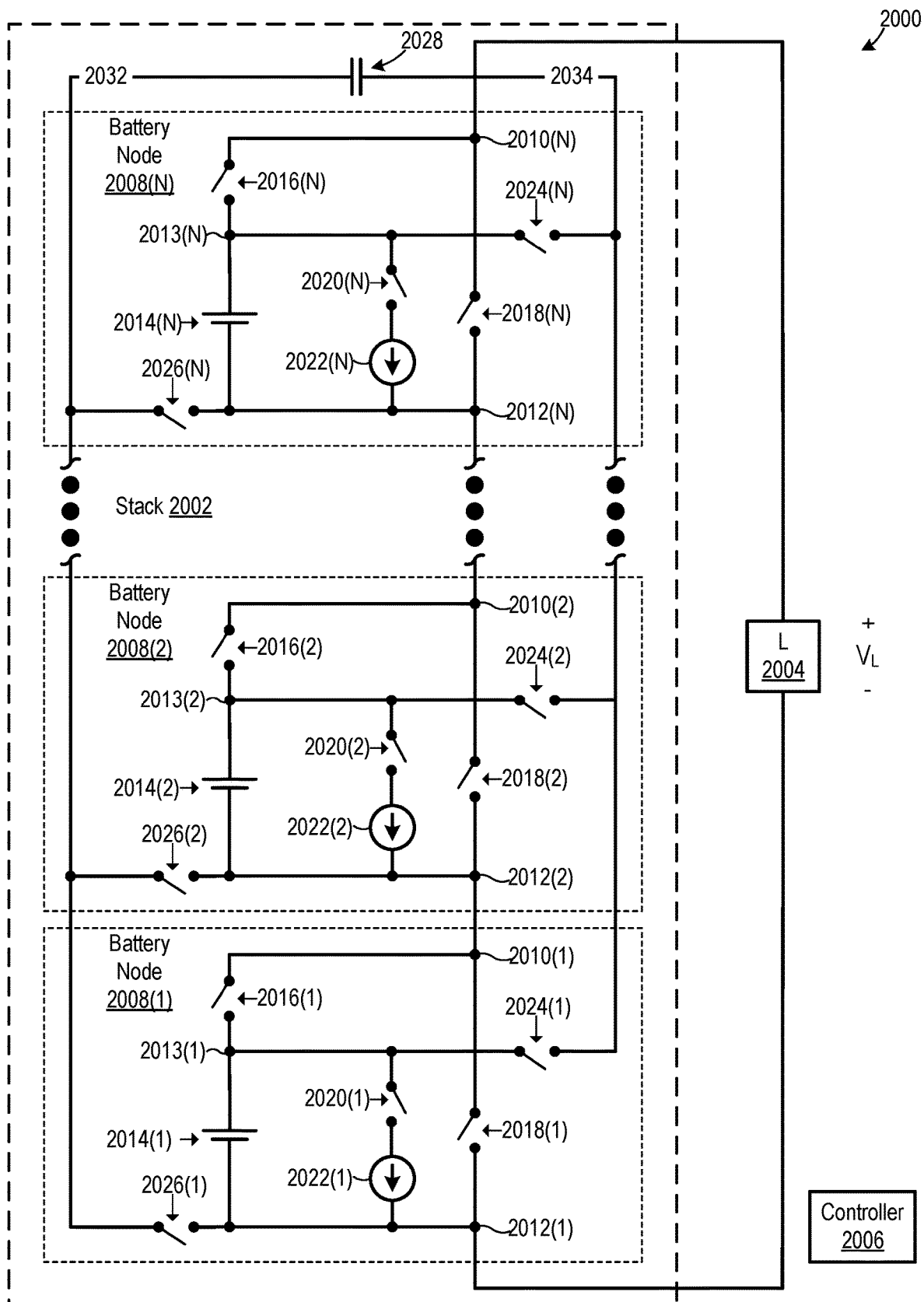
FIG. 20 is an illustrative block diagram of an example power system that includes multiple battery nodes capable of transferring charge between batteries of the battery nodes via a stack-level capacitor.

Power system 1700 is configured to transfer charge between batteries 1714 of adjacent battery nodes 1708 via transfer capacitors 1728, as discussed above. Power system 1700 could be modified to transfer charge between batteries via a stack-level transfer capacitor accessible to all battery nodes of the stack via an energy transfer bus of the stack. For example, FIG. 20 is an illustrative block diagram of an example power system 2000 including a stack 2002, an electrical load 2004, and a controller 2006. Power system 2000 could include additional stacks 2002 without departing from the scope hereof, and each stack 2002 need not have the same configuration. Electrical load 2004 is electrically coupled to stack 2002. Accordingly, electrical load 2004 can both receive power from power system 2000 as well as provide power to power system 2000 for charging batteries. Controller 2006 is configured to control power system 2000, and connections between controller 2006 and other elements of power system 2000 are not shown for illustrative clarity. Although controller 2006 is depicted as being a single element, some embodiments of controller 2006 are embodied by two or more sub-elements that need not be disposed at a common location. For example, some embodiments of controller 2006 are at least partially embodied by a distributed computing system. Although controller 2006 is depicted as being separate from stack 2002, controller 2006 could be at least partially integrated with stack 2002. In some embodiments, controller 2006 is at least partially embodied by a respective node controller (not shown) of each battery node 2008, where the node controllers of all battery nodes 2008 collectively perform at least some of the functions of controller 2006.

Stack 2002 includes N battery nodes 2008 and a transfer capacitor 2028, where N is an integer greater than one. Each battery node 2008 includes a positive output node 2010, a negative output node 2012, and an internal electrical node 2013. Battery nodes 2008 are electrically coupled in series in stack 2002 such that a positive output electrical node 2010 of one battery node 2008 is electrically coupled to a negative output electrical node 2012 of an adjacent battery node 2008. For example, positive output electrical node 2010(1) of battery node 2008(1) is electrically coupled to negative output electrical node 2012(2) of adjacent battery node 2008(2). Transfer capacitor 2028 is electrically coupled between a first transfer electrical node 2032 and a second transfer electrical node 2034, and transfer electrical nodes 2032 and 2034 collectively form an energy transfer bus accessible to each battery node 2008. Transfer capacitor 2028 is used to temporarily store charge while transferring charge between batteries 2014 of battery nodes 2008, as discussed below.

Each battery node 2008 further includes a battery 2014, an isolation switch 2016, a bypass switch 2018, an upper transfer switch 2024, and a lower transfer switch 2026. Within each battery node 2008, battery 2014 and isolation switch 2016 are electrically coupled in series between positive output electrical node 2010 and negative output electrical node 2012 such that battery 2014 and isolation switch 2016 are joined at internal electrical node 2013, and bypass switch 2018 is electrically coupled between positive output electrical node 2010 and negative output electrical node 2012. Additionally, within each battery node 2008, upper transfer switch 2024 is electrically coupled between internal electrical node 2013 and second transfer electrical node 2034, and lower transfer switch 2026 is electrically coupled between negative output electrical node 2012 and first transfer electrical node 2032. Each battery node 2008 optionally further includes a discharge switch 2020 and a current source 2022 electrically coupled in parallel with battery 2014 of the node.

Controller 2006 is configured to control each switch 2016, 2018, 2020, 2024, and 2026, such as to cause the switches to open or close, although connections between controller 2006 and the switches are not shown for illustrative clarity. Isolation switches 2016 and bypass switches 2018 are analogous to isolation switches 1616 and bypass switches 1618 of FIG. 16. Accordingly, controller 2006 is configured to control isolation switches 2016 and bypass switches 2018 to cause battery nodes 2008 to transition between operating modes, such as a normal charge/discharge mode, a bypass mode, a floating mode, and a discharge mode, in the same manner discussed above with respect to power system 1600. Additionally, isolation switches 2020 and current sources 2022 are analogous to isolation switches 1620 and current sources 1622 of FIG. 16. Accordingly, controller 2006 is configured to control isolation switches 2020 to safely discharge batteries 2014 in the same manner discussed above with respect to FIG. 16. Furthermore, some embodiments of power system 2000, such as embodiments omitting discharge switches 2020 and current sources 2022, are configured to safely discharge a battery 2014 via electrical load 2004.

Moreover, controller 2006 is further configured to control upper and lower transfer switches 2024 and 2026 of battery nodes 2008 to transfer charge between batteries 2014 of battery nodes 2008 via transfer capacitor 2028, such as to cause one or more batteries 2014 to operate in a target zone or balance charge among batteries 2014 after testing one or more batteries. In contrast to power system 1700 of FIG. 17, power system 2000 is capable of transferring charge between batteries of any battery nodes 2008, including battery nodes 2008 that are non-adjacent, in two steps. For example, FIGS. 21 and 22 collectively illustrate a two-step process where charge is transferred from battery 2014(1) to battery 2014(N). Dashed-lines delineating battery nodes 2008 are omitted in FIGS. 21 and 22 for illustrative clarity. Power system 2000 operates in a normal charge/discharge mode during the charge transfer process of FIGS. 21 and 22. Consequently, isolation switches 2016 are closed, bypass switches 2018 are open, and discharge switches 2020 are open, in FIGS. 21 and 22.

Figure 21:
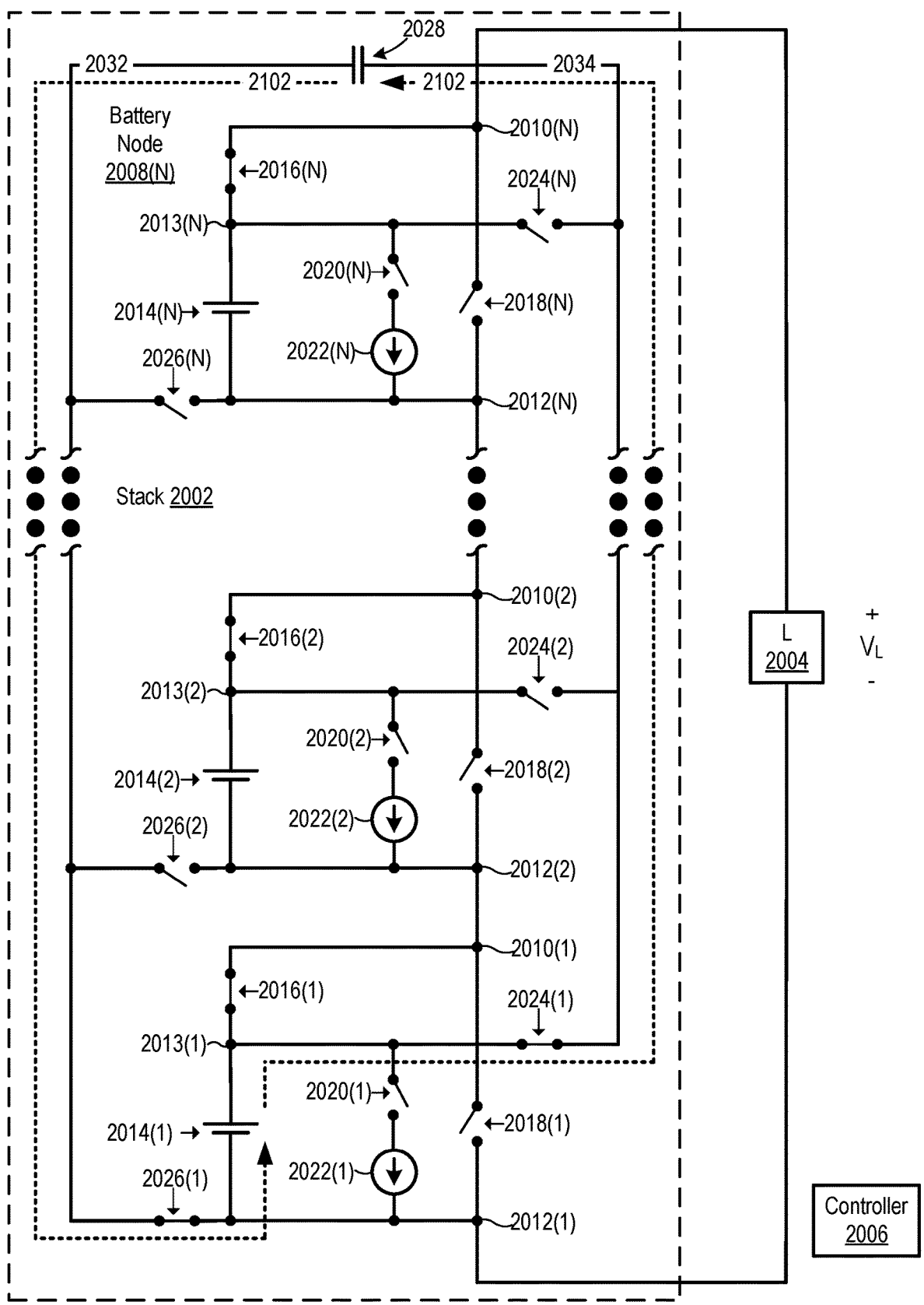
FIG. 21 illustrates a first step of a method for transferring charge between two batteries of the FIG. 20 power system.
Figure 22:
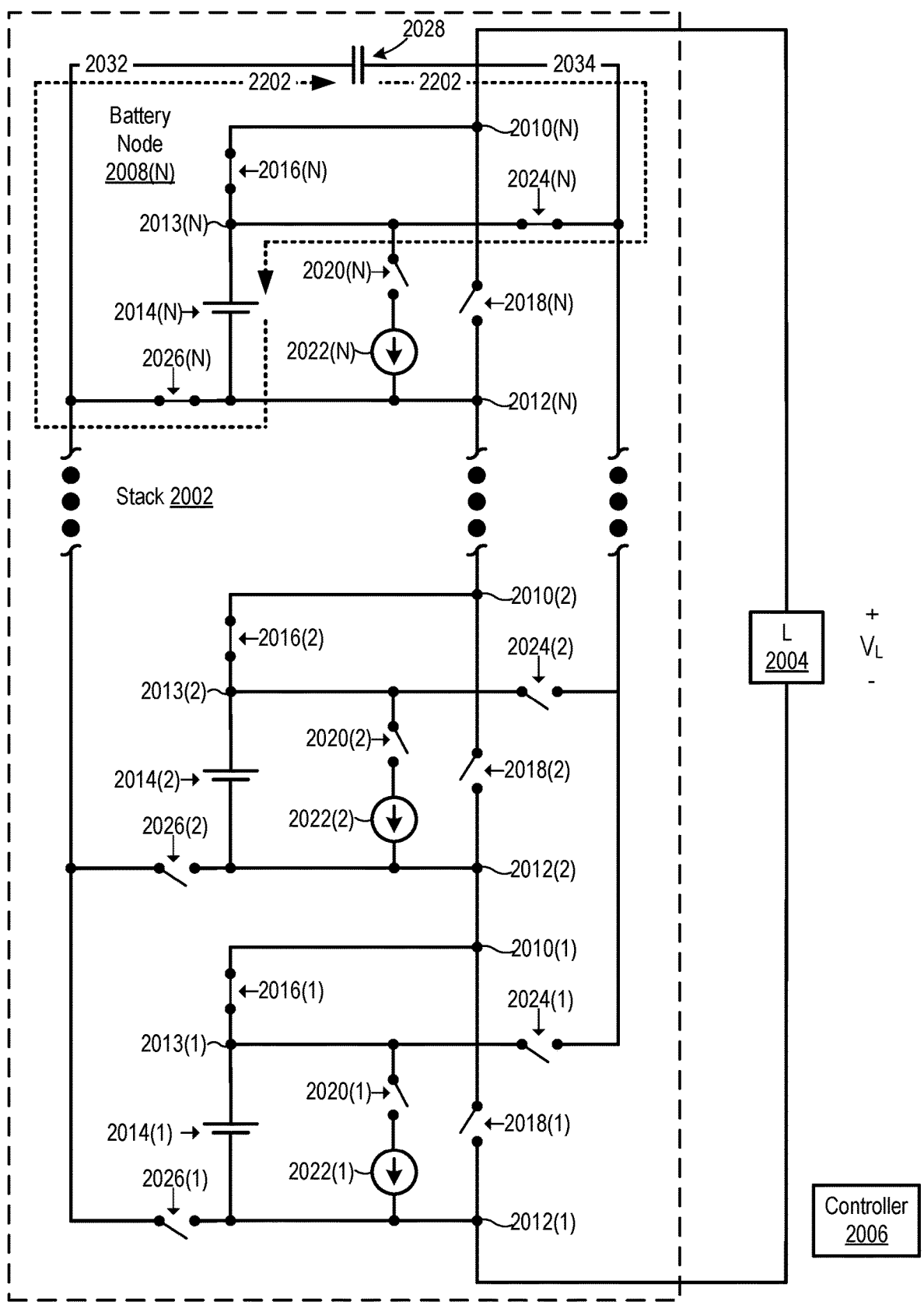
FIG. 22 illustrates a second step of the method for transferring charge between two batteries of the FIG. 20 power system.

FIG. 21 illustrates power system 2000 during the first step where transfer switches 2024(1) and 2026(1) are closed, and all other transfer switches 2024 and 2026 are open. Consequently, transfer capacitor 2028 is charged from battery 2014(1), as illustrated by dotted lines 2102 illustrating current flow between battery 2014(1) and transfer capacitor 2028. FIG. 22 illustrates power system 2000 during the second step where transfer switches 2024(N) and 2026(N) are closed, and all other transfer switches 2024 and 2026 are open. Consequently, transfer capacitor 2028 is discharged to battery 2014(N), as illustrated by dotted lines 2202 illustrating current flow between transfer capacitor 2028 and battery 2014(N). Thus, the two steps illustrated in FIGS. 21 and 22 collectively transfer charge from battery 2014(1) to battery 2014(N) via transfer capacitor 2028. Similar steps could be performed to transfer charge between batteries 2014 of other battery nodes 2008 of stack 2002.

Additionally, some embodiments of power system 2000 are configured to safely discharge a battery 2014, such as in response to the battery being identified as unsafe, by transferring the battery 2014's charge to one or more other batteries 2014 of stack 2002. For example, assume that battery 2014(1) is identified as being unsafe. Certain embodiments of power system 2000 are configured to safely discharge battery 2014(1) by transferring its charge to battery 2014(N), and/or to one or more other batteries 2014, such as by using the procedure discussed above with respect to FIGS. 21 and 22 or a similar procedure.

Figure 23:
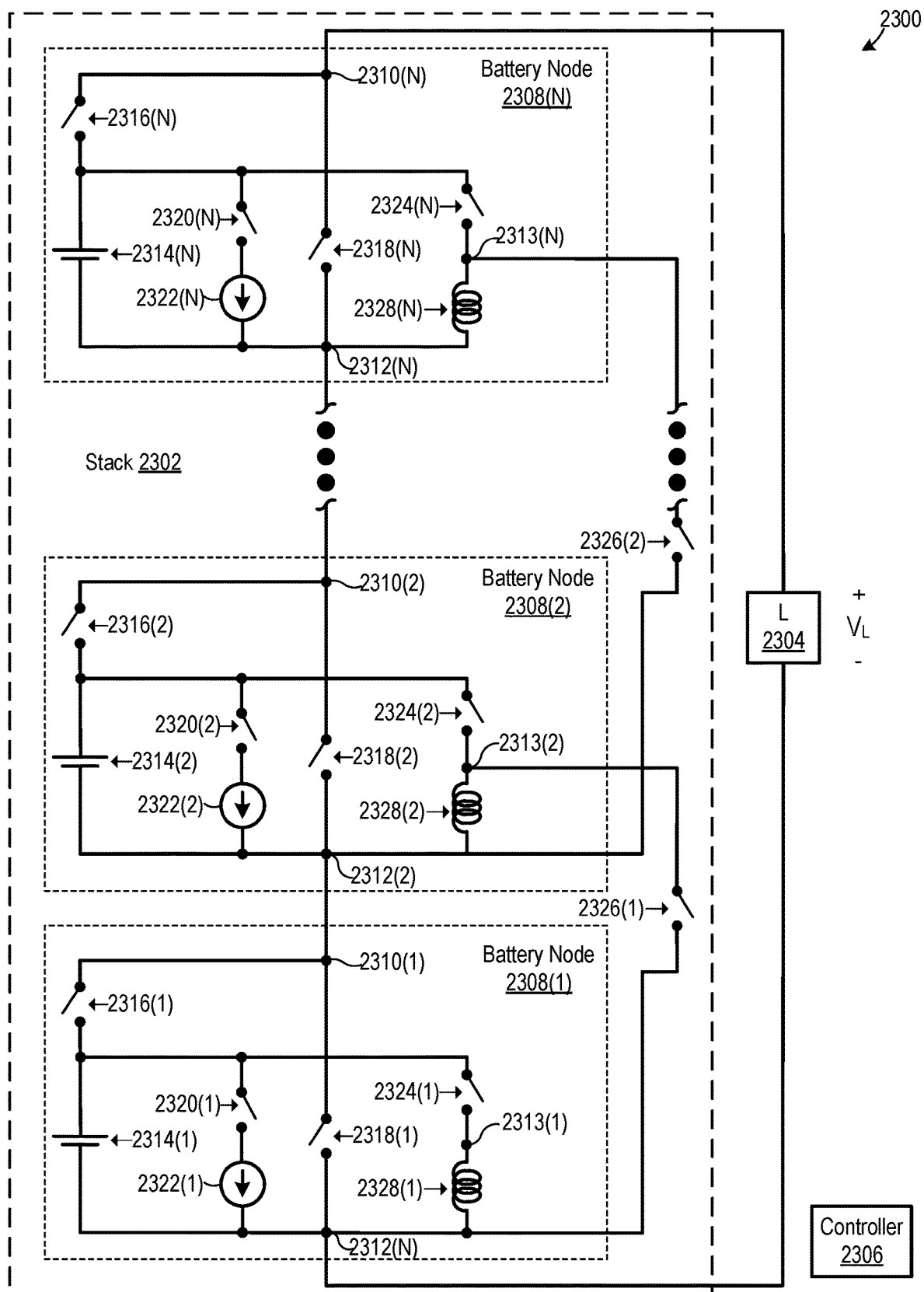
FIG. 23 is an illustrative block diagram of an example power system that includes multiple battery nodes capable of transferring charge between batteries of adjacent battery nodes via inductors.

Charge can be transferred between battery node batteries using energy storage devices other than, or in addition to, capacitors. For example, FIG. 23 is an illustrative block diagram of an example power system 2300 including a stack 2302, an electrical load 2304, and a controller 2306. Power system 2300 could include additional stacks 2302 without departing from the scope hereof, and each stack 2302 need not have the same configuration. Electrical load 2304 is electrically coupled to stack 2302. Accordingly, electrical load 2304 can both receive power from power system 2300 as well as provide power to power system 2300 for charging batteries. Controller 2306 is configured to control power system 2300, and connections between controller 2306 and other elements of power system 2300 are not shown for illustrative clarity. Although controller 2306 is depicted as being a single element, some embodiments of controller 2306 are embodied by two or more sub-elements that need not be disposed at a common location. For example, some embodiments of controller 2306 are at least partially embodied by a distributed computing system. Although controller 2306 is depicted as being separate from stack 2302, controller 2306 could be at least partially integrated with stack 2302. In some embodiments, controller 2306 is at least partially embodied by a respective node controller (not shown) of each battery node 2308, where the node controllers of all battery nodes 2308 collectively perform at least some of the functions of controller 2306.

Stack 2302 includes N battery nodes 2308, where N is an integer greater than one. Each battery node 2308 includes a positive output electrical node 2310, a negative output electrical node 2312, and a transfer electrical node 2313. Battery nodes 2308 are electrically coupled in series in stack 2302 such that a positive output electrical node 2310 of one battery node 2308 is electrically coupled to a negative output electrical node 2312 of an adjacent battery node 2308. For example, positive output electrical node 2310(1) of battery node 2308(1) is electrically coupled to negative output electrical node 2312(2) of adjacent battery node 2308(2).

Each battery node 2308 further includes a battery 2314, an isolation switch 2316, a bypass switch 2318, a first transfer switch 2324, and an inductor 2328. Although inductors 2328 are illustrated as being discrete elements, inductors 2328 may be partially or fully embodied of parasitic inductance of a circuit including the inductors. Within each battery node 2308, battery 2314 and isolation switch 2316 are electrically coupled in series between positive output electrical node 2310 and negative output electrical node 2312, and bypass switch 2318 is electrically coupled between positive output electrical node 2310 and negative output electrical node 2312. Additionally, within each battery node 2308, first transfer switch 2324 is electrically coupled between positive output electrical node 2310 and transfer electrical node 2313, and inductor 2328 is electrically coupled between transfer electrical node 2313 and negative output electrical node 2312. Each battery node 2308 optionally further includes a discharge switch 2320 and a current source 2322 electrically coupled in parallel with battery 2314 of the node.

Power system 2300 further includes N−1 second transfer switches 2326, where a respective second transfer switch 2326 is electrically coupled between a transfer electrical node 2313 of one battery node 2308 and a negative output electrical node 2312 of an adjacent battery node 2308. For example, second transfer switch 2326(1) is electrically coupled between transfer electrical node 2313(2) of battery node 2308(2) and negative output electrical node 2312(1) of adjacent battery node 2308(1). Second transfer switches 2326 are used, for example, to transfer charge between batteries 2314 of adjacent battery nodes 2308, as discussed below. Although second transfer switches 2326 are depicted as being external to battery nodes 2308, second transfer switches 2326 could alternately be within battery nodes 2308. For example, in an alternate embodiment (not shown), each battery node 2308, except for battery node 2308(N), includes a respective second transfer switch 2326 electrically coupled between negative output electrical node 2312 of the battery node 2308 and transfer electrical node 2313 of an adjacent battery node 2308. As another example, in another alternate embodiment (not shown), each battery node 2308, except for battery node 2308(1), includes a respective second transfer switch 2326 electrically coupled between transfer electrical node 2313 of the battery node and negative output electrical node 2312 of an adjacent battery node 2308.

Controller 2306 is configured to control each switch 2316, 2318, 2320, 2324, and 2326, such as to cause the switches to open or close, although connections between controller 2306 and the switches are not shown for illustrative clarity. Isolation switches 2316 and bypass switches 2318 are analogous to isolation switches 1616 and bypass switches 1618 of FIG. 16. Accordingly, controller 2306 is configured to control isolation switches 2316 and bypass switches 2318 to cause battery nodes 2308 to transition between operating modes, such as a normal charge/discharge mode, a bypass mode, a floating mode, and a discharge mode, in the same manner discussed above with respect to power system 1600. Additionally, discharge switches 2320 and current sources 2322 are analogous to discharge switches 1620 and current sources 1622 of FIG. 16. Accordingly, controller 2306 is configured to control discharge switches 2320 to safely discharge batteries 2314 in the same manner discussed above with respect to FIG. 16. Furthermore, some embodiments of power system 2300, such as embodiments omitting discharge switches 2320 and current sources 2322, are configured to safely discharge a battery 2314 via electrical load 2304.

Moreover, controller 2306 is further configured to control first and second transfer switches 2324 and 2326 to transfer charge between batteries 2314 of adjacent battery nodes 2308 via inductors 2328, such as to cause one or more batteries 2314 to operate in a target zone, or to equalize charge among batteries 2314 after testing one or more of the batteries. For example, FIGS. 24 and 25 collectively illustrate a two-step process where charge is transferred from battery 2314(2) to battery 2314(1) via inductor 2328(2). Dashed-lines delineating battery nodes 2308(1) and 2308(2), as well as several reference numbers, are omitted in FIGS. 24 and 25 for illustrative clarity. Power system 2300 operates in a normal charge/discharge mode during the charge transfer process of FIGS. 24 and 25. Consequently, isolation switches 2316 are closed, bypass switches 2318 are open, and discharge switches 2320 are open, in FIGS. 24 and 25.

Figure 24:
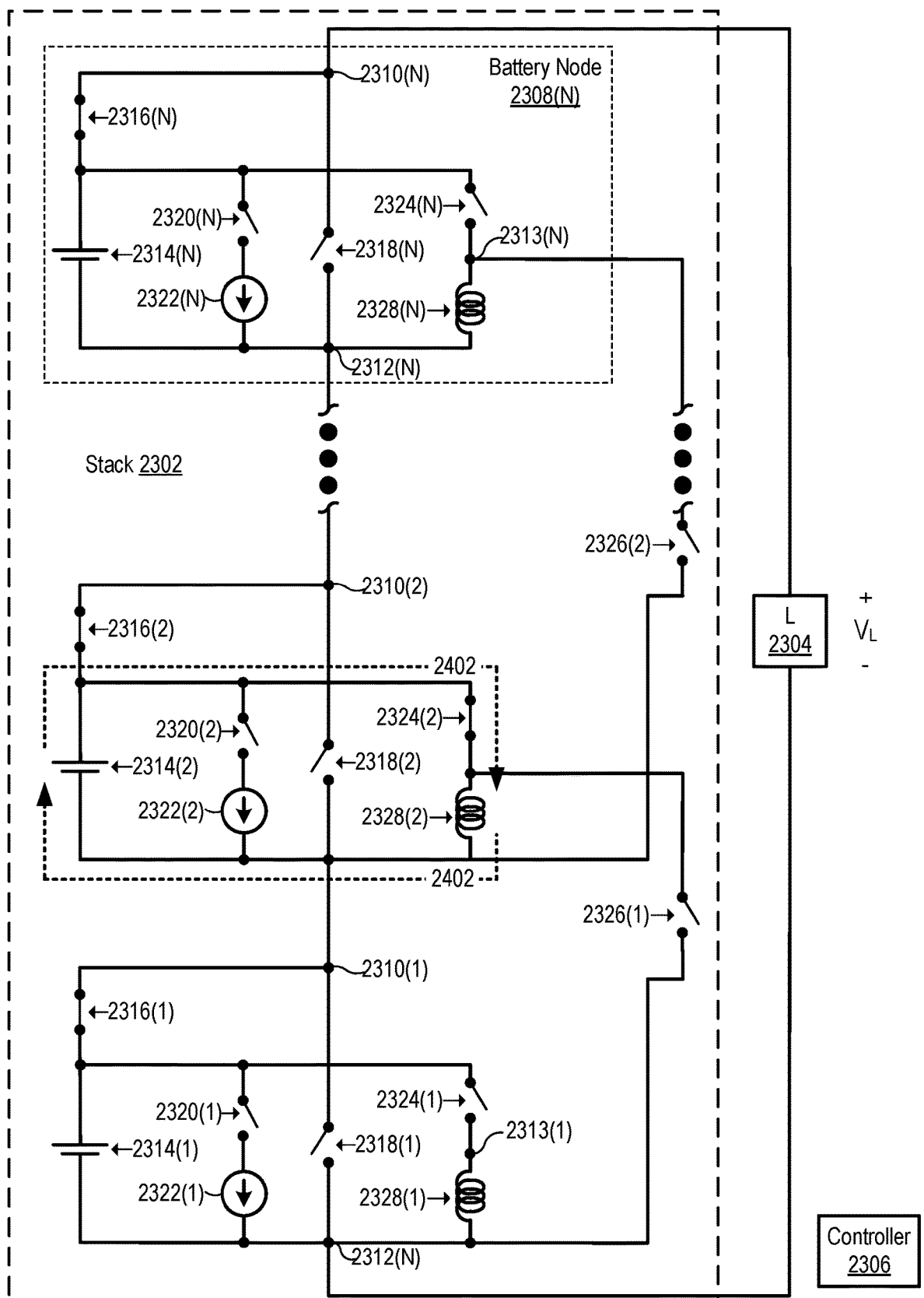
FIG. 24 illustrates a first step of a method for transferring charge between two batteries of the FIG. 23 power system.
Figure 25:
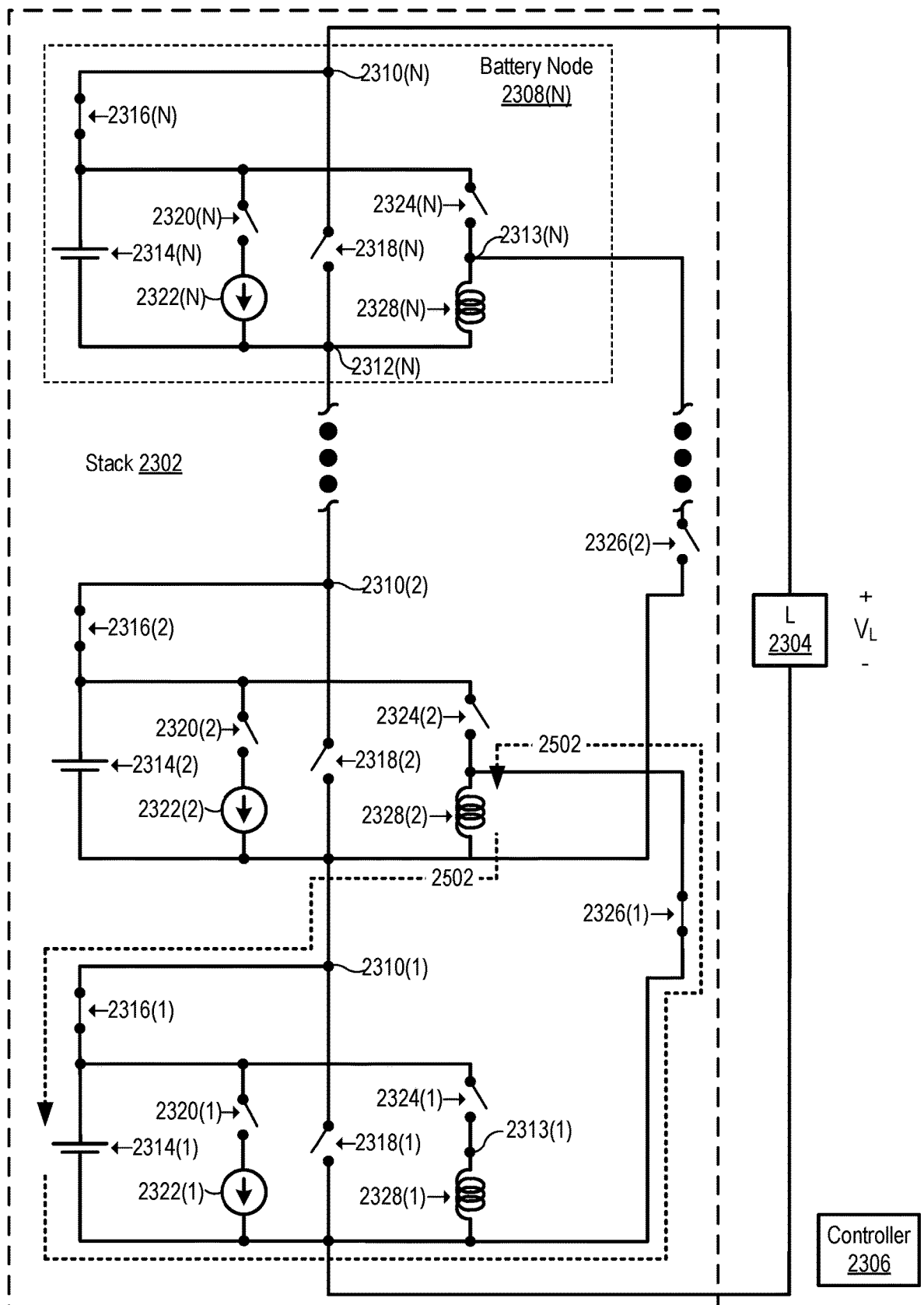
FIG. 25 illustrates a second step of the method for transferring charge between two batteries of the FIG. 23 power system.

FIG. 24 illustrates power system 2300 during the first step where first transfer switch 2324(2) is closed and all other transfer switches are open. Consequently, inductor 2328(2) is charged from battery 2314(2), as illustrated by dotted lines 2402 illustrating current flow between battery 2314(2) and inductor 2328(2). FIG. 25 illustrates power system 2300 during the second step where external second switch 2326(1) is closed, and all other transfer switches are open. Consequently, inductor 2328(2) is discharged to battery 2314(1), as illustrated by dotted lines 2502 illustrating current flow between inductor 2328(2) and battery 2314(1). Thus, the two steps illustrated in FIGS. 24 and 25 collectively transfer charge from battery 2314(2) to battery 2314(1) via inductor 2328(2). Similar steps could be performed to transfer charge between batteries 2314 of other adjacent battery nodes 2308 of stack 2302.

Additionally, some embodiments of power system 2300 are configured to safely discharge a battery 2314, such as in response to the battery being identified as unsafe, by transferring the battery 2314's charge to one or more other batteries 2314 of stack 2302. For example, assume that battery 2314(2) is identified as being unsafe. Certain embodiments of power system 2300 are configured to safely discharge battery 2314(2) by transferring its charge to battery 2314(1), such as by using the procedure discussed above with respect to FIGS. 24 and 25.

Figure 26:
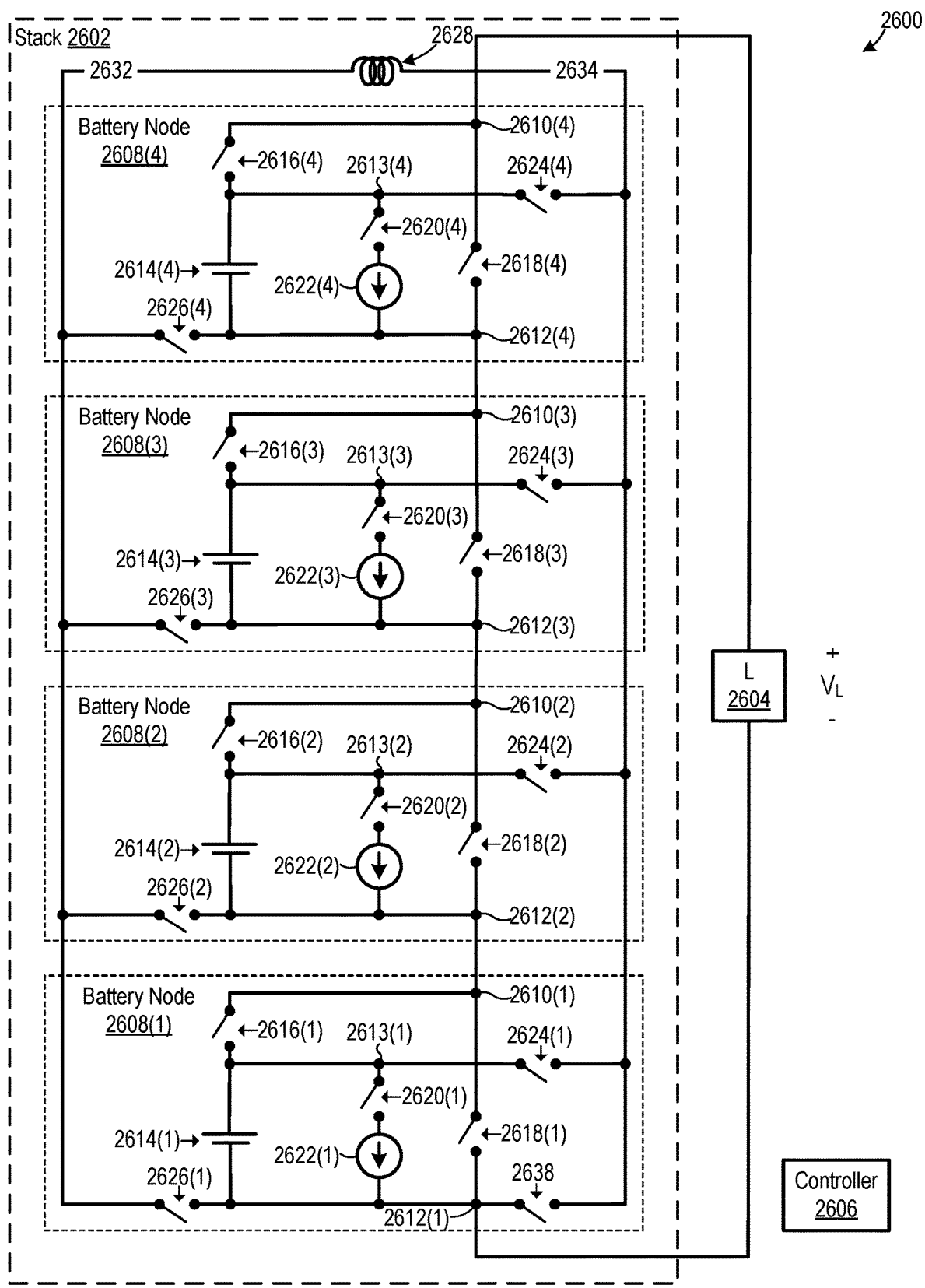
FIG. 26 is an illustrative block diagram of an example power system that includes multiple battery nodes capable of transferring charge between batteries of battery nodes via a stack-level inductor.

As another example of a power system configured to transfer charge using an inductor, FIG. 26 is an illustrative block diagram of an example power system 2600 including a stack 2602, an electrical load 2604, and a controller 2606. Power system 2600 could include additional stacks 2602 without departing from the scope hereof, and each stack 2602 need not have the same configuration. Electrical load 2604 is electrically coupled to stack 2602. Accordingly, electrical load 2604 can both receive power from power system 2600 as well as provide power to power system 2600 for charging batteries. Controller 2606 is configured to control power system 2600, and connections between controller 2606 and other elements of power system 2600 are not shown for illustrative clarity. Although controller 2606 is depicted as being a single element, some embodiments of controller 2606 are embodied by two or more sub-elements that need not be disposed at a common location. For example, some embodiments of controller 2606 are at least partially embodied by a distributed computing system. Although controller 2606 is depicted as being separate from stack 2602, controller 2606 could be at least partially integrated with stack 2602. In some embodiments, controller 2606 is at least partially embodied by a respective node controller (not shown) of each battery node 2608, where the node controllers of all battery nodes 2608 collectively perform at least some of the functions of controller 2606.

Stack 2602 includes a plurality of battery nodes 2608 and a transfer inductor 2628. Although stack 2602 is illustrated as including four battery nodes 2608, stack 2602 can include any number of battery nodes as long as stack 2602 includes at least two battery nodes 2608. Each battery node 2608 includes a positive output electrical node 2610, a negative output electrical node 2612, and an internal electrical node 2613. Battery nodes 2608 are electrically coupled in series in stack 2602 such that a positive output electrical node 2610 of one battery node 2608 is electrically coupled to a negative output electrical node 2612 of an adjacent battery node 2608. For example, positive output electrical node 2610(1) of battery node 2608(1) is electrically coupled to negative output electrical node 2612(2) of adjacent battery node 2608(2). Transfer inductor 2628 is electrically coupled between a first transfer electrical node 2632 and a second transfer electrical node 2634, and transfer electrical nodes 2632 and 2634 collectively form an energy transfer bus accessible to each battery node 2608. Transfer inductor 2628 is used to temporarily store energy while transferring charge between batteries 2614 of battery nodes 2608, as discussed below.

Each battery node 2608 further includes a battery 2614, an isolation switch 2616, a bypass switch 2618, an upper transfer switch 2624, and a lower transfer switch 2626. Within each battery node 2608, battery 2614 and isolation switch 2616 are electrically coupled in series between positive output electrical node 2610 and negative output electrical node 2612 such that battery 2614 and isolation switch 2616 are joined at internal electrical node 2613, and bypass switch 2618 is electrically coupled between positive output electrical node 2610 and negative output electrical node 2612. Additionally, within each battery node 2608, upper transfer switch 2624 is electrically coupled between internal electrical node 2613 and second transfer electrical node 2634, and lower transfer switch 2626 is electrically coupled between negative output electrical node 2612 and first transfer electrical node 2632. Each battery node 2608 optionally further includes a discharge switch 2620 and a current source 2622 electrically coupled in parallel with battery 2614 of the node. The first battery node 2608 in stack 2602, i.e., battery node 2608(1) in the FIG. 26 example, further includes an additional transfer switch 2638 electrically coupled between negative output electrical node 2612(1) and second transfer electrical node 2634.

Controller 2606 is configured to control each switch 2616, 2618, 2620, 2624, 2626, and 2638 such as to cause the switches to open or close, although connections between controller 2606 are the switches are not shown for illustrative clarity. Isolation switches 2616 and bypass switches 2618 are analogous to isolation switches 1616 and bypass switches 1618 of FIG. 16. Accordingly, controller 2606 is configured to control isolation switches 2616 and bypass switches 2618 to cause battery nodes 2608 to transition between operating modes, such as a normal charge/discharge mode, a bypass mode, a floating mode, and a discharge mode, in the same manner discussed above with respect to power system 1600. Additionally, discharge switches 2620 and current sources 2622 are analogous to discharge switches 1620 and current sources 1622 of FIG. 16. Accordingly, controller 2606 is configured to control discharge switches 2620 to safely discharge batteries 2614 in the same manner discussed above with respect to FIG. 16. Furthermore, some embodiments of power system 2600, such as embodiments omitting discharge switches 2620 and current sources 2622, are configured to safely discharge a battery 2614 via electrical load 2604.

Moreover, controller 2606 is further configured to control transfer switches 2624, 2626, and 2638 of battery nodes 2608 to transfer charge between batteries 2614 of battery nodes 2608 via transfer inductor 2628, such as to cause one or more batteries 2614 to operate in a target zone, or to equalize charge among batteries 2614 after testing one or more of the batteries. In contrast to power system 2300 of FIG. 23, power system 2600 is capable of transferring charge between batteries of any battery nodes 2608, including battery nodes 2608 that are non-adjacent, in two steps. For example, FIGS. 27 and 28 collectively illustrate a two-step process where charge is transferred from battery 2614(4) to battery 2614(1). Dashed-lines delineating battery nodes 2608, as well as some reference numbers, are omitted in FIGS. 27 and 28 for illustrative clarity. Power system 2600 operates in a normal charge/discharge mode during the charge transfer process of FIGS. 27 and 28. Consequently, isolation switches 2616 are closed, bypass switches 2618 are open, and discharge switches 2620 are open, in FIGS. 27 and 28.

Figure 27:
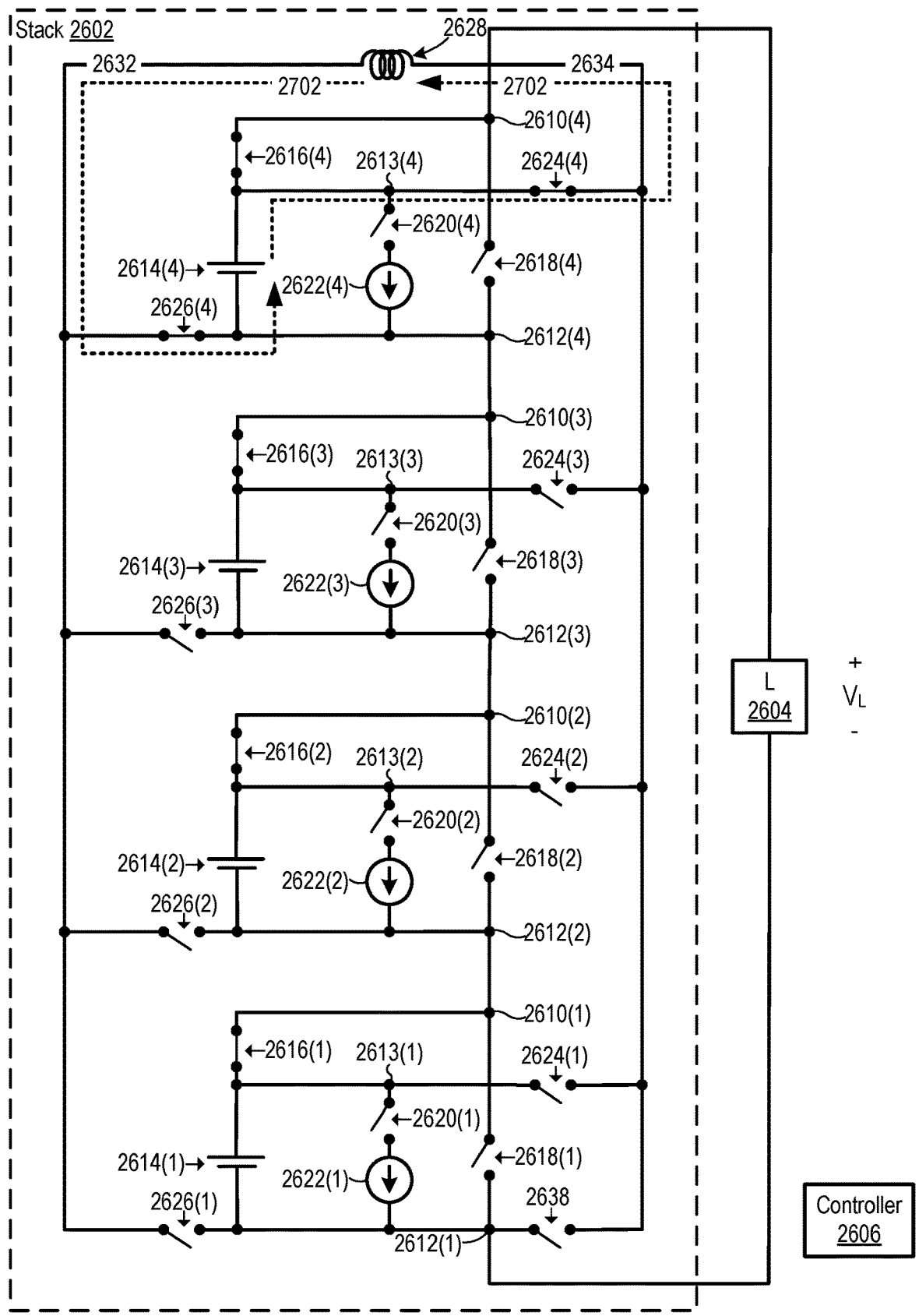
FIG. 27 illustrates a first step of a method for transferring charge between two batteries of the FIG. 26 power system.
Figure 28:
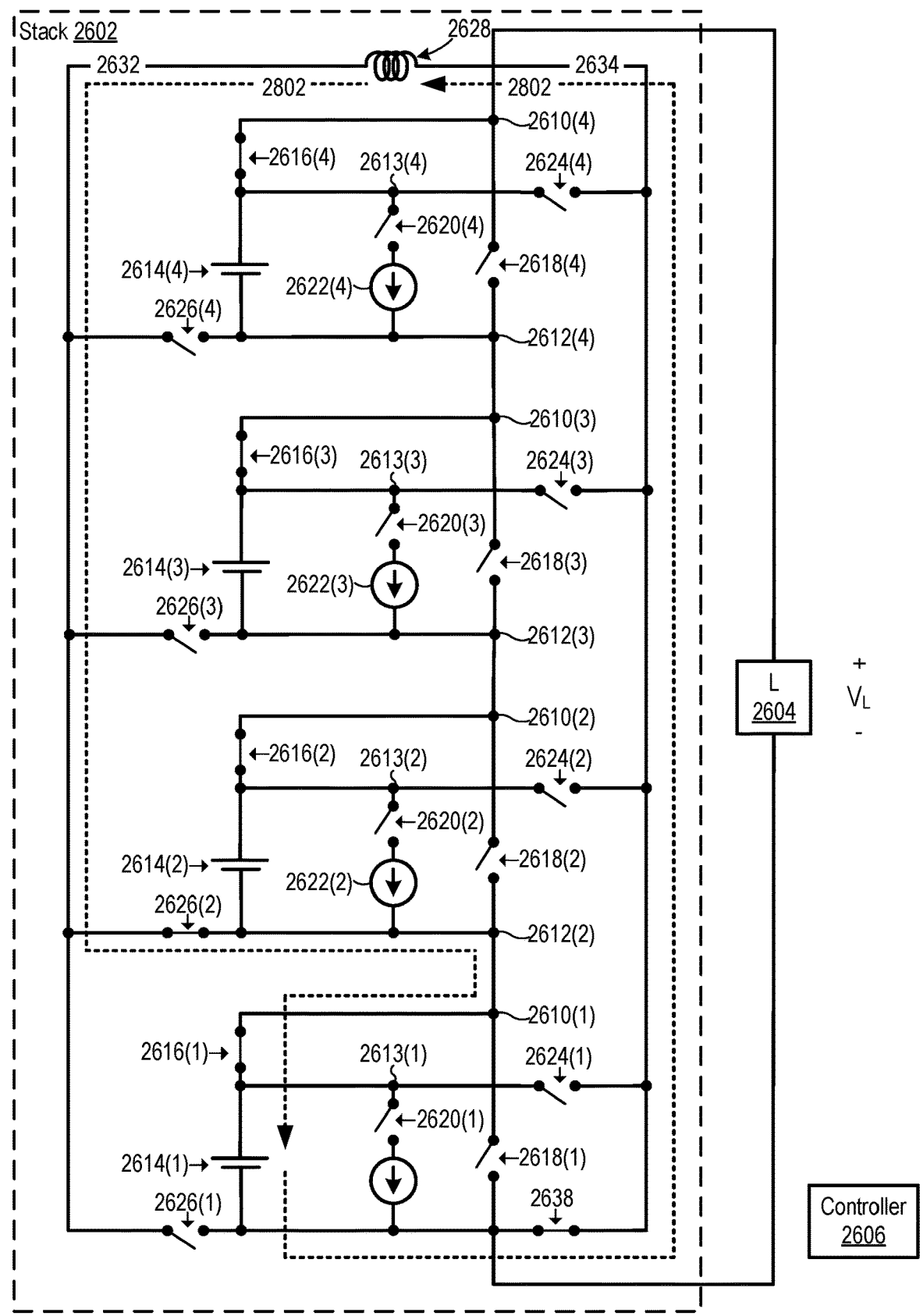
FIG. 28 illustrates a second step of the method for transferring charge between two batteries of the FIG. 26 power system.

FIG. 27 illustrates power system 2600 during the first step where transfer switches 2624(4) and 2626(4) are closed and all other transfer switches are open. Consequently, transfer inductor 2628 is charged from battery 2614(4), as illustrated by dotted lines 2702 illustrating current flow between battery 2614(4) and transfer inductor 2628. FIG. 28 illustrates power system 2600 during the second step where transfer switches 2626(2) and 2638 are closed, and all other transfer switches are open. Consequently, transfer inductor 2628 is discharged to battery 2614(1), as illustrated by dotted lines 2802 illustrating current flow between transfer inductor 2628 and battery 2614(1). Thus, the two steps illustrated in FIGS. 27 and 28 collectively transfer charge from battery 2614(4) to battery 2614(1) via transfer inductor 2628. Similar steps could be performed to transfer charge between batteries 2614 of other battery nodes 2608 of stack 2602.

Additionally, some embodiments of power system 2600 are configured to safely discharge a battery 2614, such as in response to the battery being identified as unsafe, by transferring the battery 2614's charge to one or more other batteries 2614 of stack 2602. For example, assume that battery 2614(4) is identified as being unsafe. Certain embodiments of power system 2600 are configured to safely discharge battery 2614(4) by transferring its charge to battery 2614(1), and/or to one or more other batteries 2614, such as by using the procedure discussed above with respect to FIGS. 27 and 28 or a similar procedure.

Figure 29:
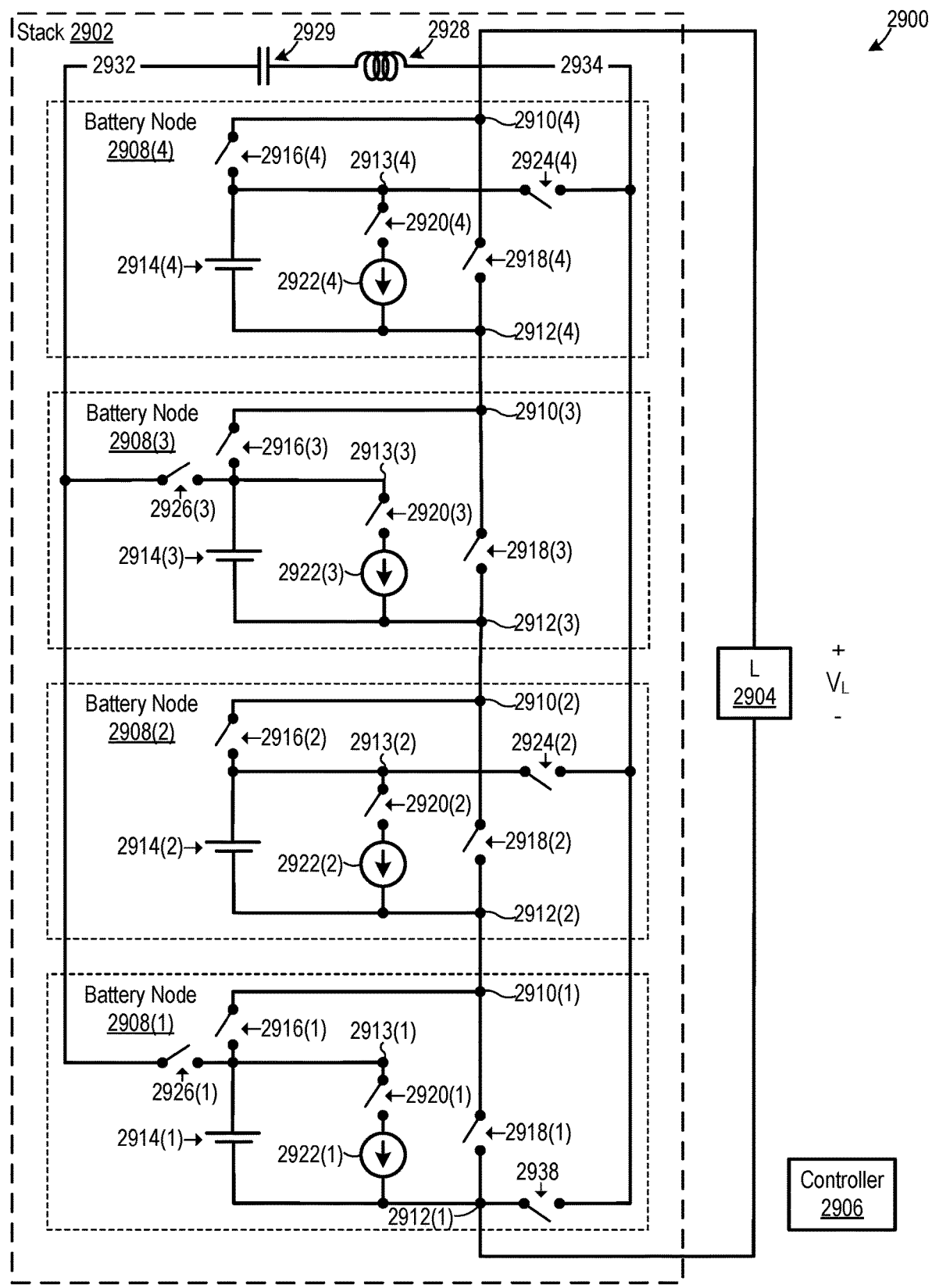
FIG. 29 is an illustrative block diagram of an example power system that includes multiple battery nodes capable of transferring charge between batteries of the battery nodes via a stack-level resonant circuit including an inductor and a capacitor.

FIG. 29 is an illustrative block diagram of an example power system 2900 including a stack 2902, an electrical load 2904, and a controller 2906. Power system 2900 could include additional stacks 2902 without departing from the scope hereof, and each stack 2902 need not have the same configuration. Electrical load 2904 is electrically coupled to stack 2902. Accordingly, electrical load 2904 can both receive power from power system 2900 as well as provide power to power system 2900 for charging batteries. Controller 2906 is configured to control power system 2900, and connections between controller 2906 and other elements of power system 2900 are not shown for illustrative clarity. Although controller 2906 is depicted as being a single element, some embodiments of controller 2906 are embodied by two or more sub-elements that need not be disposed at a common location. For example, some embodiments of controller 2906 are at least partially embodied by a distributed computing system. Although controller 2906 is depicted as being separate from stack 2902, controller 2906 could be at least partially integrated with stack 2902. In some embodiments, controller 2906 is at least partially embodied by a respective node controller (not shown) of each battery node 2908, where the node controllers of all battery nodes 2908 collectively perform at least some of the functions of controller 2906.

Stack 2902 includes a plurality of battery nodes 2908, a transfer inductor 2928, and a transfer capacitor 2929. Although stack 2902 is illustrated as including four battery nodes 2908, stack 2902 can include any number of battery nodes as long as stack 2902 includes at least two battery nodes 2908. Each battery node 2908 includes a positive output electrical node 2910, a negative output electrical node 2912, and an internal electrical node 2913. Battery nodes 2908 are electrically coupled in series in stack 2902 such that a positive output electrical node 2910 of one battery node 2908 is electrically coupled to a negative output electrical node 2912 of an adjacent battery node 2908. For example, positive output electrical node 2910(1) of battery node 2908(1) is electrically coupled to negative output electrical node 2912(2) of adjacent battery node 2908(2). Transfer inductor 2928 and transfer capacitor 2929 are electrically coupled in series between a first transfer electrical node 2932 and a second transfer electrical node 2934, and transfer electrical nodes 2932 and 2934 collectively form an energy transfer bus accessible to each battery node 2908. Transfer inductor 2928 and transfer capacitor 2929 are used to temporarily store energy while transferring charge between batteries 2914 of battery nodes 2908, as discussed below.

Each battery node 2908 includes a battery 2914, an isolation switch 2916, and a bypass switch 2918. Even number battery nodes 2908 additionally include an upper transfer switch 2924, and odd number battery nodes 2908 additionally include a lower transfer switch 2926. Within each battery node 2908, battery 2914 and isolation switch 2916 are electrically coupled in series between positive output electrical node 2910 and negative output electrical node 2912 such that battery 2914 and isolation switch 2916 are joined at internal electrical node 2913, and bypass switch 2918 is electrically coupled between positive output electrical node 2910 and negative output electrical node 2912. Additionally, within each even number battery node 2908, upper transfer switch 2924 is electrically coupled between internal electrical node 2913 and second transfer electrical node 2934, and within each odd number battery node 2908, lower transfer switch 2926 is electrically coupled between internal electrical node 2913 and first transfer electrical node 2932. Each battery node 2908 optionally further includes a discharge switch 2920 and a current source 2922 electrically coupled in parallel with battery 2914 of the node. The first battery node 2908 in stack 2902, i.e., battery node 2908(1) in the FIG. 29 example, further includes an additional transfer switch 2938 electrically coupled between negative output electrical node 2912(1) and second transfer electrical node 2934.

Controller 2906 is configured to control each switch 2916, 2918, 2920, 2924, 2926, and 2938 such as to cause the switches to open or close, although connections between controller 2906 and the switches are not shown for illustrative clarity. Isolation switches 2916 and bypass switches 2918 are analogous to isolation switches 1616 and bypass switches 1618 of FIG. 16.

Accordingly, controller 2906 is configured to control isolation switches 2916 and bypass switches 2918 to cause battery nodes 2908 to transition between operating modes, such as a normal charge/discharge mode, a bypass mode, a floating mode, and a discharge mode, in the same manner discussed above with respect to power system 1600. Additionally, discharge switches 2920 and current sources 2922 are analogous to discharge switches 1620 and current sources 1622 of FIG. 16. Accordingly, controller 2906 is configured to control discharge switches 2920 to safely discharge batteries 2914 in the same manner discussed above with respect to FIG. 16. Furthermore, some embodiments of power system 2900, such as embodiments omitting discharge switches 2920 and current sources 2922, are configured to safely discharge a battery 2914 via electrical load 2904.

Moreover, controller 2906 is further configured to control transfer switches 2924, 2926, and 2938 of battery nodes 2908 to transfer charge between batteries 2914 of battery nodes 2908 via transfer inductor 2928 and transfer capacitor 2929, such as to cause one or more batteries 2914 to operate in a target zone, or to equalize charge among batteries 2914 after testing one or more of the batteries. For example, FIGS. 30 and 31 collectively illustrate a two-step process where charge is transferred from battery 2914(4) to battery 2914(1). Dashed-lines delineating battery nodes 2908, as well as several reference numbers, are omitted in FIGS. 30 and 31 for illustrative clarity. Power system 2900 operates in a normal charge/discharge mode during the charge transfer process of FIGS. 30 and 31. Consequently, isolation switches 2916 are closed, bypass switches 2918 are open, and discharge switches 2920 are open, in FIGS. 30 and 31.

Figure 30:
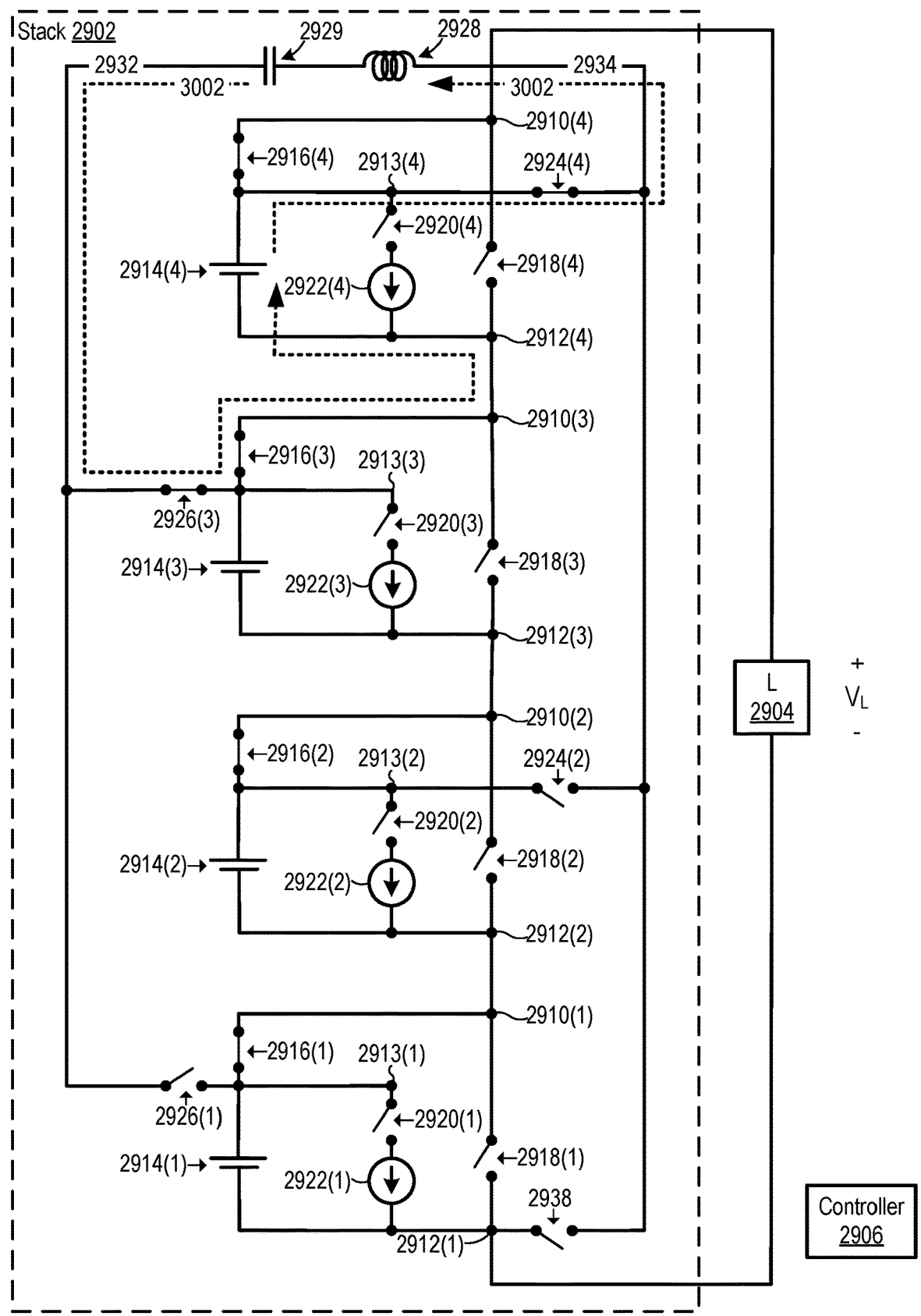
FIG. 30 illustrates a first step of a method for transferring charge between two batteries of the FIG. 29 power system.
Figure 31:
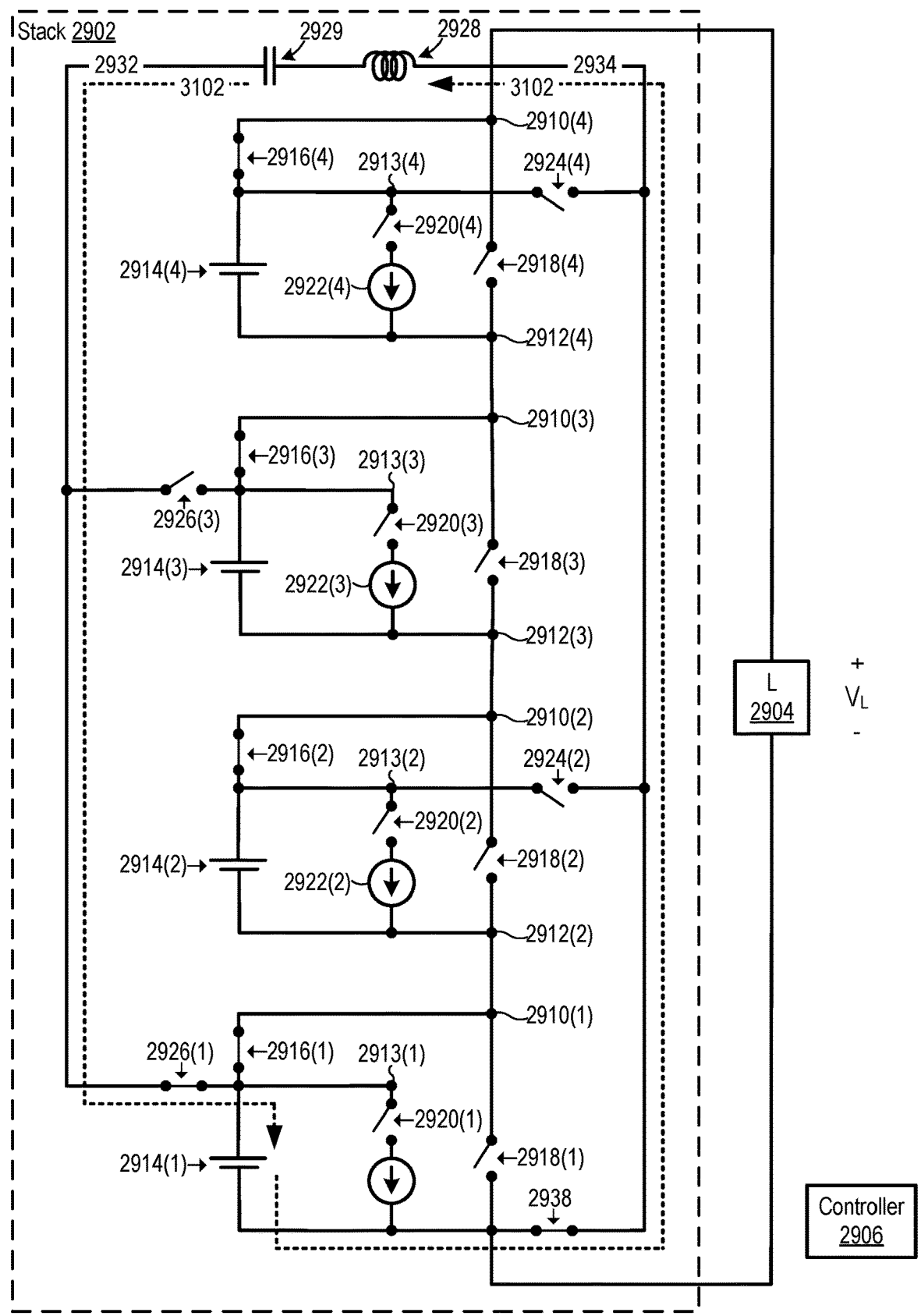
FIG. 31 illustrates a second step of the method for transferring charge between two batteries of the FIG. 29 power system.

FIG. 30 illustrates power system 2900 during the first step where transfer switches 2924(4) and 2926(3) are closed, and all other transfer switches are open. Consequently, a resonant circuit consisting of transfer inductor 2928 and transfer capacitor 2929 is charged from battery 2914(4), as illustrated by dotted lines 3002 illustrating current flow between battery 2914(4) and the resonant circuit. FIG. 31 illustrates power system 2900 during the second step where transfer switches 2926(1) and 2938 are closed, and all other transfer switches are open. Consequently, the resonant circuit is discharged to battery 2914(1), as illustrated by dotted lines 3102 illustrating current flow between the resonant circuit and battery 2914(4). Thus, the two steps illustrated in FIGS. 30 and 31 collectively transfer charge from battery 2914(4) to battery 2914(1) via transfer inductor 2928 and transfer capacitor 2929. In certain embodiments, controller 2906 is configured to transition operation of power system 2900 between the respective steps of FIGS. 30 and 31 at a time when magnitude of current flowing through the resonant circuit is at a peak value. Similar steps to those illustrated in FIGS. 30 and 31 could be performed to transfer charge between batteries 2914 of other battery nodes 2908 of stack 2902.

Additionally, some embodiments of power system 2900 are configured to safely discharge a battery 2914, such as in response to the battery being identified as unsafe, by transferring the battery 2914's charge to one or more other batteries 2914 of stack 2902. For example, assume that battery 2914(4) is identified as being unsafe. Certain embodiments of power system 2900 are configured to safely discharge battery 2914(4) by transferring its charge to battery 2914(1), and/or to one or more other batteries 2914, such as by using the procedure discussed above with respect to FIGS. 30 and 31 or a similar procedure.

Figure 32:
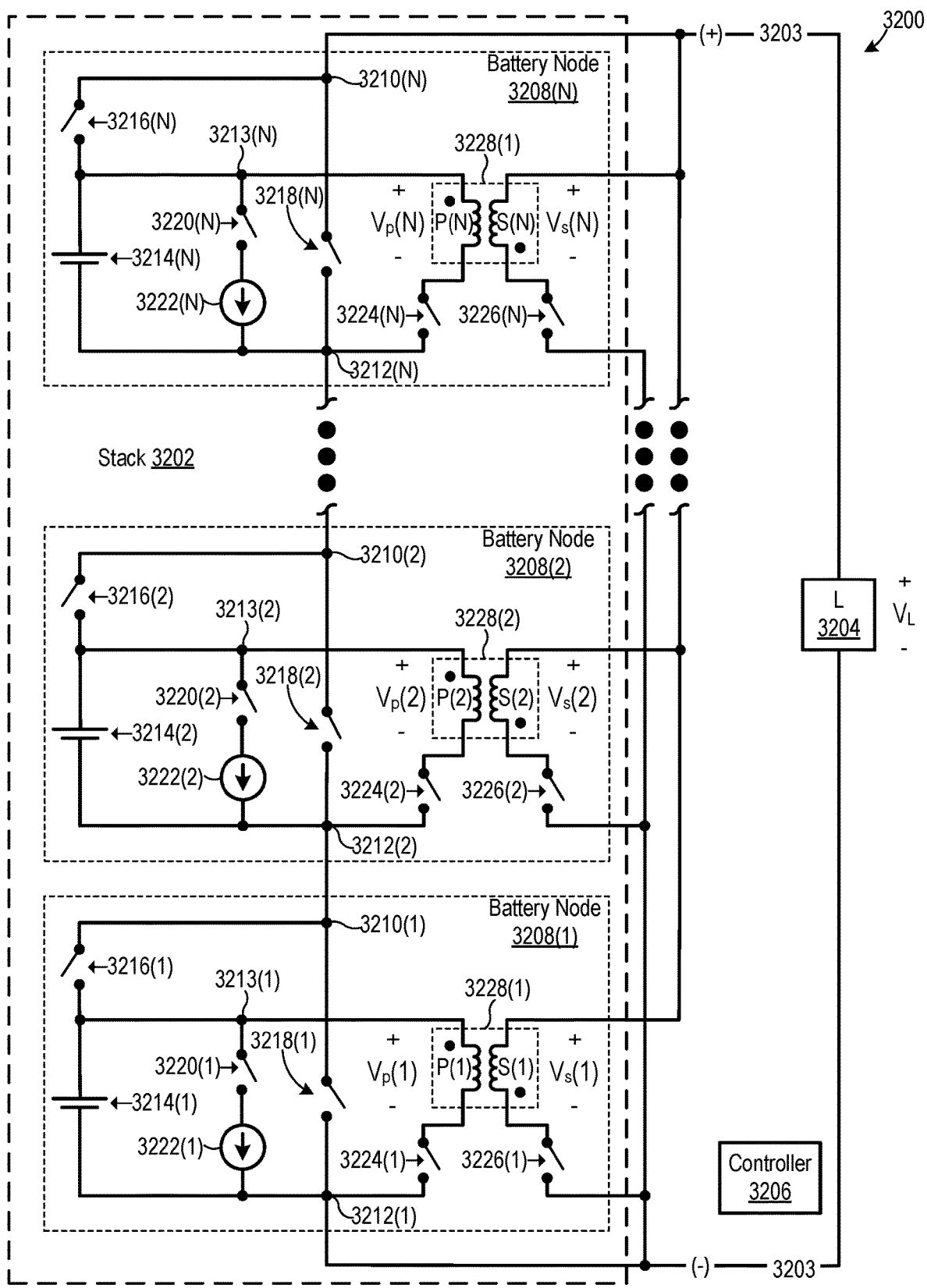
FIG. 32 is an illustrative block diagram of an example power system that includes multiple battery nodes capable of transferring charge between batteries of adjacent battery nodes via transformers and a system bus.

FIG. 32 is an illustrative block diagram of an example power system 3200 including a stack 3202, a system bus 3203, an electrical load 3204, and a controller 3206. Power system 3200 could include additional stacks 3202 without departing from the scope hereof, and each stack 3202 need not have the same configuration. Electrical load 3204 is electrically coupled to stack 3202 via system bus 3203. Accordingly, electrical load 3204 can both receive power from power system 3200 as well as provide power to power system 3200 for charging batteries. Controller 3206 is configured to control power system 3200, and connections between controller 3206 and other elements of power system 3200 are not shown for illustrative clarity. Although controller 3206 is depicted as being a single element, some embodiments of controller 3206 are embodied by two or more sub-elements that need not be disposed at a common location. For example, some embodiments of controller 3206 are at least partially embodied by a distributed computing system. Although controller 3206 is depicted as being separate from stack 3202, controller 3206 could be at least partially integrated with stack 3202. In some embodiments, controller 3206 is at least partially embodied by a respective node controller (not shown) of each battery node 3208, where the node controllers of all battery nodes 3208 collectively perform at least some of the functions of controller 3206.

Stack 3202 includes N battery nodes 3208, where N is an integer greater than one. Each battery node 3208 includes a positive output electrical node 3210, a negative output electrical node 3212, and an internal electrical node 3213. Battery nodes 3208 are electrically coupled in series in stack 3202 such that a positive output electrical node 3210 of one battery node 3208 is electrically coupled to a negative output electrical node 3212 of an adjacent battery node 3208. For example, positive output electrical node 3210(1) of battery node 3208(1) is electrically coupled to negative output electrical node 3212(2) of adjacent battery node 3208(2).

Each battery node 3208 further includes a battery 3214, an isolation switch 3216, a bypass switch 3218, a primary transfer switch 3224, a secondary transfer switch 3226, and a transformer 3228. Within each battery node 3208, battery 3214 and isolation switch 3216 are electrically coupled in series between positive output electrical node 3210 and negative output electrical node 3212 such that battery 3214 and isolation switch 3216 are joined at internal electrical node 3213, and bypass switch 3218 is electrically coupled between positive output electrical node 3210 and negative output electrical node 3212. Each transformer 3228 includes a respective primary winding P and a respective secondary winding S. Within each battery node 3208, primary winding P and primary transfer switch 3224 are electrically coupled in series between internal electrical node 3213 and negative output electrical node 3212, and secondary winding S and secondary transfer switch 3226 are electrically coupled in series across system bus 3203 (between a positive electrical node (+) of system bus 3203 and a negative electrical node (−) of system bus 3203). Accordingly, within each battery node 3208, voltage Vp across primary winding P is equal to voltage across battery 3214 when primary transfer switch 3224 is closed. Additionally, voltage Vs across each secondary windings S is equal to voltage VL across load 3202 when the winding's respective secondary transfer switch 3226 is closed. Each battery node 3208 optionally further includes a discharge switch 3220 and a current source 3222 electrically coupled in parallel with battery 3214 of the node.

Controller 3206 is configured to control each switch 3216, 3218, 3220, 3224, and 3226 such as to cause the switches to open or close, although connections between controller 3206 and the switches are not shown for illustrative clarity. Isolation switches 3216 and bypass switches 3218 are analogous to isolation switches 1616 and bypass switches 1618 of FIG. 16, respectively. Accordingly, controller 3206 is configured to control isolation switches 3216 and bypass switches 3218 to cause battery nodes 3208 to transition between operating modes, such as a normal charge/discharge mode, a bypass mode, a floating mode, and a discharge mode, in the same manner discussed above with respect to power system 1600. Additionally, discharge switches 3220 and current sources 3222 are analogous to discharge switches 1620 and current sources 1622 of FIG. 16, respectively. Accordingly, controller 3206 is configured to control discharge switches 3220 to safely discharge batteries 3214 in the same manner discussed above with respect to FIG. 16. Furthermore, some embodiments of power system 3200, such as embodiments omitting discharge switches 3220 and current sources 3222, are configured to safely discharge a battery 3214 via electrical load 3204.

Moreover, controller 3206 is further configured to control primary and secondary transfer switches 3224 and 3226 of battery nodes 3206 to transfer charge between batteries 3214 of adjacent battery nodes 3208 via one or more energy storage elements electrically coupled to system bus 3203. Possible energy storage elements electrically coupled to system bus 3203 include, but are not limited to, capacitance (not shown) of electrical load 3204, batteries 3214 of stack 3202, and/or batteries of one or more additional stacks (not shown) electrically coupled to system bus 3203. Within each battery node 3208, transformer 3228, primary transfer switch 3224, and secondary transfer switch 3226 collectively form a flyback converter which operates under the control of controller 3206. As known in the art, a transformer of a flyback converter is configured to store energy within the transformer during switching cycles of the flyback converter. Accordingly, transformers 3228 have sufficiently high leakage inductance to store energy for transfer between batteries 3214 and energy storage elements electrically coupled to system bus 3203.

Figure 33:
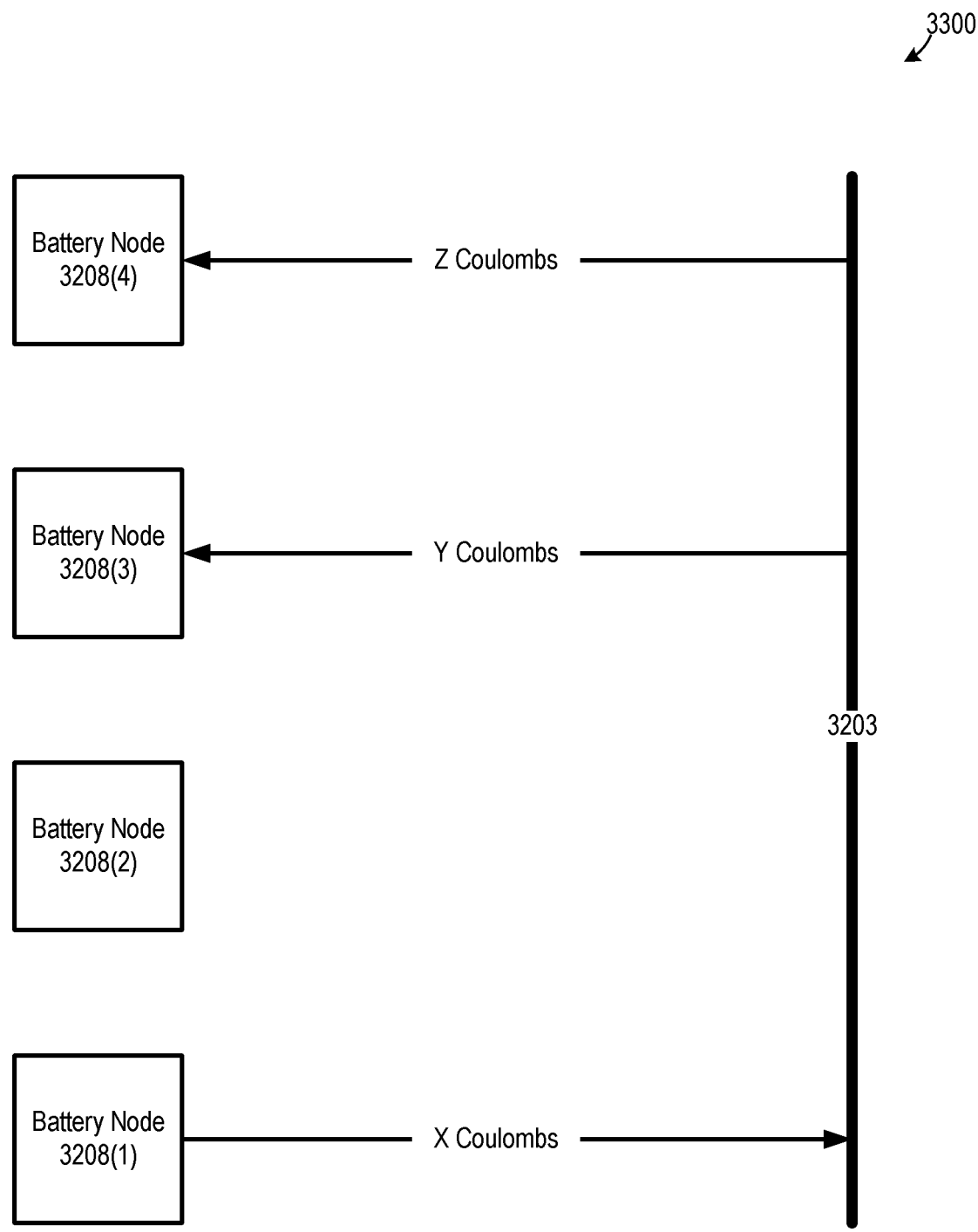
FIG. 33 is a diagram illustrating one example of charge transfer in an embodiment of the FIG. 32 power system including four battery nodes.

Controller 3206 is configured to control transfer switches 3224 and 3226 to transfer charge between batteries 3214 and energy storage elements electrically coupled to system bus 3203, such as for balancing charge among batteries 3214 and/or to cause one or more batteries 3214 to operate in a target zone. For example, FIG. 33 is a diagram illustrating one example of charge transfer in an embodiment of power system 3200 where N is equal to four, i.e., where stack 3202 includes four battery nodes 3208. FIG. 33 includes a respective box logically representing each battery node 3208, as well as a vertical line logically representing system bus 3203. In the FIG. 33 scenario, battery 3214(1) of battery node 3208(1) has excess charge, and controller 3206 accordingly controls transfer switches 3224(1) and 3226(1) such that transformer 3228(1) transfers X Coulombs from battery node 3208(1) to system bus 3203. Respective batteries 3214(3) and 3214(4) of battery nodes 3208(3) and 3208(4), on the other hand, have insufficient charge. Controller 3206 accordingly controls transfer switches 3224(3) and 3226(3) such that transformer 3228(3) transfers Y Coulombs from system bus 3203 to battery node 3208(3). Additionally, controller 3206 controls transfer switches 3224(4) and 3226 (4) such that transformer 3228(4) transfers Z Coulombs from system bus 3203 to battery node 3208(4). The three charge transfer steps depicted in FIG. 33 could occur simultaneously or they could occur at two or more different times. Additionally, while not required, in some embodiments, charge transferred from battery nodes 3208 to system bus 3203 equals charge transferred from system bus 3203 to battery nodes 3208, such that X Coulombs=Y Coulombs+Z Coulombs.

Additionally, some embodiments of power system 3200 are configured to safely discharge a battery 3214, such as in response to the battery being identified as unsafe, by transferring the battery 3214's charge to one or more other batteries 3214 of stack 3202, and/or by transferring the battery 3214's charge to an energy storage element electrically coupled to system bus 3203. For example, assume that battery 3214(1) is identified as being unsafe. Certain embodiments of energy storage system 3200 are configured to safely discharge battery 3214(1) by transferring its charge to batteries 3214(3) and 3214(4), and/or to one or more other batteries 3214, such as by using the procedure discussed above with respect to FIG. 33 or a similar procedure.

Figure 34:
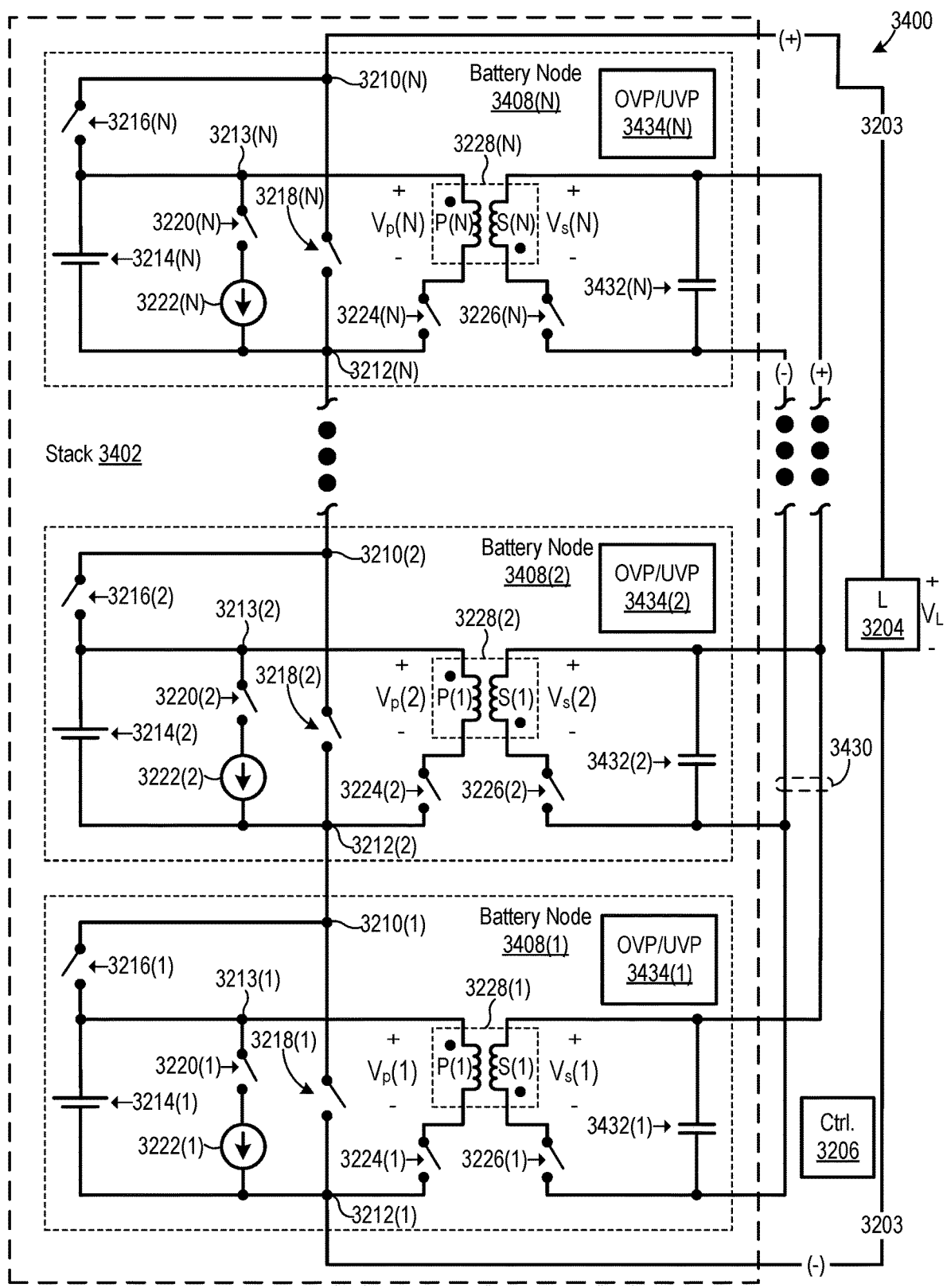
FIG. 34 is an illustrative block diagram of an alternate embodiment of the FIG. 32 power system including a dedicated power transfer bus.

FIG. 34 is an illustrative block diagram of an example power system 3400, which is an alternate embodiment of power system 3200 of FIG. 32 including a stack 3402 of battery nodes 3408 in place of stack 3202 of battery nodes 3208. Additionally, power system 3400 includes a power transfer bus 3430 used for transferring charge between batteries 3214, as discussed below. Power transfer bus 3430 and system bus 3203 optionally share a common negative electrical node (−) (not shown). Battery nodes 3408 differ from battery nodes 3208 in that within each battery node 3408, secondary winding S and secondary transfer switch 3226 are electrically coupled in series across power transfer bus 3430, i.e., between the positive electrical node (+) of power transfer bus 3430 and the negative electrical node (−) of power transfer bus 3430, instead of being coupled across system bus 3203. Each battery node 3408 optionally further includes one or more of (a) a capacitor 3432 electrically coupled across power transfer bus 3430 and (b) overvoltage protection and undervoltage protection (OVP/UVP) circuitry 3434. Capacitors 3432 provide energy storage on power transfer bus 3430, and OVP/UVP circuitry 3434 helps prevent excessively high or low voltage on power transfer bus 3430, as discussed below.

Power system 3400 operates in the same manner as energy storage system 3200 except that transformers 3228 transfer charge between batteries 3214 and power transfer bus 3430, instead of transferring charge between batteries 3214 and system bus 3203. Accordingly, the FIG. 33 example scenario is applicable to power system 3400, but with system bus 3203 replaced power transfer bus 3430 in FIG. 33. Additionally, some embodiments of power system 3400 are configured to safely discharge a battery 3214, such as in response to the battery being identified as unsafe, by transferring the battery 3214's charge to one or more other batteries 3214 of stack 3202, and/or by transferring the battery 3214's charge to capacitors 3432 electrically coupled to power transfer bus 3430.

Voltage across power transfer bus 3430 is equal to voltage Vs across each secondary winding S, and this voltage is affected by actions of battery nodes 3408. Specifically, transfer of charge from a battery 3214 to power transfer bus 3430 raises voltage on power transfer bus 3430, and transfer of charge away from power transfer bus 3430 to a battery 3214 reduces voltage on power transfer bus 3430. Consequently, voltage on power transfer bus 3430 could rise to an excessively high value, or the voltage could fall to an excessively low value, when substantial charge is transferred to or from power transfer bus 3430. Each instance of optional OVP/UVP circuitry 3434 helps prevent excessive voltage swings on power transfer bus 3430 by preventing its respective battery node 3408 from driving voltage on power transfer bus 3430 excessively high or low. For example, assume that battery node 3408(2) is transferring charge from battery 3214(2) to power transfer bus 3430 and that voltage on power transfer bus 3430 rises to a maximum threshold value. OVP/UVP circuitry 3434(2) may cause battery node 3408(2) to stop transferring charge to power transfer bus 3430 in response thereto, to prevent further rise in voltage on power transfer bus 3430. As another example, assume that battery node 3408(1) is transferring charge from power transfer bus 3430 to battery 3214(1) such that voltage on power transfer bus 3430 falls to a minimum threshold value. OVP/UVP circuitry 3434(1) may cause battery node 3408 (1) to stop transferring charge away from power transfer bus 3430 in response thereto, to prevent further decrease in voltage on power transfer bus 3430.

Figure 35:
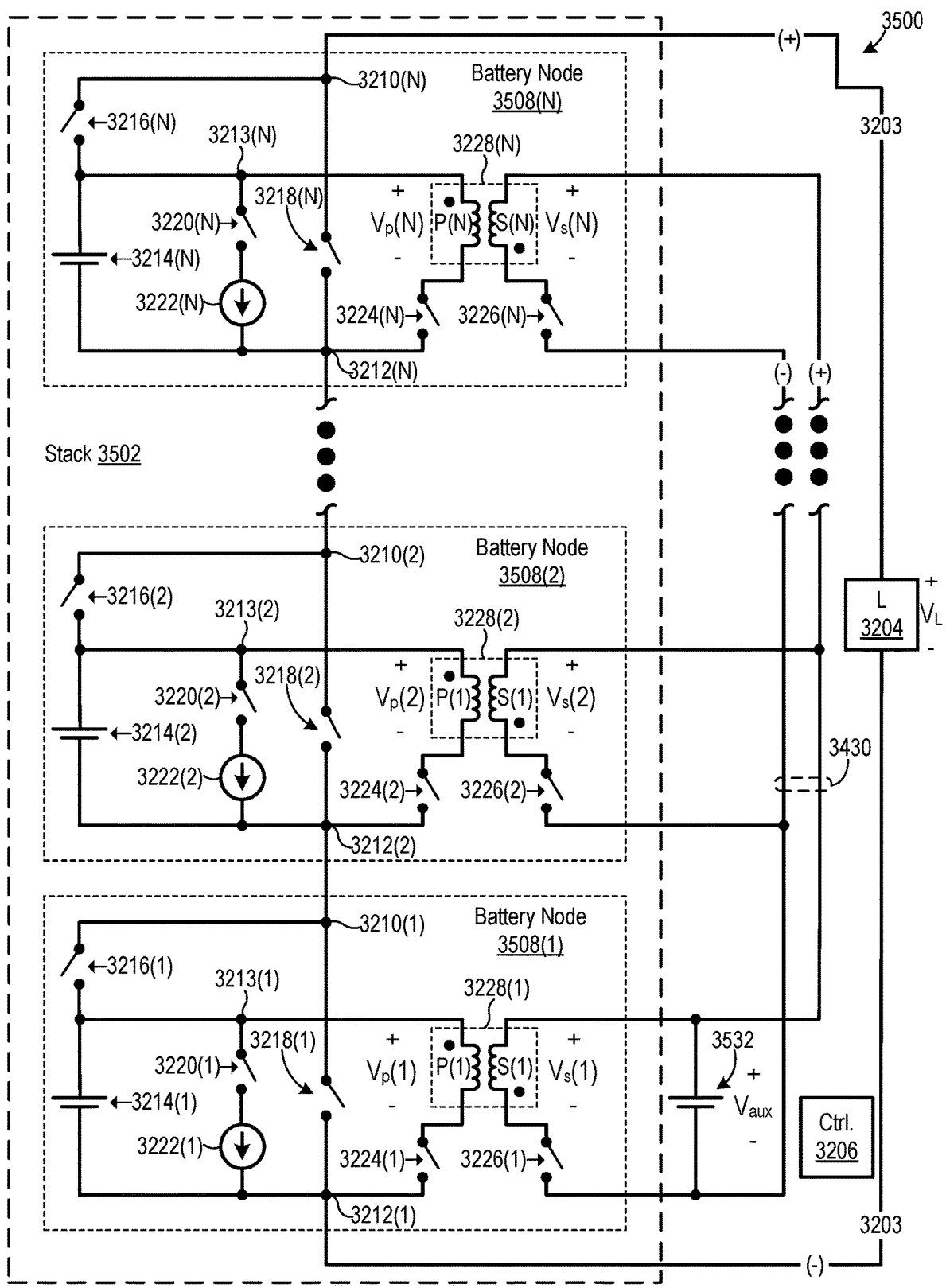
FIG. 35 is an illustrative block diagram of an alternate embodiment of the FIG. 34 power system where the power transfer bus is configured to provide an auxiliary power supply rail.

FIG. 35 is an illustrative block diagram of an example power system 3500, which is an alternate embodiment of power system 3400 of FIG. 34 including a stack 3502 of battery nodes 3508 in place of stack 3402 of battery nodes 3408. Additionally, power system 3500 includes a battery 3532 electrically coupled across positive terminal (+) and negative terminal (−) of power transfer bus 3430. Battery nodes 3508 of FIG. 35 are the same as battery nodes 3408 of FIG. 34 except that battery nodes 3508 omit capacitors 3432 and OVP/UVP circuitry 3434. Accordingly, power system 3500 operates in the same manner as power system 3400, except that power system 3500 is configured such that controller 3206 controls operation of transfer switches 3224 and 3226 so that power transfer bus 3430 provides a regulated auxiliary power supply rail having a voltage Vaux. Additionally, some embodiments are configured to safely discharge a battery 3214, such as in response to the battery being identified as unsafe, by transferring the battery 3214's charge to one or more other batteries 3214 of stack 3202, and/or by transferring the battery 3214's charge to battery 3532 electrically coupled to power transfer bus 3430.

The auxiliary power rail is used, for example, to power one or more devices having a different voltage requirement than electrical load 3204, such as low voltage devices in automotive applications. In some embodiments, Vaux is lower than voltage VL across electrical load 3204. For example, in particular embodiments, VL is hundreds or even thousands of volts, while Vaux is less than one hundred volts (e.g., 12 volts, 18 volts, 24 volts, 48 volts, etc.). Battery 3532 is optionally an automobile battery in automotive applications of system 3500.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. An in-situ method for determining a state of charge value of a battery pack including a plurality of battery cells, the method comprising:
changing a magnitude of an external cell current flowing through one or more first battery cells of the plurality of battery cells according to a first test profile, using a first node controller electrically coupled to the one or more first battery cells, while one or more second battery cells of the plurality of battery cells charge or discharge via a second node controller;
obtaining a first voltage reading from the one or more first battery cells, in response to changing the magnitude of the external cell current flowing through the one or more first battery cells according to the first test profile; and
determining a state of charge value of the one or more first battery cells at least partially using the first voltage reading.

2. The method of claim 1, further comprising controlling the second node controller such that the one or more second battery cells operate according to a compensation profile, while changing the magnitude of the external cell current flowing through the one or more first battery cells according to the first test profile, the compensation profile being different from the first test profile.

3. The method of claim 1, further comprising, balancing charge among at least the one or more first battery cells and the one or more second battery cells, after determining the state of charge value of the one or more first battery cells.

4. The method of claim 1, further comprising, after determining the state of charge value of the one or more first battery cells, controlling the first node controller such that the one or more first battery cells operate according to a first operating profile that is different from the first test profile.

5. The method of claim 1, wherein a voltage of the battery pack is at least substantially unchanged while changing the magnitude of the external cell current flowing through the one or more first battery cells according to the first test profile.

6. The method of claim 1, wherein the magnitude of the external cell current flowing through the one or more first battery cells is different from a magnitude of an external cell current flowing through the one or more second battery cells, while changing the magnitude of the external cell current flowing through the one or more first battery cells according to the first test profile.

7. The method of claim 1, further comprising, before changing the magnitude of the external cell current flowing through the one or more first battery cells according to the first test profile, selecting the one or more first battery cells for state of charge determination.

8. The method of claim 7, wherein selecting the one or more first battery cells for state of charge determination is at least partially based one or more of the following:
a time lapse,
a cycle count,
a confidence level in a state of charge value of a Coulomb counter,
a charge depth of the one or more first battery cells in one or more of previous cycles,
a discharge depth of the one or more first battery cells in one or more of previous cycles,
a charge rate of the one or more first battery cells in one or more of previous cycles,
a discharge rate of the one or more first battery cells in one or more of previous cycles,
a temperature of the one or more first battery cells in the one or more of previous cycles, and
a user input.

9. The method of claim 1, wherein changing the magnitude of the external cell current flowing through the one or more first battery cells according to the first test profile comprises causing the magnitude of the external cell current flowing through the one or more first battery cells to be zero.

10. The method of claim 9, wherein the one or more first battery cells are in a first test target zone while causing the magnitude of the external cell current flowing through the one or more first battery cells to be zero.

11. The method of claim 1, wherein changing the magnitude of the external cell current flowing through the one or more first battery cells according to the first test profile comprises charging or discharging the one or more first battery cells at a constant current or at a constant power.

12. An in-situ method for determining a state of charge value of a battery pack including a plurality of battery cells, the method comprising:
operating one or more first battery cells of the plurality of battery cells according to a first operating profile;
changing operation of the one or more first battery cells such that the one or more first battery cells operate according to a first test profile instead of according to the first operating profile;
obtaining a plurality of voltage readings from the one or more first battery cells while the one or more first battery cells operate according to the first test profile;
determining one or more differential capacity values at least partially using the plurality of voltage readings; and
determining a state of charge value of the one or more first battery cells at least partially using the one or more differential capacity values.

13. The method of claim 12, wherein the one or more differential capacity values comprise a plurality of first-order differential capacity values.

14. The method of claim 13, wherein the one or more differential capacity values further comprise at least one second-order differential capacity value.

15. The method of claim 12, further comprising operating at least one additional battery cell of the plurality of battery cells according to a compensation profile, while the one or more first battery cells operate according to the first test profile.

16. The method of claim 12, wherein obtaining the plurality of voltage readings from the one or more first battery cells comprises obtaining at least one of the plurality of voltage readings while the one or more first battery cells are in a first test target zone.

17. The method of claim 12, wherein:
state of charge of the one or more first battery cells changes while the one or more first battery cells operate according to the first test profile; and
obtaining the plurality of voltage readings from the one or more first battery cells comprises obtaining at least two of the voltage readings at different respective states of charge of the one or more first battery cells.

18. An in-situ method for determining a state of charge value of a battery pack including a plurality of battery cells, the method comprising:

using a first node controller, changing operation of one or more first battery cells of the plurality of battery cells to cause the one or more first battery cells to be in a first test target zone, while one or more second battery cells of the plurality of battery cells charge or discharge via a second node controller;

obtaining one or more first voltage readings from the one or more first battery cells, while the one or more first battery cells are in the first test target zone; and determining a state of charge value of the one or more first battery cells at least partially using the one or more first voltage readings.

19. The method of claim 18, further comprising controlling the second node controller such that the one or more second battery cells operate according to a compensation profile while the one or more first battery cells are in the first test target zone.

20. The method of claim 18, wherein the first test target zone corresponds to a state of charge range of the one or more first battery cells where state of charge of the one or more first battery cells can be estimated with an error that is less than a predetermined maximum value.

21. The method of claim 18, wherein the first test target zone corresponds to one of (a) state of charge of the one or more first battery cells being less than ten percent and (b) state of charge of the one or more first battery cells being greater than ninety percent.

* * * * *